(12) United States Patent
Coppa

(10) Patent No.: US 11,112,622 B2
(45) Date of Patent: Sep. 7, 2021

(54) EYEWEAR AND LENSES WITH MULTIPLE MOLDED LENS COMPONENTS

(71) Applicant: LUXOTTICA S.R.L., Belluno (IT)

(72) Inventor: Marco Coppa, Mason, OH (US)

(73) Assignee: LUXOTTICA S.R.L., Belluno (IT)

( * ) Notice: Subject to any disclaimer, the term of this patent is extended or adjusted under 35 U.S.C. 154(b) by 189 days.

(21) Appl. No.: 15/886,596

(22) Filed: Feb. 1, 2018

(65) Prior Publication Data
US 2019/0235282 A1  Aug. 1, 2019

(51) Int. Cl.
*G02C 3/00* (2006.01)
*G02C 7/10* (2006.01)
*G02C 7/12* (2006.01)
*B29D 11/00* (2006.01)

(52) U.S. Cl.
CPC ........ *G02C 7/104* (2013.01); *B29D 11/00413* (2013.01); *B29D 11/00634* (2013.01); *B29D 11/00644* (2013.01); *G02C 7/12* (2013.01); *B29D 11/00653* (2013.01); *G02C 7/102* (2013.01); *G02C 2202/16* (2013.01)

(58) Field of Classification Search
CPC ....... G02C 7/104; G02C 7/12; G02C 2202/16
USPC ............................................... 351/41, 44, 49
See application file for complete search history.

(56) References Cited

U.S. PATENT DOCUMENTS

| | | | |
|---|---|---|---|
| 2,219,122 A | 10/1940 | Weidert et al. | |
| 3,269,267 A | 8/1966 | Collins | |
| 3,377,626 A | 4/1968 | Smith | |
| 3,591,864 A | 7/1971 | Allsop | |
| 3,701,590 A | 10/1972 | Zeltzer | |
| 3,877,797 A | 4/1975 | Thornton, Jr. | |
| 4,168,113 A | 9/1979 | Chang et al. | |
| 4,176,299 A | 11/1979 | Thornton, Jr. | |
| 4,268,134 A | 5/1981 | Gulati et al. | |
| 4,288,250 A | 9/1981 | Yamashita | |
| 4,300,819 A | 11/1981 | Taylor | |
| 4,354,739 A | 10/1982 | Scanlon et al. | |

(Continued)

FOREIGN PATENT DOCUMENTS

| | | |
|---|---|---|
| CN | 1338622 | 3/2002 |
| CN | 2859575 | 1/2007 |

(Continued)

OTHER PUBLICATIONS

"ANSI Z80.3-2010 American National Standard for Opthalmics—Nonprescription Sunglass and Fashion Eyewear Requirements," Jun. 7, 2010, pp. 1-25.

(Continued)

*Primary Examiner* — Tuyen Tra
(74) *Attorney, Agent, or Firm* — Sterne, Kessler, Goldstein & Fox P.L.L.C.

(57) ABSTRACT

Certain embodiments disclosed herein include lenses for eyewear with a molded wafer and a molded clear resin lens component integrated onto a surface of the molded wafer. The molded wafer can include an optical filter that enhances one or more properties of filtered light. The optical filter can be, for example, a contrast-enhancing, color-enhancing, and/or chroma-enhancing filter. The clear resin lens component can be shaped such that the lenses have optical power. In some embodiments, the molded wafer is integrated onto a surface of a polarizing wafer.

20 Claims, 27 Drawing Sheets

(56) References Cited

U.S. PATENT DOCUMENTS

| | | |
|---|---|---|
| 4,376,829 A | 3/1983 | Daiku |
| 4,405,881 A | 9/1983 | Kobayashi |
| 4,521,524 A | 6/1985 | Yamashita |
| 4,537,612 A | 8/1985 | Borrelli et al. |
| 4,571,748 A | 2/1986 | Carroll et al. |
| 4,659,178 A | 4/1987 | Kyogoku |
| 4,663,562 A | 5/1987 | Miller et al. |
| 4,687,926 A | 8/1987 | Plummer |
| 4,765,729 A | 8/1988 | Taniguchi |
| 4,769,347 A | 9/1988 | Cook et al. |
| 4,777,090 A | 10/1988 | Ovshinsky et al. |
| 4,802,755 A | 2/1989 | Hensler |
| 4,826,286 A | 5/1989 | Thornton, Jr. |
| 4,838,673 A | 6/1989 | Richards et al. |
| 4,859,039 A | 8/1989 | Okumura et al. |
| 4,908,996 A | 3/1990 | Friedman et al. |
| 4,998,817 A | 3/1991 | Zeltzer |
| 5,039,631 A | 8/1991 | Krashkevich et al. |
| 5,051,309 A | 9/1991 | Kawaki et al. |
| RE33,729 E | 10/1991 | Perilloux |
| 5,054,902 A | 10/1991 | King |
| 5,061,659 A | 10/1991 | Ciolek et al. |
| 5,073,423 A | 12/1991 | Johnson et al. |
| 5,077,240 A | 12/1991 | Hayden et al. |
| 5,121,030 A | 6/1992 | Schott |
| 5,121,239 A | 6/1992 | Post |
| 5,135,298 A | 8/1992 | Feltman |
| 5,149,183 A | 9/1992 | Perrott et al. |
| 5,164,858 A | 11/1992 | Aguilera, Jr. et al. |
| 5,171,607 A | 12/1992 | Cumbo |
| 5,190,896 A | 3/1993 | Pucilowski et al. |
| 5,198,267 A | 3/1993 | Abaroni et al. |
| 5,218,386 A | 6/1993 | Levien |
| 5,306,746 A | 4/1994 | Ida et al. |
| 5,353,148 A | 10/1994 | Eid et al. |
| 5,364,498 A | 11/1994 | Chen |
| 5,408,278 A | 4/1995 | Christman |
| 5,434,707 A | 7/1995 | Dalzell et al. |
| 5,438,024 A | 8/1995 | Bolton et al. |
| 5,446,007 A | 8/1995 | Krashkevich et al. |
| 5,471,036 A | 11/1995 | Sperbeck |
| 5,513,038 A | 4/1996 | Abe |
| 5,550,599 A | 8/1996 | Jannard |
| 5,574,517 A | 11/1996 | Pang et al. |
| 5,592,245 A | 1/1997 | Moore et al. |
| 5,646,479 A | 7/1997 | Troxell |
| 5,646,781 A | 7/1997 | Johnson, Jr. |
| 5,658,502 A | 8/1997 | Hughes |
| 5,668,618 A | 9/1997 | Simioni |
| 5,694,240 A | 12/1997 | Sternbergh |
| 5,702,813 A | 12/1997 | Muarata et al. |
| 5,715,031 A | 2/1998 | Roffman et al. |
| 5,724,187 A | 3/1998 | Varaprasad et al. |
| 5,729,323 A | 3/1998 | Arden et al. |
| 5,731,898 A | 3/1998 | Orzi et al. |
| 5,751,481 A | 5/1998 | Dalzell et al. |
| 5,774,202 A | 6/1998 | Abraham et al. |
| 5,922,246 A | 7/1999 | Matsushita et al. |
| 5,925,438 A | 7/1999 | Ota et al. |
| 5,925,468 A | 7/1999 | Stewart |
| 5,928,718 A | 7/1999 | Dillon |
| 5,995,273 A | 11/1999 | Chandrasekhar |
| 6,040,053 A | 3/2000 | Scholz et al. |
| 6,045,224 A | 4/2000 | Kallenbach et al. |
| 6,102,539 A | 8/2000 | Tucker |
| 6,132,044 A | 10/2000 | Sternbergh |
| 6,135,595 A | 10/2000 | Takeshita et al. |
| 6,138,286 A | 10/2000 | Robrahn et al. |
| 6,142,626 A | 11/2000 | Lu et al. |
| 6,145,984 A | 11/2000 | Farwig |
| 6,166,848 A | 12/2000 | Cammenga et al. |
| 6,168,271 B1 | 1/2001 | Houston et al. |
| 6,175,450 B1 | 1/2001 | Andreani et al. |
| 6,178,034 B1 | 1/2001 | Allemand et al. |
| 6,210,858 B1 | 4/2001 | Yasuda et al. |
| 6,239,778 B1 | 5/2001 | Palffy-Muhoray et al. |
| 6,242,065 B1 | 6/2001 | Blomberg et al. |
| 6,256,152 B1 | 7/2001 | Coldrey et al. |
| 6,312,811 B1 | 11/2001 | Frigoli et al. |
| 6,313,577 B1 | 11/2001 | Kunisada et al. |
| 6,315,411 B1 | 11/2001 | Hatchiguian |
| 6,319,594 B1 | 11/2001 | Suzuki et al. |
| 6,334,680 B1 | 1/2002 | Larson |
| 6,355,124 B1 | 3/2002 | Blomberg et al. |
| 6,367,930 B1 | 4/2002 | Santelices |
| 6,382,788 B1 | 5/2002 | Stehager |
| 6,391,810 B1 | 5/2002 | Lenhart |
| 6,450,652 B1 | 6/2002 | Karpen |
| 6,416,867 B1 | 7/2002 | Karpen |
| 6,420,290 B1 | 7/2002 | Brocheton et al. |
| 6,460,994 B1 | 10/2002 | Nolan |
| 6,480,250 B1 | 11/2002 | Matsufuji et al. |
| 6,489,015 B1 | 12/2002 | Tsuchiya et al. |
| 6,491,851 B1 | 12/2002 | Keller et al. |
| 6,582,823 B1 | 6/2003 | Sakhrani et al. |
| 6,604,824 B2 | 8/2003 | Larson |
| 6,631,987 B2 | 10/2003 | Reichow et al. |
| 6,641,261 B2 | 11/2003 | Wang et al. |
| 6,650,473 B2 | 11/2003 | Nakagoshi |
| 6,659,608 B2 | 12/2003 | Yamamoto et al. |
| RE38,402 E | 1/2004 | Stephens et al. |
| 6,677,260 B2 | 1/2004 | Crane et al. |
| 6,696,140 B2 | 2/2004 | Suzuki |
| 6,733,543 B2 | 5/2004 | Pyles et al. |
| 6,770,352 B2 | 8/2004 | Suzuki et al. |
| 6,770,692 B1 | 8/2004 | Kobayashi et al. |
| 6,773,816 B2 | 8/2004 | Tsutsumi |
| 6,778,240 B2 | 8/2004 | Nakamura et al. |
| RE38,617 E | 10/2004 | Saito et al. |
| 6,801,360 B2 | 10/2004 | Phillips et al. |
| 6,807,006 B2 | 10/2004 | Nakagoshi |
| 6,811,258 B1 | 11/2004 | Grant |
| 6,811,727 B2 | 11/2004 | Havens et al. |
| 6,849,327 B1 | 2/2005 | Ikuhara et al. |
| 6,852,657 B2 | 2/2005 | Kolberg et al. |
| 6,854,844 B2 | 2/2005 | Kroll et al. |
| 6,863,397 B2 | 3/2005 | Nakano |
| 6,886,937 B2 | 5/2005 | Moravec et al. |
| 6,893,127 B2 | 5/2005 | Reichow et al. |
| 6,908,647 B2 | 6/2005 | Obayashi et al. |
| 6,908,698 B2 | 6/2005 | Yoshida et al. |
| 6,926,405 B2 | 8/2005 | Ambler et al. |
| 6,932,472 B2 | 8/2005 | Marason et al. |
| 6,955,430 B2 | 10/2005 | Pratt |
| 6,979,083 B2 | 12/2005 | Kerns, Jr. et al. |
| 6,984,038 B2 | 1/2006 | Ishak |
| 6,995,891 B2 | 2/2006 | Agrawal et al. |
| 7,029,118 B2 | 4/2006 | Ishak |
| 7,035,010 B2 | 4/2006 | Iori et al. |
| 7,036,932 B2 | 5/2006 | Boulineau et al. |
| 7,048,997 B2 | 5/2006 | Bhalakia et al. |
| 6,984,262 B2 | 6/2006 | King et al. |
| 7,106,509 B2 | 9/2006 | Sharp |
| 7,212,341 B2 | 5/2007 | Ikeyama |
| 7,226,162 B2 | 6/2007 | Mah |
| 7,229,686 B2 | 6/2007 | Yoshikawa et al. |
| 7,255,435 B2 | 8/2007 | Pratt |
| 7,256,921 B2 | 8/2007 | Kumar et al. |
| 7,276,544 B2 | 10/2007 | Lai et al. |
| 7,277,215 B2 | 10/2007 | Greer |
| 7,278,737 B2 | 10/2007 | Mainster et al. |
| 7,349,138 B2 | 3/2008 | Kumar et al. |
| 7,372,640 B2 | 5/2008 | Fung |
| 7,377,639 B2 | 5/2008 | Boulineau et al. |
| 7,393,100 B2 | 7/2008 | Mertz |
| 7,443,608 B2 | 10/2008 | Dillon |
| 7,506,976 B2 | 3/2009 | Baiocchi et al. |
| 7,506,977 B1 | 3/2009 | Aiiso |
| 7,520,608 B2 | 4/2009 | Ishak et al. |
| 7,537,828 B2 | 5/2009 | Coggio et al. |
| 7,556,376 B2 | 7/2009 | Ishak et al. |
| 7,572,513 B2 | 8/2009 | Kutsukake et al. |
| 7,597,441 B1 | 10/2009 | Farwig |
| 7,604,866 B2 | 10/2009 | Ohashi et al. |

(56) References Cited

U.S. PATENT DOCUMENTS

| | | |
|---|---|---|
| 7,656,581 B2 | 2/2010 | Giraudet |
| 7,717,557 B2 | 5/2010 | Kobayashi et al. |
| 7,732,006 B2 | 6/2010 | Alberto de Rojas |
| 7,794,831 B2 | 9/2010 | Faris |
| 7,808,692 B2 | 10/2010 | Karmhag et al. |
| 7,842,204 B2 | 11/2010 | Chiu |
| 7,901,074 B2 | 3/2011 | Yamamoto et al. |
| 7,906,047 B2 | 3/2011 | Chen et al. |
| 7,922,324 B2 | 4/2011 | Ishibashi et al. |
| 7,926,940 B2 | 4/2011 | Blum et al. |
| 7,936,496 B2 | 5/2011 | Kosa et al. |
| 7,964,121 B2 | 6/2011 | Hsu |
| 8,004,057 B2 | 8/2011 | Tian et al. |
| 8,012,386 B2 | 9/2011 | Clere |
| 8,029,705 B2 | 10/2011 | Bhalakia et al. |
| 8,057,716 B2 | 11/2011 | Hsu |
| 8,066,371 B2 | 11/2011 | Miyoshi |
| 8,092,726 B2 | 1/2012 | Hsu |
| 8,177,358 B2 | 5/2012 | Matera et al. |
| 8,210,678 B1 | 7/2012 | Farwig |
| 8,292,430 B2 | 10/2012 | Miyoshi |
| 8,367,211 B2 | 2/2013 | Qin et al. |
| 8,398,234 B2 | 3/2013 | Wang et al. |
| 8,562,130 B2 | 10/2013 | Kosa et al. |
| 8,687,261 B2 | 4/2014 | Gillaspie et al. |
| 8,703,296 B2 † | 4/2014 | Fujinaka |
| 8,733,929 B2 | 5/2014 | Chiou et al. |
| 8,746,879 B2 | 6/2014 | Jiang et al. |
| 8,770,749 B2 | 7/2014 | McCabe et al. |
| 8,911,082 B2 | 12/2014 | Ambler |
| 9,134,547 B2 | 9/2015 | McCabe et al. |
| 9,146,336 B2 | 9/2015 | Matsumoto et al. |
| 9,383,594 B2 | 7/2016 | McCabe et al. |
| 9,575,335 B1 | 2/2017 | McCabe et al. |
| 9,905,022 B1 | 2/2018 | Gordon et al. |
| 9,910,297 B1 | 3/2018 | McCabe et al. |
| 10,073,282 B2 | 9/2018 | Saylor et al. |
| 10,295,821 B2 | 5/2019 | McCabe et al. |
| 10,520,756 B2 | 12/2019 | Gallina et al. |
| 10,571,719 B1 | 2/2020 | McCabe et al. |
| 2001/0005281 A1 | 6/2001 | Yu |
| 2001/0025948 A1 | 10/2001 | Walters et al. |
| 2001/0035935 A1 | 11/2001 | Bhalakia et al. |
| 2002/0034630 A1 | 3/2002 | Cano et al. |
| 2002/0090516 A1 | 7/2002 | Loshak et al. |
| 2002/0135734 A1 | 9/2002 | Reichow et al. |
| 2003/0001991 A1 | 1/2003 | Faris et al. |
| 2003/0020988 A1 | 1/2003 | Stone |
| 2003/0076474 A1 | 4/2003 | Wang et al. |
| 2003/0086159 A1 | 5/2003 | Suzuki et al. |
| 2003/0087087 A1 | 5/2003 | Onozawa et al. |
| 2003/0129422 A1 | 7/2003 | Shirakawa et al. |
| 2004/0005482 A1 | 1/2004 | Kobayashi et al. |
| 2004/0095645 A1 | 5/2004 | Pellicori et al. |
| 2004/0229056 A1 | 11/2004 | Hayashi |
| 2004/0246437 A1 | 12/2004 | Ambler et al. |
| 2005/0007548 A1 | 1/2005 | Ishak |
| 2005/0009964 A1 | 1/2005 | Sugimura et al. |
| 2005/0168690 A1 | 8/2005 | Kawai et al. |
| 2005/0175969 A1 | 8/2005 | Hayes |
| 2005/0201585 A1 | 9/2005 | Jannard et al. |
| 2005/0224703 A1 | 10/2005 | Harada et al. |
| 2005/0233131 A1 | 10/2005 | Nishida et al. |
| 2006/0023160 A1 | 2/2006 | Cartier et al. |
| 2006/0033851 A1 | 2/2006 | Iori et al. |
| 2006/0092374 A1 | 5/2006 | Ishak |
| 2006/0146275 A1 | 7/2006 | Mertz |
| 2006/0147177 A1 | 7/2006 | Jing et al. |
| 2006/0147614 A1 | 7/2006 | Mizuno |
| 2006/0147723 A1 | 7/2006 | Jing et al. |
| 2006/0147724 A1 | 7/2006 | Mizuno |
| 2006/0158881 A1 | 7/2006 | Dowling |
| 2006/0196413 A1 | 11/2006 | Sugimura |
| 2006/0269697 A1 | 11/2006 | Sharp |
| 2006/0269733 A1 | 11/2006 | Mizuno et al. |
| 2007/0097509 A1 | 5/2007 | Nevitt et al. |
| 2007/0122626 A1 | 5/2007 | Qin et al. |
| 2007/0126983 A1 | 6/2007 | Godeau et al. |
| 2007/0195422 A1 | 8/2007 | Begon et al. |
| 2007/0236809 A1 | 10/2007 | Lippey et al. |
| 2007/0285615 A1 | 12/2007 | Yamamoto et al. |
| 2007/0287093 A1 | 12/2007 | Jing et al. |
| 2008/0068555 A1 | 3/2008 | Lau et al. |
| 2008/0074613 A1 | 3/2008 | Phillips |
| 2008/0094566 A1 | 4/2008 | Ishak et al. |
| 2008/0187749 A1 | 8/2008 | Cael et al. |
| 2008/0221674 A1 | 9/2008 | Blum et al. |
| 2008/0278676 A1 | 11/2008 | Croft et al. |
| 2008/0291140 A1 | 11/2008 | Kent et al. |
| 2008/0297879 A1 | 12/2008 | Tonar et al. |
| 2009/0040564 A1 | 2/2009 | Granger |
| 2009/0040588 A1 | 2/2009 | Tonal et al. |
| 2009/0058250 A1 | 3/2009 | Sin et al. |
| 2009/0122261 A1 | 5/2009 | Chou et al. |
| 2009/0128895 A1 | 5/2009 | Seo et al. |
| 2009/0141236 A1 | 6/2009 | Chen et al. |
| 2009/0141359 A1 | 6/2009 | Berni et al. |
| 2009/0152664 A1 | 6/2009 | Klem et al. |
| 2009/0268102 A1 | 10/2009 | Barazza |
| 2010/0003501 A1 | 1/2010 | Liu et al. |
| 2010/0054632 A1 | 3/2010 | McCormick et al. |
| 2010/0066974 A1 | 3/2010 | Croft et al. |
| 2010/0073765 A1 | 3/2010 | Brocheton |
| 2010/0102025 A1 | 4/2010 | Eagerton |
| 2010/0163165 A1 | 7/2010 | Jiang et al. |
| 2010/0232003 A1 | 9/2010 | Baldy et al. |
| 2010/0232021 A1 | 9/2010 | Walker, Jr. et al. |
| 2010/0272990 A1 | 10/2010 | Bondesan et al. |
| 2010/0283956 A1 | 11/2010 | Jackson et al. |
| 2011/0043902 A1 | 2/2011 | Ishibashi et al. |
| 2011/0229660 A1 | 3/2011 | Reynolds |
| 2011/0126345 A1 | 6/2011 | Matsumoto et al. |
| 2011/0164215 A1 | 7/2011 | Coco Martin |
| 2011/0205627 A1 | 8/2011 | Kobuchi et al. |
| 2011/0211154 A1 | 9/2011 | Aoyama et al. |
| 2011/0255051 A1 | 10/2011 | McCabe et al. |
| 2012/0015111 A1 | 1/2012 | Mishina et al. |
| 2012/0044560 A9 | 2/2012 | Lam et al. |
| 2012/0137398 A1 | 6/2012 | Arnold |
| 2012/0137414 A1 | 6/2012 | Saylor |
| 2012/0217664 A1 | 8/2012 | Saitou et al. |
| 2012/0236249 A1 | 9/2012 | Miwa et al. |
| 2012/0236255 A1 | 9/2012 | Jiang et al. |
| 2012/0287395 A1 | 11/2012 | Tamura et al. |
| 2013/0107563 A1 | 5/2013 | McCabe et al. |
| 2013/0120821 A1 | 5/2013 | Chandrasekhar |
| 2013/0127078 A1 | 5/2013 | Qin et al. |
| 2013/0141693 A1 | 6/2013 | McCabe et al. |
| 2013/0161846 A1 | 6/2013 | Goodenough et al. |
| 2013/0235452 A1 | 9/2013 | You et al. |
| 2014/0036227 A1 | 2/2014 | Tamura et al. |
| 2014/0093661 A1 | 4/2014 | Trajkovska et al. |
| 2014/0232983 A1 | 8/2014 | Tokumaru et al. |
| 2014/0233105 A1 | 8/2014 | Schmeder |
| 2014/0268283 A1 | 9/2014 | Chandrasekhar |
| 2014/0334000 A1 | 11/2014 | Clerc et al. |
| 2015/0022777 A1 | 1/2015 | McCabe et al. |
| 2015/0109651 A1 | 4/2015 | Branda et al. |
| 2015/0131047 A1 | 5/2015 | Saylor et al. |
| 2015/0219931 A1 | 8/2015 | Grasso |
| 2015/0241602 A1 | 8/2015 | Avetisian, Sr. et al. |
| 2015/0374550 A1 | 9/2015 | Saylor |
| 2015/0272260 A1 | 10/2015 | Ryan et al. |
| 2015/0277146 A1 | 10/2015 | Crespo Vazquez et al. |
| 2015/0277150 A1 | 10/2015 | Granger et al. |
| 2015/0286073 A1 | 10/2015 | Blum |
| 2015/0362817 A1 | 12/2015 | Patterson et al. |
| 2016/0033837 A1 | 2/2016 | Bjornard et al. |
| 2016/0041408 A1 | 2/2016 | Carlson et al. |
| 2016/0048037 A1 | 2/2016 | McCabe et al. |
| 2016/0070119 A1 | 3/2016 | McCabe et al. |
| 2016/0185055 A1 † | 6/2016 | Guadagnin |
| 2016/0231595 A1 | 8/2016 | Grasso |
| 2016/0334644 A1 | 11/2016 | Garofolo et al. |

(56) References Cited

U.S. PATENT DOCUMENTS

| | | |
|---|---|---|
| 2016/0377886 A1 | 12/2016 | Quiroga et al. |
| 2017/0068113 A1 | 3/2017 | McCabe et al. |
| 2017/0075143 A1 | 3/2017 | Saylor et al. |
| 2017/0102558 A1 | 4/2017 | Saylor et al. |
| 2017/0205639 A1 | 7/2017 | McCabe et al. |
| 2017/0235160 A1 | 8/2017 | Larson |
| 2018/0290408 A1 | 10/2018 | Park et al. |
| 2018/0299599 A1 | 10/2018 | Kumar et al. |
| 2018/0299600 A1 | 10/2018 | Miller et al. |
| 2018/0299702 A1 | 10/2018 | Nguyen et al. |
| 2019/0025611 A1 | 1/2019 | Saylor et al. |
| 2019/0121164 A1 | 4/2019 | Grasso |
| 2019/0278079 A1 | 9/2019 | McCabe et al. |
| 2020/0081270 A1 | 3/2020 | McCabe et al. |
| 2020/0081271 A1 | 3/2020 | McCabe et al. |
| 2020/0096792 A1 | 3/2020 | McCabe et al. |

FOREIGN PATENT DOCUMENTS

| | | |
|---|---|---|
| CN | 101772723 A | 7/2010 |
| CN | 102124394 A | 7/2011 |
| CN | 103645568 A | 3/2014 |
| CN | 204378029 U | 6/2015 |
| DE | 3534575 | 4/1986 |
| EP | 0 127 821 | 12/1984 |
| EP | 0 519 660 | 12/1992 |
| EP | 1 460 473 B1 | 8/2007 |
| EP | 1 986 024 | 10/2008 |
| EP | 2 492 723 | 8/2012 |
| EP | 2 799 514 A1 | 11/2014 |
| FR | 2812629 | 2/2002 |
| GB | 1154500 | 6/1969 |
| GB | 2522389 A | 7/2015 |
| JP | S62-123621 U | 8/1987 |
| JP | S63-008703 | 1/1988 |
| JP | H01-209423 A | 8/1989 |
| JP | H02-132417 | 5/1990 |
| JP | H04-72347 A | 3/1992 |
| JP | H05-202109 | 8/1993 |
| JP | H06-300992 A | 10/1994 |
| JP | H09-43550 A | 2/1997 |
| JP | 2000-258625 A | 9/2000 |
| JP | 2001-506012 | 5/2001 |
| JP | 2004-524558 A | 8/2004 |
| JP | 2006-031030 A | 2/2006 |
| JP | 2007-025609 | 2/2007 |
| JP | 2008-304677 A | 12/2008 |
| JP | 2009-058959 A | 3/2009 |
| JP | 2009-128912 A | 6/2009 |
| JP | 2010-204383 | 9/2010 |
| JP | 2010-262112 A | 11/2010 |
| JP | 2011-175176 A | 9/2011 |
| JP | 4987297 B2 † | 7/2012 |
| JP | 2013-011840 A | 1/2013 |
| JP | 2014-531058 A | 11/2014 |
| WO | WO 88/002871 | 4/1988 |
| WO | WO 97/035215 | 9/1997 |
| WO | WO 99/067681 | 12/1999 |
| WO | WO 02/014930 | 2/2002 |
| WO | WO 02/042629 A1 | 5/2002 |
| WO | WO 02/059684 A2 | 8/2002 |
| WO | WO 02/076632 | 10/2002 |
| WO | WO 03/058294 A2 | 7/2003 |
| WO | WO 2004/031813 A1 | 4/2004 |
| WO | WO 2008/014225 | 1/2008 |
| WO | WO 2008/110045 | 9/2008 |
| WO | WO 2008/118967 A1 | 10/2008 |
| WO | WO 2009/011439 | 1/2009 |
| WO | WO 2009/152381 | 12/2009 |
| WO | WO 2010/111499 | 9/2010 |
| WO | WO 2010/142019 A1 | 12/2010 |
| WO | WO 2011/127015 | 10/2011 |
| WO | WO 2011/130314 | 10/2011 |
| WO | WO 2012/119158 | 9/2012 |
| WO | WO 2013/051489 A1 | 4/2013 |
| WO | WO 2013/070417 | 5/2013 |
| WO | WO 2013/074269 | 5/2013 |
| WO | WO 2013/123592 A1 | 8/2013 |
| WO | WO 2013/169987 | 11/2013 |
| WO | WO 2013/177676 A1 | 12/2013 |
| WO | WO 2014/011581 A2 | 1/2014 |
| WO | WO 2014/022049 A1 | 2/2014 |
| WO | WO 2014/055513 | 4/2014 |
| WO | WO 2015/044006 | 4/2015 |
| WO | WO 2012/079160 A1 | 6/2015 |
| WO | WO 2015/170133 A1 | 11/2015 |
| WO | WO 2015/179538 | 11/2015 |
| WO | WO 2016/054198 A1 | 4/2016 |
| WO | WO 2016/077431 | 5/2016 |
| WO | WO 2016/145064 A1 | 9/2016 |
| WO | WO-2016/148984 A1 | 9/2016 |
| WO | WO 2016/205757 A1 | 12/2016 |
| WO | WO 2017/099800 | 6/2017 |
| WO | WO 2019/077585 A1 | 10/2018 |

OTHER PUBLICATIONS

British Standard, "Personal Eye-Equipment—Sunglasses and Sunglare Filters for General Use and Filters for Direct Observation of the Sun," Technical Committee CEN/TC 85, Sep. 2007, pp. 46.

Caswell, "Serious Shades: High style gives way to high tech as new performance sunglasses become sophisticated optical instruments", Jul. 1988, vol. 165, No. 7, pp. 76-78.

Drum, Bruce, "FDA Regulation of Labeling and Promotional Claims in Therapeutic Color Vision Devices: A Tutorial," Visual Neuroscience, May 2004, vol. 21, No. 3, pp. 461-463.

Encyclopedia of Polymer Science and Technology—Plastics, Resins, Rubbers, Fibers, edited by Mark, H. et al, vol. 9, John Wiley & Sons, 1968, USAA, pp. 6.

Exciton, "Product List", as archived Aug. 28, 2010 on archive.org in 2 pages.

Golz et al., "Colorimetry for CRT displays," Journal of the Optical Society of America A, vol. 20, No. 5, May 2003, pp. 769-781.

Kirkpatrick et al., "Optimization by Simulated Annealing," Science, New Series, May 13, 1983, vol. 220, No. 4598, pp. 671-680.

Linear Programming, Feb. 28, 2011, http://en.wikipedia.org/w/index.php?title=Linear_programmming&oldid=416428507, pp. 14.

Maui Jim, "All Sunglasses", as archived Mar. 30, 2009 on archive.org in 2 pages.

Moreland et al., "Quantitative Assessment of Commercial Filter Aids for Red-Green Colour Defectives," Ophthalmic and Physiological Optics, The Journal of the College of Optometrists, Sep. 2010, vol. 30, No. 5, pp. 685-692.

Nakamura et al, "Diffusion Coefficients of Disperse Dye to PE and PET Films in Supercritical Carbon Dioxide", School of Natural System, College of Science and Engineering, Kanazawa University, Japan, Proceedings of 9th International Symposium on Super Critical Fluids, May 18-20, 2009, Arachon, France, pp. 6.

"Product Description: Lagoon Sunglasses", Maui Jim website, printed on Feb. 18, 2014, web address: http://www.mauijim.com/lagoon.html, page was publicly available at least as early as Nov. 2009.

Rea et al., "Color Rendering: Beyond Pride and Prejudice," Color Research & Application, Dec. 2010, vol. 35, No. 6, pp. 401-409.

Sharp et al., "Retarder Stack Technology for Color Manipulation," SID Symposium Digest of Technical Papers, May 1999, vol. 30, No. 1, pp. 1072-1075.

Stockman et al., "The Spectral Sensitivities of the Middle- and Long-Wavelength-Sensitive Cones Derived from Measurements in Observers of known Genotype," Vision Research, vol. 40, Jun. 2000, pp. 1711-1737.

Swillam et al., "The Design of Multilayer Optical Coatings Using Convex Optimization," Journal of Lightwave Technology, Apr. 2007, vol. 25, No. 4, pp. 1078-1085.

Tilsch et al., "Manufacturing of Precision Optical Coatings," Chinese Optics Letters, Apr. 30, 2010, vol. 8, Supplement, pp. 38-43.

Vorobyev et al., "Receptor Noise as a Determinant of Colour Thresholds," Proceedings of the Royal Society of London B, Mar. 1998, vol. 265, pp. 351-358.

(56) References Cited

OTHER PUBLICATIONS

X-Rite, "A Guide to Understanding Color Communication", Mar. 2007, pp. 1-26, available at http://www.xrite.com/-/media/xrite/files/whitepaper_pdfs/l10-001_a_guide_to_understanding_color_communication/l10-001_understand_color_en.pdf.
International Search Report and Written Opinion dated Aug. 22, 2011 in PCT Application No. US/2011/32172.
International Preliminary Report on Patentability and Written Opinion dated Oct. 16, 2012 in PCT Application No. US/2011/32172.
International Search Report and Written Opinion dated Feb. 5, 2013, in PCT Application No. PCT/US2012/061060.
International Preliminary Report on Patentability and Written Opinion dated Apr. 22, 2014, in PCT Application No. PCT/US2012/061060.
International Search Report and Written Opinion dated May 2, 2016 in PCT Application No. PCT/US2015/060103.
International Preliminary Report on Patentability and Written Opinion dated May 26, 2017, in PCT Application No. PCT/US2015/060103.
International Search Report and Written Opinion dated Oct. 7, 2015, in PCT Application No. PCT/US2015/031805.
International Preliminary Report on Patentability and Written Opinion dated Dec. 8, 2016, in PCT Application No. PCT/US2015/031805.
International Search Report and Written Opinion dated Jun. 1, 2016, in PCT Application No. PCT/US2015/065311.
International Search Report and Written Opinion dated Jul. 27, 2012, in PCT Application No. PCT/US2012/027790.
International Preliminary Report on Patentability and Written Opinion dated Sep. 3, 2013, in PCT/US2012/027790.
International Search Report and Written Opinion, dated Apr. 12, 2019 in Related PCT Application No. PCT/IB2019/050824; 11 pages.
Wilson, Carrie, "The How and Why of AR Coating," EyeCare Professional Magazine, Oct. 2010 Issue, retrieved on Oct. 9, 2013 from Internet at www.ecpmag.com.
International Search Report and Written Opinion dated Sep. 16, 2013, International Application No. PCT/US2013/040284, filed May 9, 2013.
International Preliminary Report on Patentability and Written Opinion dated Nov. 20, 2014, in PCT/US2013/040284.
International Search Report and Written Opinion dated Jan. 13, 2016, in PCT Application No. PCT/US2015/053206.
International Preliminary Report on Patentability and Written Opinion dated Apr. 13, 2017, in PCT Application No. PCT /US2015/053206.
Maui Jim, "Terms of Use of This Website/Application," Oct. 22, 2018; 2 pgs.
A product page that describes the Maui Jim Lagoon 189-02 lens product as containing "PolarizedPlus® 2," Sep. 21, 2012.
Lucatorto et al., Experimental Methods in the Physical Sciences, Chapter 2, Elsevier Inc. (2014), pp. 11-66.
Sakamoto, Yasuo, "Light Shielding and Visual Function—Challenge to Light-Shielding Glasses with Clear Color Lens," Journal of the Japanese Society for Cataract Research, vol. 22, pp. 24-28 (2010), with attached English machine translation.
"Absorber Dyes." Selective Visible and Infrared Absorbers—Absorber Dyes, 2009, exciton.luxottica.com/selective-visible-and-infrared-absorbers.html.
Extended European Search Report issued in counterpart European Patent Application No. EP 17 18 6801, dated Feb. 7, 2018.
New dual layer cellulose acetate anti fog lens rimless fashionable snow goggles (http://hubosports.en.alibaba.com/product/60119246566-215413686/New_dual_layer_cellulose_acetate_anti_fog_lens_rimless_fashionable_snow_goggles.html).
International Search Report and Written Opinion, dated Jan. 18, 2019 in International Application No. PCT/IB2018/058172; 19 pages.
Notice of Reasons for Refusal, dated Jun. 30, 2020 in Japanese Application No. JP 2019-143054, with attached English machine translation; 11 pages.

† cited by third party

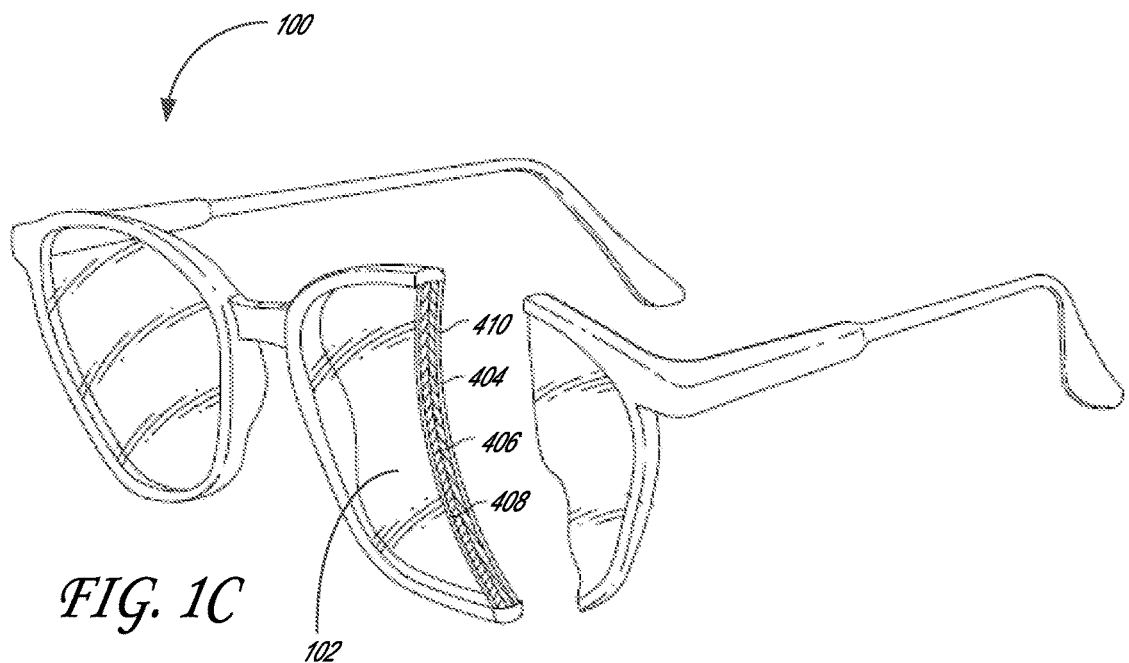
FIG. 1C
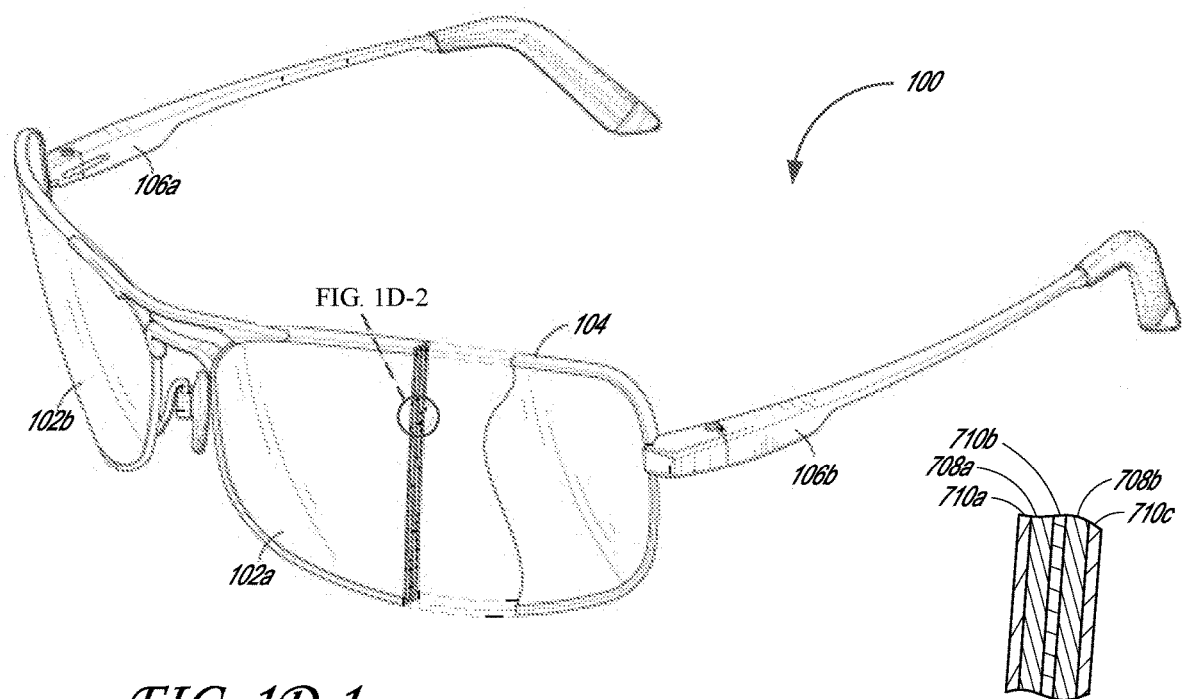
FIG. 1D-1
FIG. 1D-2

EYEWEAR AND LENSES WITH MULTIPLE MOLDED LENS COMPONENTS

BACKGROUND

Field

This disclosure relates generally to eyewear and more particularly to lenses used in eyewear.

Description of Related Art

Lenses for eyewear can be made of various materials, including varieties of glass or transparent plastic. Plastic lenses can be produced using a variety of processes, including, for example, casting, compression molding, and injection molding. Some types of eyewear include an optical filter that attenuates light in one or more spectral regions. Optical filters can be made from materials that absorb and/or reflect light, including dyes, dopants, other chromophores, coatings, and so forth.

SUMMARY

Example embodiments described herein have several features, no single one of which is indispensable or solely responsible for their desirable attributes. Without limiting the scope of the claims, some of the advantageous features will now be summarized.

Embodiments disclosed herein include lenses for eyewear with a molded wafer and a molded clear resin lens component. The wafer and/or the lens component can be made by injection molding, casting, compression molding, and other molding techniques, and comprised of materials appropriate for such processes. For example, in various embodiments described herein, one or more components (e.g. the wafer) of the lens can be formed by injection molding and used as an insert for injection insert molding with other components (e.g., the resin lens component) of the lens. In various embodiments, one or more components of the lens can be formed by casting and used as an insert for cast molding with other components of the lens. In various embodiments, one or more components of the lens can be formed by casting and used as an insert for injection molding with other components of the lens. In various embodiments, one or more components of the lens can be formed by injection molding and used as an insert for cast molding with other components of the lens.

In various embodiments, the resin lens component can be integrated with or molded onto a surface (e.g., a concave surface) of the molded wafer. In various implementations, the molded wafer can include an optical filter that enhances one or more properties of filtered light. The optical filter can be, for example, a contrast-enhancing, color-enhancing, and/or chroma-enhancing filter. In such implementations, the molded wafer can be referred to as a chroma enhancement wafer or an optical filter wafer. The clear resin lens component can be shaped such that the lens has optical power. In some embodiments, the molded wafer is integrated with a surface (e.g., a concave surface) of a polarizing wafer to form an integrated functional wafer system. The molded wafer can be integrated with the polarizing wafer by casting or injection molding, by using, for example, insert molding methods in which the polarizing wafer serves as the insert. The integrated functional wafer system can be integrated with the resin lens component via casting or injection molding, by using, for example, insert molding methods in which the integrated wafer serves as the insert and the resin lens component is molded thereon. The resin lens component can be molded thereon via casting or injection molding methods. In various implementations, the resin lens component can be referred to as a base layer.

In certain embodiments, the resin lens component is not clear but instead contains a portion of the optical filter. For example, one or more chroma enhancing dyes can be included in the resin lens component and/or in the molded wafer. In some embodiments comprising a chroma-enhancing filter, all of the chroma enhancing dyes can be included in the molded wafer.

In various embodiments of the lenses, a lens wafer comprising an optical filter that enhances one or more properties of filtered light, such as, for example, a contrast-enhancing, color-enhancing, and/or chroma-enhancing filter can include cast materials comprising one or more chroma-enhancing dyes or chromophores. The cast lens wafer can be integrated with the resin lens component via casting or injection molding, by using, for example, insert molding methods in which the cast lens wafer serves as the insert and the resin lens component is molded thereon. The resin lens component can be molded thereon via casting or injection molding methods.

In various embodiments of the lenses, a lens wafer comprising an optical filter that enhances one or more properties of filtered light, such as, for example, a contrast-enhancing, color-enhancing, and/or chroma-enhancing filter can include injection molded materials comprising one or more chroma-enhancing dyes or chromophores. The injection molded lens wafer can be integrated with a resin lens component via casting or injection molding, by using, for example, insert molding methods in which the injection molded lens wafer serves as the insert and the resin lens component is molded thereon. The resin lens component can be molded thereon via casting or injection molding methods.

In various embodiments, the cast or injection molded wafer including such light enhancing optical filter (e.g., a CE wafer) can first be integrated with a wafer including a polarizing component (i.e., polarizing wafer) before integrating with resin lens component. The polarizing wafer can serve as the insert in a mold cavity receiving the materials that are molded into the cast or injection molded CE wafer. The integrated CE wafer and polarizing wafer can be integrated with a resin lens component via casting or injection molding, by using, for example, insert molding methods in which the integrated CE wafer and polarizing wafer serves as the insert and the resin lens component is molded thereon. The resin lens component can be molded thereon via casting or injection molding methods.

One innovative aspect of the disclosure can be implemented in an eyewear comprising a lens configured to provide nonzero prescription optical power between −25.0 Diopter and +25.0 Diopter. The lens comprises a base layer having a convex surface and a concave surface shaped to provide the lens with the nonzero optical power and an optical filter wafer having a thickness less than 1.1 mm. The optical filter wafer can be integrated (e.g., monolithically integrated) with the convex surface of the base layer. The optical filter can have a blue light absorbance peak with a spectral bandwidth. The blue light absorbance peak can include a maximum absorbance; a center wavelength located at a midpoint of the spectral bandwidth; and an integrated absorptance peak area within the spectral bandwidth.

In various implementations, the spectral bandwidth can be equal to the full width of the blue light absorbance peak at 80% of the maximum absorbance of the blue light absorbance peak. In some implementations, the spectral bandwidth can be equal to the full width of the blue light absorbance peak at 50%-90% of the maximum absorbance of the blue light absorbance peak. In various implementations, the full width of the blue light absorbance peak at 50% of the maximum absorbance of the blue light absorbance peak can be greater than the full width of the blue light absorbance peak at 80% of the maximum absorbance of the blue light absorbance peak by an amount between 2-30 nm.

In various implementations, the center wavelength of the blue light absorbance peak can be between 440 nm and 500 nm. For example, the center wavelength of the blue light absorbance peak can be between 440 nm and 450 nm, between 445 nm and between 455 nm, between 450 nm and between 460 nm, between 455 nm and between 465 nm, between 460 nm and between 470 nm, between 465 nm and between 475 nm, between 470 nm and between 480 nm, between 475 nm and between 485 nm, between 480 nm and between 490 nm, between 485 nm and between 485 nm and/or between 490 nm and between 500 nm.

In various implementations, an attenuation factor of the blue light absorbance peak can be greater than or equal to about 0.8 and less than 1.0, wherein the attenuation factor of the blue light absorbance peak is obtained by dividing an integrated absorptance peak area within the spectral bandwidth by the spectral bandwidth of the blue light absorbance peak.

Various implementations of the optical filter can have a yellow light absorbance peak with a spectral bandwidth. The yellow light absorbance peak can include a maximum absorbance; a center wavelength located at a midpoint of the spectral bandwidth; and an integrated absorptance peak area within the spectral bandwidth. The spectral bandwidth of the yellow light absorbance peak can be equal to the full width of the yellow light absorbance peak at 80% of the maximum absorbance of the yellow light absorbance peak. In some implementations, the yellow light absorbance peak can be equal to the full width of the yellow light absorbance peak at 50%-90% of the maximum absorbance of the yellow light absorbance peak. In various implementations, the full width of the yellow light absorbance peak at 50% of the maximum absorbance of the yellow light absorbance peak can be greater than the full width of the yellow light absorbance peak at 80% of the maximum absorbance of the yellow light absorbance peak by an amount between 2-30 nm.

In various implementations, the center wavelength of the yellow light absorbance peak can be between 560 nm and 585 nm. For example, the center wavelength of the yellow light absorbance peak can be between 560 nm and 570 nm, between 565 nm and 575 nm, between 570 nm and 580 nm, and/or between 575 nm and 585 nm. In some implementations, the center wavelength of the yellow light absorbance peak can be between 560 nm and 600 nm. In various implementations, the optical filter wafer can have a red light absorbance peak with a spectral bandwidth. A center wavelength located at a midpoint of the spectral bandwidth of the red light absorbance peak can be between 630 nm and 680 nm.

In various implementations, an attenuation factor of the yellow light absorbance peak can be greater than or equal to about 0.8 and less than 1.0, wherein the attenuation factor of the yellow light absorbance peak is obtained by dividing an integrated absorptance peak area within the spectral bandwidth by the spectral bandwidth of the yellow light absorbance peak.

The optical filter can comprise one or organic dyes. The optical filter can comprise one or more chroma enhancement dyes. For example, the optical filter can comprise a violet, blue, green, yellow, or red chroma enhancement dye. In various implementations, the spectral bandwidth of the blue light absorbance peak can be greater than or equal to about 10 nm. In various implementations, the spectral bandwidth of the blue light can be less than or equal to about 60 nm. The optical filter can be configured to increase the average chroma value of uniform intensity light stimuli having a bandwidth of 30 nm transmitted through the optical filter within a spectral range of 440 nm to 510 nm by an amount greater than or equal to 5% as compared to a neutral filter that uniformly attenuates the same average percentage of light as the optical filter within the spectral range of 440 nm to 510 nm. For example, the optical filter can be configured to increase the average chroma value of uniform intensity light stimuli having a bandwidth of 30 nm transmitted through the optical filter within a spectral range of 440 nm to 510 nm by an amount greater than or equal to 8%, 10%, 14%, 18%, 20% or 25% as compared to a neutral filter that uniformly attenuates the same average percentage of light as the optical filter within the spectral range of 440 nm to 510 nm.

Various implementations of the eyewear can include a polarizing wafer comprising a first insulating polymeric layer; a second insulating polymeric layer; and a polarizing film disposed between the first insulating polymeric layer and the second insulating polymeric layer. The first or the second insulating polymeric layer can comprise a stretched polycarbonate sheet. The polarizing wafer can be disposed between the optical filter and the base layer. The optical filter wafer can have a thickness greater than 0.3 mm. In various implementations, the base layer can comprise a clear material.

One innovative aspect of the disclosure can be implemented in an eyewear comprising a lens with optical power. The lens comprises a base layer having a concave boundary. The concave boundary of the base layer can be surfaced to provide the lens with a desired amount of optical power. For example, the lens can have an optical power between −25 Diopters and 25 Diopters. The base layer can comprise a castable material. The lens further comprises a functional wafer system having a concave boundary conformed to a convex boundary of the base layer. The functional wafer system can have a thickness less than 1.7 mm. The functional wafer system can be integrated (e.g., monolithically integrated) with the base layer. In various implementations, the functional wafer can have a thickness greater than 0.8 mm.

The functional wafer system can include a polarizer wafer; and a chroma enhancement wafer. The chroma enhancement wafer can comprise one or more chroma enhancement dyes disposed in a synthetic resinous material. The chroma enhancement wafer can be configured to increase the average chroma value of uniform intensity light stimuli having a bandwidth of 30 nm transmitted through the chroma enhancement wafer within a spectral range of 440 nm to 510 nm as compared to a neutral filter that uniformly attenuates the same average percentage of light as the chroma enhancement wafer within the spectral range of 440 nm to 510 nm. For example, the chroma enhancement wafer can be configured to increase the average chroma value of uniform intensity light stimuli having a bandwidth of 30 nm transmitted through the chroma enhancement wafer within a spectral range of 440 nm to 510 nm by an amount between about 5%-35% as compared to a neutral filter that uniformly attenuates the same average percentage of light as the chroma enhancement wafer within the spectral range of 440 nm to 510 nm.

The polarizer wafer can comprise a first insulating polymeric layer; a second insulating polymeric layer; and a polarizing film disposed between the first insulating polymeric layer and the second insulating polymeric layer. The first or the second insulating polymeric layer can comprise a stretched polycarbonate sheet. The chroma enhancement wafer can be integrated (e.g., monolithically integrated) with the first or the second insulating polymeric layer. The chroma enhancement wafer can have a concave boundary conformed to the convex boundary of the base layer and the polarizer wafer can have a concave boundary conformed to a convex boundary of the chroma enhancement wafer.

Various implementations of the chroma enhancement wafer can have a blue light absorbance peak with a spectral bandwidth. The blue light absorbance peak can include a maximum absorbance; a center wavelength located at a midpoint of the spectral bandwidth; and an integrated absorptance peak area within the spectral bandwidth. The spectral bandwidth is equal to the full width of the blue light absorbance peak at 80% of the maximum absorbance of the blue light absorbance peak. The center wavelength of the blue light absorbance peak can be between 440 nm and 500 nm. An attenuation factor of the blue light absorbance peak can be greater than or equal to about 0.8 and less than 1.0, wherein the attenuation factor of the blue light absorbance peak is obtained by dividing an integrated absorptance peak area within the spectral bandwidth by the spectral bandwidth of the blue light absorbance peak. In various implementations, the chroma enhancement wafer can have a yellow light absorbance peak with a spectral bandwidth and/or a red light absorbance peak. A center wavelength located at a midpoint of the spectral bandwidth of the yellow light absorbance peak can be between 560 nm and 590 nm. A center wavelength located at a midpoint of the spectral bandwidth of the red light absorbance peak can be between 630 nm and 680 nm.

The chroma enhancement wafer can have a thickness greater than or equal to about 0.3 mm and less than or equal to about 1.1 mm. The polarizer wafer can have a thickness greater than or equal to about 0.6 mm and less than or equal to about 0.8 mm. The polarizer wafer and the chroma enhancement wafer can be integrated via insert molding or multiple-shot injection molding process.

BRIEF DESCRIPTION OF THE DRAWINGS

Various embodiments are depicted in the accompanying drawings for illustrative purposes, and should in no way be interpreted as limiting the scope of the claims. In addition, various features of different disclosed embodiments can be combined to form additional embodiments, which are part of this disclosure. Any feature or structure can be removed or omitted. Throughout the drawings, reference numbers can be reused to indicate correspondence between reference elements.

FIG. 1C is a perspective view of a pair of spectacles incorporating lenses with a chroma-enhancing optical filter with a cutaway view of one of the lenses.

FIGS. 1D-1 and 1D-2 show a perspective view of eyewear with a portion cut away to show an example configuration of lens elements.

FIG. 2 illustrates a lens with a molded wafer and a clear lens body.

DETAILED DESCRIPTION OF CERTAIN EMBODIMENTS

Figure 1A:
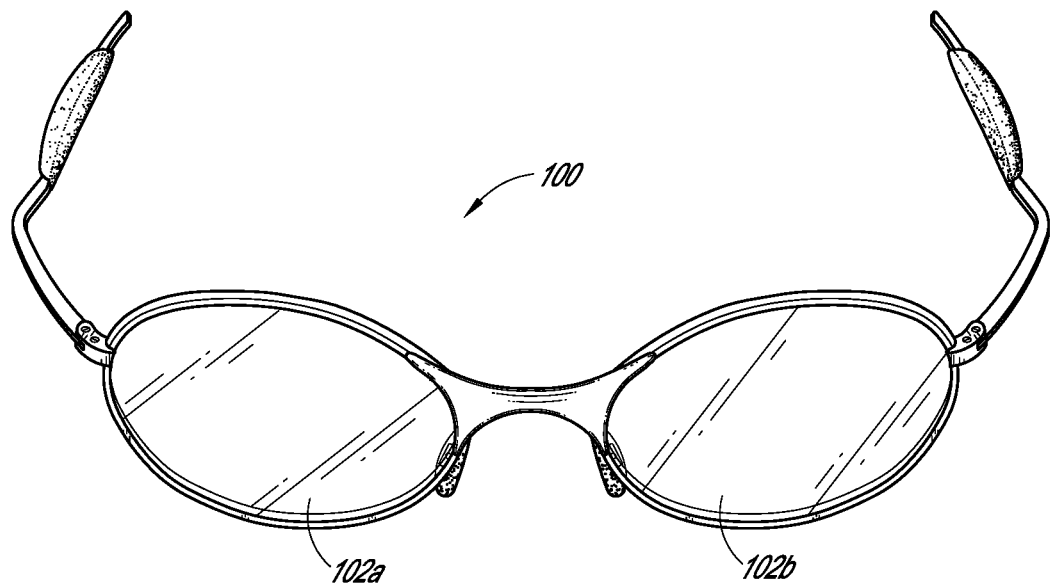
FIG. 1A is a perspective view of a pair of spectacles incorporating lenses with a chroma-enhancing optical filter.

Although certain preferred embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Objects that humans can visually observe in the environment typically emit, reflect, or transmit visible light from one or more surfaces. The surfaces can be considered an array of points that the human eye is unable to resolve any more finely. Each point on the surfaces does not emit, reflect, or transmit a single wavelength of light; rather, it emits, reflects, or transmits a broad spectrum of wavelengths that are interpreted as a single color in human vision. Generally speaking, if one were to observe the corresponding "single wavelength" of light for that interpreted color (for example, a visual stimulus having a very narrow spectral bandwidth, such as 1 nm), it would appear extremely vivid when compared to a color interpreted from a broad spectrum of observed wavelengths.

An optical filter can be configured to remove the outer portions of a broad visual stimulus to make colors appear more vivid as perceived in human vision. The outer portions of a broad visual stimulus refer to wavelengths that, when substantially, nearly completely, or completely attenuated, decrease the bandwidth of the stimulus such that the vividness of the perceived color is increased. An optical filter for eyewear can be configured to substantially increase the colorfulness, clarity, and/or vividness of a scene. Such an optical filter for eyewear can allow the wearer to view the scene in high definition color (HD color). In some embodiments, portions of a visual stimulus that are not substantially attenuated include at least the wavelengths for which cone photoreceptor cells in the human eye have the greatest sensitivity. In certain embodiments, the bandwidth of the color stimulus when the optical filter is applied includes at least the wavelengths for which the cone photoreceptor cells have the greatest sensitivity. In some embodiments, a person wearing a lens incorporating an optical filter disclosed herein can perceive a substantial increase in the clarity of a scene. The increase in perceived clarity can result, for example, from increased contrast, increased chroma, or a combination of factors.

The vividness of interpreted colors is correlated with an attribute known as the chroma value of a color. The chroma value is one of the attributes or coordinates of the CIE L*C*h* color space. Together with attributes known as hue and lightness, the chroma can be used to define colors that are perceivable in human vision. It has been determined that visual acuity is positively correlated with the chroma values of colors in an image. In other words, the visual acuity of an observer is greater when viewing a scene with high chroma value colors than when viewing the same scene with lower chroma value colors.

An optical filter can be configured to enhance the chroma profile of a scene when the scene is viewed through a lens that incorporates the optical filter. The optical filter can be configured to increase or decrease chroma in one or more chroma enhancement windows in order to achieve any desired effect. The chroma-enhancing optical filter can be configured to preferentially transmit or attenuate light in any desired chroma enhancement windows. Any suitable process can be used to determine the desired chroma enhancement windows. For example, the colors predominantly reflected or emitted in a selected environment can be measured, and a filter can be adapted to provide chroma enhancement in one or more spectral regions corresponding to the colors that are predominantly reflected or emitted.

FIG. 1 illustrates an eyewear 100 includes lenses 102a, 102b having a chroma-enhancing optical filter. The chroma-enhancing filter generally changes the colorfulness of a scene viewed through one or more lenses 102a, 102b, compared to a scene viewed through a lens with the same luminous transmittance but a different spectral transmittance profile. The eyewear can be of any type, including general-purpose eyewear, special-purpose eyewear, sunglasses, driving glasses, sporting glasses, indoor eyewear, outdoor eyewear, vision-correcting eyewear, contrast-enhancing eyewear, eyewear designed for another purpose, or eyewear designed for a combination of purposes.

The lenses 102a and 102b can be corrective lenses or non-corrective lenses and can be made of any of a variety of optical materials including glasses or plastics such as acrylics or polycarbonates. The lenses can have various shapes. For example, the lenses 102a, 102b can be flat, have 1 axis of curvature, 2 axes of curvature, or more than 2 axes of curvature, the lenses 102a, 102b can be cylindrical, parabolic, spherical, flat, or elliptical, or any other shape such as a meniscus or catenoid. When worn, the lenses 102a, 102b can extend across the wearer's normal straight ahead line of sight, and can extend substantially across the wearer's peripheral zones of vision. As used herein, the wearer's normal line of sight shall refer to a line projecting straight ahead of the wearer's eye, with substantially no angular deviation in either the vertical or horizontal planes. In some embodiments, the lenses 102a, 102b extend across a portion of the wearer's normal straight ahead line of sight.

The outside surface of lenses 102a or 102b can conform to a shape having a smooth, continuous surface having a constant horizontal radius (sphere or cylinder) or progressive curve (ellipse, toroid or ovoid) or other aspheric shape in either the horizontal or vertical planes. The geometric shape of other embodiments can be generally cylindrical, having curvature in one axis and no curvature in a second axis. The lenses 102a, 102b can have a curvature in one or more dimensions. For example, the lenses 102a, 102b can be curved along a horizontal axis. As another example, lenses 102a, 102b can be characterized in a horizontal plane by a generally arcuate shape, extending from a medial edge throughout at least a portion of the wearer's range of vision to a lateral edge. In some embodiments, the lenses 102a, 102b are substantially linear (not curved) along a vertical axis. In some embodiments, the lenses 102a, 102b have a first radius of curvature in one region, a second radius of curvature in a second region, and transition sites disposed on either side of the first and second regions. The transition sites can be a coincidence point along the lenses 102a, 102b where the radius of curvature of the lenses 102a, 102b transitions from the first to the second radius of curvature, and vice versa. In some embodiments, lenses 102a, 102b can have a third radius of curvature in a parallel direction, a perpendicular direction, or some other direction. In some embodiments, the lenses 102a, 102b can lie on a common circle. The right and left lenses in a high-wrap eyeglass can be canted such that the medial edge of each lens will fall outside of the common circle and the lateral edges will fall inside of the common circle. Providing curvature in the lenses 102a, 102b can result in various advantageous optical qualities for the wearer, including reducing the prismatic shift of light rays passing through the lenses 102a, 102b, and providing an optical correction.

A variety of lens configurations in both horizontal and vertical planes are possible. Thus, for example, either the outer or the inner or both surfaces of the lens 102a or 102b of some embodiments can generally conform to a spherical shape or to a right circular cylinder. Alternatively either the outer or the inner or both surfaces of the lens may conform to a frusto-conical shape, a toroid, an elliptic cylinder, an ellipsoid, an ellipsoid of revolution, other asphere or any of a number of other three dimensional shapes. Regardless of the particular vertical or horizontal curvature of one surface, however, the other surface may be chosen such as to minimize one or more of power, prism, and astigmatism of the lens in the mounted and as-worn orientation.

The lenses 102a, 102b can be linear (not curved) along a vertical plane (e.g., cylindrical or frusto-conical lens geometry). In some embodiments, the lenses 102a, 102b can be aligned substantially parallel with the vertical axis such that the line of sight is substantially normal to the anterior surface and the posterior surface of the lenses 102a, 102b. In some embodiments, the lenses 102a, 102b are angled downward such that a line normal to the lens is offset from the straight ahead normal line of sight by an angle $\phi$. The angle $\phi$ of offset can be greater than about 0° and/or less than about 30°, or greater than about 70° and/or less than about 20°, or about 15°, although other angles $\phi$ outside of these ranges may also be used. Various cylindrically shaped lenses may be used. The anterior surface and/or the posterior surface of the lenses 102a, 102b can conform to the surface of a right circular cylinder such that the radius of curvature along the horizontal axis is substantially uniform. An elliptical cylinder can be used to provide lenses that have non-uniform curvature in the horizontal direction. For example, a lens may be more curved near its lateral edge than its medial edge. In some embodiments, an oblique (non-right) cylinder can be used, for example, to provide a lens that is angled in the vertical direction.

In some embodiments, the eyewear 100 can include canted lenses 102a, 102b mounted in a position rotated laterally relative to conventional centrally oriented dual lens mountings. A canted lens may be conceived as having an orientation, relative to the wearer's head, which would be achieved by starting with conventional dual lens eyewear having centrally oriented lenses and bending the frame inwardly at the temples to wrap around the side of the head. When the eyewear 100 is worn, a lateral edge of the lens wraps significantly around and comes in close proximity to the wearer's temple to provide significant lateral eye coverage.

A degree of wrap may be desirable for aesthetic styling reasons, for lateral protection of the eyes from flying debris, or for interception of peripheral light. Wrap may be attained by utilizing lenses of tight horizontal curvature (high base), such as cylindrical or spherical lenses, and/or by mounting each lens in a position which is canted laterally and rearwardly relative to centrally oriented dual lenses. Similarly, a high degree of rake or vertical tilting may be desirable for aesthetic reasons and for intercepting light, wind, dust or other debris from below the wearer's eyes. In general, "rake" will be understood to describe the condition of a lens, in the as-worn orientation, for which the normal line of sight strikes a vertical tangent to the lens 102a or 102b at a non-perpendicular angle.

The lenses 102a, 102b can be provided with anterior and posterior surfaces and a thickness therebetween, which can be variable along the horizontal direction, vertical direction, or combination of directions. In some embodiments, the lenses 102a, 102b can have a varying thickness along the horizontal or vertical axis, or along some other direction. In some embodiments, the thickness of the lenses 102a, 102b tapers smoothly, though not necessarily linearly, from a maximum thickness proximate a medial edge to a relatively lesser thickness at a lateral edge. The lenses 102a, 102b can have a tapering thickness along the horizontal axis and can be decentered for optical correction. In some embodiments, the lenses 102a, 102b can have a thickness configured to provide an optical correction. For example, the thickness of the lenses 102a, 102b can taper from a thickest point at a central point of the lenses 102a, 102b approaching lateral segments of the lenses 102a, 102b. In some embodiments, the average thickness of the lenses 102a, 102b in the lateral segments can be less than the average thickness of the lenses 102a, 102b in the central zone. In some embodiments, the thickness of the lenses 102a, 102b in at least one point in the central zone can be greater than the thickness of the lenses 102a, 102b at any point within at least one of the lateral segments.

In some embodiments, the lenses 102a, 102b can be finished, as opposed to semi-finished, with the lenses 102a, 102b being contoured to modify the focal power. In some embodiments, the lenses 102a, 102b can be semi-finished so that the lenses 102a, 102b can be capable of being machined, at some time following manufacture, to modify their focal power. In some embodiments, the lenses 102a, 102b can have optical power and can be prescription lenses configured to correct for near-sighted or far-sighted vision. The lenses 102a, 102b can have cylindrical characteristics to correct for astigmatism.

Figure 1B:
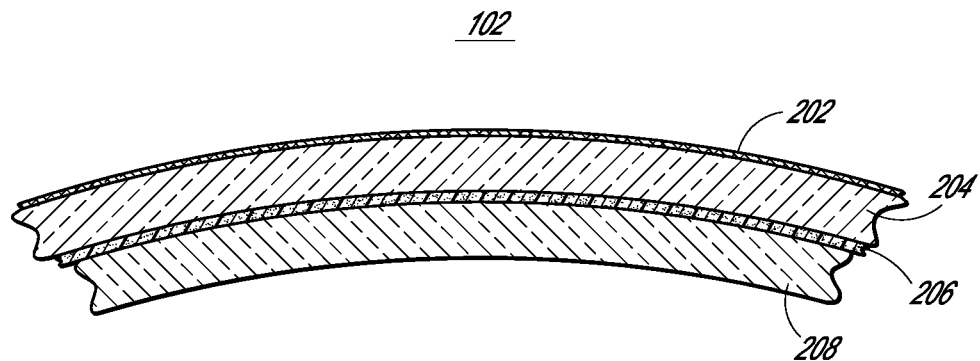
FIG. 1B is a cross-sectional view of one of the lenses shown in FIG. 1A.

In the embodiment illustrated in FIG. 1B, a lens 102 incorporates several lens elements. The lens elements include a lens coating 202, a first lens body element 204, a film layer 206, and a second lens body element 208. Many variations in the configuration of the lens 102 are possible. For example, the lens 102 can include a polarizing layer, one or more adhesive layers, a photochromic layer, an antireflection coating, a mirror coating, an interference coating, a scratch resistant coating, a hydrophobic coating, an antistatic coating, other lens elements, or a combination of lens components. If the lens 102 includes a photochromic layer, the photochromic material can include a neutral density photochromic or any other suitable photochromic. At least some of the lens components and/or materials can be selected such that they have a substantially neutral visible light spectral profile. Alternatively, the visible light spectral profiles can cooperate to achieve any desired lens chromaticity, a chroma-enhancing effect, another goal, or any combination of goals. The polarizing layer, the photochromic layer, and/or other functional layers can be incorporated into the film layer 206, the lens coating 202, one or more of the lens body elements 204, 208, or can be incorporated into additional lens elements. In some embodiments, a lens 102 incorporates fewer than all the lens elements shown in FIG. 1B.

The lens can include a UV absorption layer or a layer that includes UV absorption outside of the optical filter layer. Such a layer can decrease bleaching of the optical filter. In addition, UV absorbing agents can be disposed in any lens component or combination of lens components.

The lens body elements 204, 208 can be made from glass, a polymeric material, a co-polymer, a doped material, another material, or a combination of materials. In some embodiments, one or more portions of the optical filter can be incorporated into the lens coating 202, into one or more lens body elements 204, 208, into a film layer 206, into an adhesive layer, into a polarizing layer, into another lens element, or into a combination of elements.

The lens body elements 204, 208 can be manufactured by any suitable technique, such as, for example, casting or injection molding. Injection molding can expose a lens to temperatures that degrade or decompose certain dyes. Thus, when the optical filter is included in one or more lens body elements, a wider range of dyes can be selected for inclusion in the optical filter when the lens body elements are made by casting than when the lens body is made by injection molding. Further, a wider range of dyes or other optical filter structures can be available when the optical filter is implemented at least partially in a lens coating.

The lenses 102a and 102b have a filter that enhances chroma in a wavelength-conversion window, a background-window, a spectral-width window, another CEW, or any combination of CEWs. For some applications, the spectral-width window can be omitted. For other applications, an object-specific spectral window is provided that can include the wavelength-conversion window. The lenses 102a and 102b can be corrective lenses or non-corrective lenses and can be made of any of a variety of optical materials including glasses or plastics such as acrylics or polycarbonates. The lenses can have various shapes, including plano-plano and meniscus shapes. In alternative eyewear, a frame is configured to retain a unitary lens that is placed in front of both eyes when the eyewear is worn. Goggles can also be provided that include a unitary lens that is placed in front of both eyes when the goggles are worn.

The lenses 102a and 102b can substantially attenuate light in the visible spectral region. However, the light need not be attenuated uniformly or even generally evenly across the visible spectrum. Instead, the light that is attenuated can be tailored to achieve a specific chroma-enhancing profile or another goal. The lenses 102a and 102b can be configured to attenuate light in spectral bands that are selected such that the scene receives one or more of the improvements or characteristics disclosed herein. Such improvements or characteristics can be selected to benefit the wearer during one or more particular activities or in one or more specific environments.

In some embodiments, the lens 102 can comprise an injection molded, polymeric lens having a concave surface and a convex surface, and a laminate bonded or adhered to the injection molded, polymeric lens. The laminate can include a first polymeric layer, a base layer, and a second polymeric layer, the first polymeric layer being bonded to the convex surface of the injection molded, polymeric lens. The polymeric lens can include a copolymer resin. In some embodiments, the first polymeric layer is directly bonded to the polymeric lens. In certain embodiments, the first polymeric layer is adhesively bonded to the polymeric lens. The base layer can at least partially incorporate an optical filter layer. The lens can be corrective or non-corrective. As discussed above, the lens can have any suitable shape, including, for example, plano-plano, meniscus, cylindrical, spherical, another shape, or a combination of shapes.

FIG. 1C illustrates another implementation of eyewear 100 comprising an embodiment of a lens providing chroma enhancement. In the illustrated embodiment, the lens 102 includes a lens body 404 and a laminate 406. The laminate 406 and the lens body 404 are bonded or adhered together. In some embodiments, the laminate 406 and the lens body 404 can be permanently attached to each other using heat or pressure sensitive adhesives. In some embodiments, the laminate 406 and the lens body 404 can be permanently attached to each other using welding methods. In some embodiments, the lens 102 includes a first lens coating 408 and not a second lens coating 410. In certain embodiments, the lens 102 includes both a first lens coating 408 and a second lens coating 410. In some embodiments, the lens 102 includes a second lens coating 410 and not a first lens coating 408. In certain embodiments, the lens 102 includes no lens coating.

The laminate 406 can comprise a single layer or multiple layers. The laminate 406 can have one or more layers in single or multiple layer form that can be coated with a hard coating or a primer. For example, the laminate can be a single layer of polycarbonate, PET, polyethylene, acrylic, nylon, polyurethane, polyimide, another film material, or a combination of materials. As another example, the laminate can comprise multiple layers of film, where each film layer comprises polycarbonate, PET, polyethylene, acrylic, nylon, polyurethane, polyimide, another film material, or a combination of materials.

The first lens coating 408 or second lens coating 410 can be a transition layer between the laminate 406 and the lens body 404. The transition layer can assist in matching the optical index of the laminate 406 and the lens body 404. In some embodiments, the transition layer can improve adhesion between the layers or improve other properties of the lens.

In some embodiments of the lens 102 depicted in FIG. 1C, the optical filter is partially incorporated into the lens body 404. In certain embodiments, the optical filter can be partially incorporated into the laminate 406. The laminate 406 includes one or more chroma enhancement dyes configured to attenuate visible light passing through the lens 102 in one or more spectral bands. In certain embodiments, the laminate 406 includes one or more blue chroma enhancement dyes. In some embodiments, the laminate 406 can incorporate one or more violet chroma enhancement dyes. In some embodiments, the laminate 406 can incorporate one or more yellow chroma enhancement dyes. In some embodiments, the laminate 406 can incorporate one or more red chroma enhancement dyes. In some embodiments, the laminate 406 can incorporate one or more green chroma enhancement dyes. It is to be understood that the laminate 406 can incorporate any permutation of violet, blue, green, yellow, and/or red chroma enhancement dyes to achieve one or more desired optical properties. In some embodiments, the lens body 404 can incorporate one or more violet, blue, green, yellow, and/or red chroma enhancement dyes.

Figure 2:
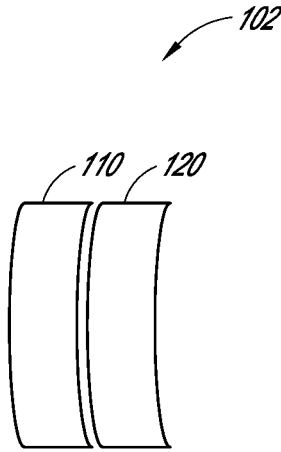

FIGS. 1D-1 and 1D-2, illustrate perspective views of another implementation of eyewear 100 having first and second lenses 102a and 102b, frame 104, and earstems 106a and 106b. The mounting frame 104 can be configured to support the lenses 102a, 102b. The mounting frame 104 can include orbitals that partially or completely surround the lenses 102a, 102b. Referring to FIGS. 1A, 1C and 1D-1, it should be noted that the particular mounting frame 104 is not essential to the embodiments disclosed herein. The frame 104 can be of varying configurations and designs, and the illustrated embodiments shown in FIGS. 1A, 1C and 1D-1 are provided as examples only. As illustrated, the frame 104 may include a top frame portion and a pair of ear stems 106a, 106b that are pivotably connected to opposing ends of the top frame portion. Further, the lenses 102a, 102b may be mounted to the frame 104 with an upper edge of the lens 102a or 102b extending along or within a lens groove and being secured to the frame 104. For example, the upper edge of the lens 102a or 102b can be formed in a pattern, such as a jagged or non-linear edge, and apertures or other shapes around which the frame 104 can be injection molded or fastened in order to secure the lens 102a or 102b to the frame 104. Further, the lenses 102a, 102b can be removably attachable to the frame 104 by means of a slot with interfitting projections or other attachment structure formed in the lenses 102a, 102b and/or the frame 104.

It is also contemplated that the lenses 102a, 102b can be secured along a lower edge of the frame 104. Various other configurations can also be utilized. Such configurations can include the direct attachment of the ear stems 106a, 106b to the lenses 102a, 102b without any frame, or other configurations that can reduce the overall weight, size, or profile of the eyeglasses. In addition, various materials can be utilized in the manufacture of the frame 104, such as metals, composites, or relatively rigid, molded thermoplastic materials which are well known in the art, and which can be transparent or available in a variety of colors. Indeed, the mounting frame 104 can be fabricated according to various configurations and designs as desired. In some embodiments, the frame 104 is configured to retain a unitary lens that is placed in front of both eyes when the eyewear is worn. Goggles can also be provided that include a unitary lens that is placed in front of both eyes when the goggles are worn.

As discussed above, the eyewear 100 can include a pair of earstems 106a, 106b pivotably attached to the frame 104. In some embodiments, the earstems 106a, 106b attach directly to the lenses 102a, 102b. The earstems 106a, 106b can be configured to support the eyewear 100 when worn by a user. For example, the earstems 106a, 106b can be configured to rest on the ears of the user. In some embodiments, the eyewear 100 includes a flexible band used to secure the eyewear 100 in front of the user's eyes in place of earstems 106a, 106b.

The lenses 102a and 102b of the implementation of eyewear 100 illustrated in FIG. 1D-1 include laminates 710a, 710b, 710c attached to lens bodies 708a, 708b. In various implementations, the laminates 710a and 710b can be configured to be removable such that a user, manufacturer, or retailer can apply, remove, or change the laminate 710a or 710b after manufacture of the eyewear 100. The laminates 710a or 710b, can be used to incorporate functionality into lenses 102a, 102b. For example, laminate 710b can include functional aspects that are desirable, such as polarization, photochromism, electrochromism, color enhancement, contrast enhancement, tinting, or chroma enhancement.

Implementations of chroma-enhancing eyewear 100 discussed above can include one or more lenses 102a, 102b having any desired number of laminates, coatings, and other lens elements. One or more of the lens elements can incorporate functional layers that impart desired functionality to the eyewear, including, for example an interference stack, a flash mirror, photochromic layer(s), electrochromic layer(s), anti-reflective coating, anti-static coating, liquid containing layer, polarizing elements, chroma enhancing dyes, color enhancing elements, contrast enhancing elements, trichoic filters, or any combination of these. The functional layers can include sub-layers, which can individually or in combination incorporate one or more functions into the complete lens.

In some embodiments, a functional layer is configured to provide variable light attenuation. For example, a functional layer can include photochromic compositions that darken in bright light and fade in lower light environments. As another example, chroma enhancing eyewear can incorporate an electrochromic functional layer, which can include a dichroic dye guest-host device configured to provide variable light attenuation. Implementations of chroma enhancing eyewear including laminates with different functional layers are also described in U.S. Publication No. 2013/0141693 which is incorporated by reference herein for all it discloses and is made part of this disclosure.

In various implementations, the lens 102 can include two or more molded lens components. For example, FIG. 2 illustrates a lens 102 with a molded wafer 110 and a molded base layer 120. The lens 102 can be incorporated into various implementations of eyewear 100 having one or more lenses, such as, for example, the implementations of eyewear 100 discussed above. As discussed above, the lens 102 can be a corrective lens that has optical power. For example, in various implementations, the lens 102 can be configured to provide refractive (e.g., spherical) optical power between ±25 Diopters. The lens 102 can also be configured to provide astigmatic (e.g., cylindrical) power between ±10 Diopters. In various implementations, the lens 102 can be configured as a monofocal, a bifocal or a multifocal lens that provides spherical and/or cylindrical power. In various implementations, the lens 102 can be configured to provide optical magnification. In some embodiments, the lens 102 can be a non-corrective lens without optical power.

As discussed above, the lens 102 can be made of one or more at least partially transparent optical materials, including, for example, plastics such as acrylic or polycarbonate. In some embodiments, a frame retains a unitary lens that is placed in front of both eyes when the eyewear is worn. For example, goggles can include a unitary lens that is placed in front of both eyes when the goggles are worn. In certain embodiments, the eyewear can be non-unitary. In embodiments including non-unitary eyewear, the frame retains a separate lens placed in front of each eye when the eyewear is worn.

The wafer 110 can be made of polycarbonate (or PC), allyl diglycol carbonate monomer (being sold under the brand name CR-39®), glass, nylon, polyurethane (e.g., materials sold under the brand name TRIVEX® or NXT®), polyethylene, polyimide, polyethylene terephthalate (or PET), biaxially-oriented polyethylene terephthalate polyester film (or BoPET, with one such polyester film sold under the brand name MYLAR®), acrylic (polymethyl methacrylate or PMMA), a polymeric material, a co-polymer, a doped material, any other suitable material, or any combination of materials. In certain embodiments, the wafer 110 is made from a polymeric material, such as a thermoplastic or thermosetting polymer.

The wafer 110 can have any suitable shape, including, for example, plano-plano, meniscus, cylindrical, spherical, parabolic, aspherical, elliptical, flat, another shape, or a combination of shapes. The wafer 110 can be symmetrical across a vertical axis of symmetry, symmetrical across a horizontal axis of symmetry, symmetrical across another axis, or asymmetrical. In some embodiments, the front and back surfaces of the wafer 110 can conform to the surfaces of respective cylinders, spheres, or other curved shapes that have a common center point and different radii. In some embodiments, the wafer 110 can have front and back surfaces that conform to the surfaces of respective cylinders, spheres, or other curved shapes that have center points offset from each other, such that the thickness of the wafer 110 tapers from a thicker central portion to thinner outer portions. The surfaces of the wafer 110 can conform to other shapes, as discussed herein, such as a sphere, toroid, ellipsoid, asphere, plano, frusto-conical, and the like.

In various implementations, the wafer 110 can be configured to provide chroma enhancement. Accordingly, the wafer 110 can at least partially or completely incorporate an optical filter designed to enhance a scene viewed through the lens 102. In various embodiments, the optical filter can comprise materials that absorb and/or reflect light, including but not limited to dyes, dopants, other chromophores, coatings, and so forth. The optical filter can provide optical properties to the lens 102 such as color enhancement, chroma enhancement, and/or any other type of optical filter described in U.S. Patent Application Publication No. 2013/0141693 (OAKLY1.514A), the entire contents of which are incorporated by reference herein and made part of this specification. In certain embodiments, the optical filter properties can be partially incorporated into the wafer 110 and partially incorporated into other components of the lens 102. Other components of the lens 102 can include, for example, a lens coating, the base layer 120, a polarizing wafer, a combination of components, and so forth.

The wafer 110 can have a thickness that is greater than or equal to about 0.3 mm and/or less than or equal to about 1.1 mm, greater than or equal to about 0.4 mm and/or less than or equal to about 1.0 mm, greater than or equal to about 0.5 mm and/or less than or equal to about 0.9 mm, greater than or equal to about 0.6 mm and/or less than or equal to about 0.8 mm, greater than or equal to about 0.7 mm and/or less than or equal to about 0.8 mm. In certain embodiments, the thickness of the wafer 110 can be substantially uniform. For example, the thickness can be considered substantially uniform when the lens wafer 110 does not contribute to the optical power of the lens 100 and/or when the thickness varies by less than or equal to about 5% from the average thickness of the component.

Various embodiments of the lens 102 can comprise an optical filter including a variable filter component and a static filter component. For example, the wafer 110 can be configured as a variable and/or static filter. As another example, the lens 102 can comprise a functional layer configured as a variable and/or static filter. In various embodiments, the variable filter component can be referred to as a dynamic filter component or as a variable attenuation filter. In various embodiments, the static filter component can be referred to as a fixed filter component or as a static/fixed attenuation filter. The optical filter is configured to switch between two or more filter states. For example, in some implementations, the optical filter is configured to switch between a first state and a second state. In some embodiments, the optical filter is configured to switch to additional states (e.g., a third state or a fourth state), such that the filter has three or more than three filter states. The first state can have a first luminance transmittance and the second state can have a second luminance transmittance. As used herein, luminous transmittance can be measured with respect to a standard daylight illuminant, such as CIE illuminant D65. In various embodiments, the first luminance transmittance can be greater than or equal to the second luminance transmittance. For example, the first luminance transmittance can be lower than the second luminance transmittance such that the lens is in a dark state when the optical filter is in the first state and the lens in a faded state when the optical filter is in the second filter state. In various embodiments, the first luminance transmittance can be less than about 30%. For example, the first luminance transmittance can be less than about 5%, less than about 8%, less than about 10%, less than about 12%, less than about 15%, less than about 18%, less than about 20% or less than about 25%. In various embodiments, the second luminance transmittance can be greater than about 10%. For example, the second luminance transmittance can be greater than about 15%, greater than about 20%, greater than about 25%, greater than about 30%, greater than about 35%, greater than about 40%, greater than about 50%, greater than about 60%, greater than about 70%, greater than about 80%, greater than about 85% or greater than about 90%. In some embodiments, the variable filter component of the optical filter can have filter states that shift between any of the luminance transmittance values identified in the preceding sentence.

In some embodiments, the lens 102 can be configured to switch between the first and the second state based on an input from a user wearing the eyewear 100 comprising the lens 102, a signal from a control circuit or an input from a sensor. In some embodiments, the lens 102 can be configured to switch between the first and the second state in response to an electrical signal. In some embodiments, the lens 102 can be configured to switch between the first and the second state in response to exposure to electromagnetic radiation. In different embodiments, other methods of switching between the first and the second state can be employed, such as automatic switching. The lens 102 can be configured such that the lens can maintain the desired state (first filter state or second filter state) without requiring energy.

In various embodiments, the variable filter component can provide the functionality of switching between the first and second state. In various embodiments, the static filter component can provide chroma enhancement. In some embodiments the variable filter component can include one or more chroma enhancement materials such that the static filter component is incorporated in the variable filter component. The variable attenuation filter and the static attenuation filter can be a part of the lens wafer 110 discussed above. In some embodiments only the static attenuation filter can be a part of the lens wafer 110 discussed above. In such embodiments, the variable attenuation filter can be embodied in other lens components discussed above. In various embodiments, the variable filter component can be disposed with respect to the static filter component such that the variable filter component and the static filter component are directly adjacent each other. In other embodiments, the variable filter component and the static filter component can include interleaving layers between them.

Various embodiments of the variable filter component can include electrochromic material, photochromic material or a combination of electrochromic and photochromic material. In various embodiments, the static filter component can include chroma enhancing material (e.g., dyes, rare earth oxides, etc.).

As discussed above, various embodiments of the wafer 110 can be configured as a variable and/or fixed attenuation filter as discussed in International Application No. PCT/US2015/060103, filed on Nov. 11, 2015, which is incorporated by reference herein in its entirety. Various embodiments of the variable and/or fixed attenuation filter can be embodied in one or more lens components having a thickness that is within any of the one or more ranges discussed herein. For example, various embodiments of the variable and/or fixed attenuation filter can be embodied in one or more than one lens wafers having a thickness greater than or equal to about 0.3 mm and/or less than or equal to about 1.1 mm, greater than or equal to about 0.4 mm and/or less than or equal to about 1.0 mm, greater than or equal to about 0.5 mm and/or less than or equal to about 0.9 mm, greater than or equal to about 0.6 mm and/or less than or equal to about 0.8 mm, greater than or equal to about 0.7 mm and/or less than or equal to about 0.8 mm, or having a thickness within a range between any two of the thickness values identified in this paragraph, wherein the range can include the endpoints or exclude the endpoints.

As discussed above, the wafer 110 can include one or more chroma enhancement dyes configured to provide chroma enhancement. For example, the wafer 110 configured as a variable and/or fixed attenuation filter can be configured to provide chroma enhancement. Various embodiments of the wafer 110 configured as a variable and/or fixed attenuation filter can have spectral characteristics substantially similar to the spectral characteristics that are depicted in and described with respect to FIGS. 31A-35C below to provide chroma enhancement for certain specific activities. In implementations of the wafer 110 that include one or more chroma enhancement dyes, the thickness of the wafer 110 depends at least partially on the strength, and/or concentration of the one or more chroma enhancement dyes that are incorporated into the wafer 110. The strength, and/or concentration of the one or more chroma enhancement dyes can be selected to provide a desired chroma enhancement effect. For example, in various implementations, the strength, and/or concentration of the one or more chroma enhancement dyes can be reduced if a small amount of attenuation (or chroma enhancement) in a certain spectral bandwidth is desired. As another example, in various implementations, the strength, and/or concentration of the one or more chroma enhancement dyes can be increased if a large amount of attenuation (or chroma enhancement) in a certain spectral bandwidth is desired. Implementations of the wafer 110 that are configured to provide a small amount of attenuation (or chroma enhancement) may be thinner as compared to implementations of the wafer 110 that are configured to provide a large amount of attenuation (or chroma enhancement).

The thickness of the wafer 110 can also depend on the solubility of the one or more chroma enhancement dyes in the synthetic material (e.g., polymeric material, resin, etc.) that is selected to form the wafer 110. For example, if the solubility of the one or more chroma enhancement dyes in the synthetic material that wafer 110 is selected to form the wafer 110 is low then a larger amount of the synthetic material may be required to achieve a desired strength, and/or concentration of the one or more chroma enhancement dyes which can result in a thicker wafer 110. As another example, if the solubility of the one or more chroma enhancement dyes in the synthetic material that wafer 110 is selected to form the wafer 110 is high then a smaller amount of the synthetic material may be required to achieve a desired strength, and/or concentration of the one or more chroma enhancement dyes which can result in a thinner wafer 110.

Table A provides example solubility characteristics of various example chroma enhancement dyes from Exciton.

TABLE A

| Example dyes | Example center λ (nm) | Example melting pt. (° C.) | Example solubilities in solvents (gm/L) | Example strength (L/gm · cm) |
|---|---|---|---|---|
| Violet chroma enhancement dye | 407 ± 1 | >300 | 24 (chloroform) 3.5 (toluene) 4.8 (cyclohexanone) | >490 (methylene chloride at 407 nm peak) |
| Blue chroma enhancement dye | 473 ± 2 | >200 | 9 (cyclopentanone) 16 (methylene chloride) 25 (chloroform) 14 (toluene) | 175 (methylene chloride) |
| Green chroma enhancement dye | 561 ± 2 | >300 | 1.1 (methylene chloride) 0.6 (toluene) 2.6 (chloroform) 0.3 (cyclohexane) 0.15 (methyl ethyl ketone) | 44 (methylene chloride) |
| Yellow chroma enhancement dye | 574 ± 2 | >300 | 28 (methylene chloride) 7.5 (hexane) 2.8 (toluene) 0.467 (acetone) | 183 (methylene chloride) |
| Red chroma enhancement dye | 660 ± 2 | >300 | Highest in chlorinated solvents, e.g., chloroform | >320 (chloroform) |

In some embodiments, the lens 102 includes a molded, polymeric base layer 120 having a concave surface and a convex surface. The base layer 120 can be made of polycarbonate (or PC), allyl diglycol carbonate monomer (being sold under the brand name CR-39®), glass, nylon, polyurethane (e.g., materials sold under the brand name TRIVEX® or NXT®), polyethylene, polyimide, polyethylene terephthalate (or PET), biaxially-oriented polyethylene terephthalate polyester film (or BoPET, with one such polyester film sold under the brand name MYLAR®), acrylic (polymethyl methacrylate or PMMA), a polymeric material, a co-polymer, a doped material, any other suitable material, or any combination of materials. In certain embodiments, the base layer 120 is made from a polymeric material, such as a thermoplastic or thermosetting polymer.

The base layer 120 can be symmetrical across a vertical axis of symmetry, symmetrical across a horizontal axis of symmetry, symmetrical across another axis, or asymmetrical. In some embodiments, the front and back surfaces of the base layer 120 can conform to the surfaces of respective cylinders, spheres, or other curved shapes that have a common center point and different radii. In some embodiments, the base layer 120 can have a front and back surfaces that conform to the surfaces of respective cylinders that have center points offset from each other, such that the thickness of the base layer 120 tapers from a thicker central portion to thinner edge portions. The surfaces of the base layer 120 can conform to other shapes, as discussed herein, such as a sphere, toroid, ellipsoid, asphere, plano, frusto-conical, and the like.

In some embodiments, a process comprising an insert molding process, 2-shot injection molding process, multi-shot injection molding process or casting can be used to make a lens 102 having a lens wafer 110 and a base layer 120. In certain embodiments, a convex or front-side boundary of the base layer 120 can conform to a wafer 110 having a shape described herein. In certain embodiments, the base layer 120 is molded to a convex surface or back-side boundary of the wafer 110.

The base layer 120 can be contoured during initial formation or after the molding process to have an optical magnification characteristic that modifies the focal power of the lens 102. In some embodiments, the base layer 120 is surfaced (e.g., machined, ground, and/or polished) after initial formation to modify the optical or focal power of the lens 102. The base layer 120 can provide a substantial amount of the optical power and magnification characteristics to the lens 102. In some embodiments, the base layer 120 provides the majority of the optical power and magnification characteristics. Apportioning the majority, substantially all, or all of the optical power and magnification to the base layer 120 can permit selection of base layer 120 materials and base layer 120 formation techniques that provide improved lens 102 optical power and magnification characteristics, without adversely affecting selection of wafer 110 materials and formation techniques. Further, the configuration of an optical filter present in the wafer 110 can be independent of the optical power selected for the lens 102. For example, the clear base layer 120 can be surfaced without changing the thickness of the lens component that contains the optical filter chromophores.

The base layer 120 can be casted or injection molded, and additional processes can be used to form the shape of the base layer 120, such as thermoforming or machining. In some embodiments, the base layer 120 can be casted or injection molded and includes a relatively rigid and optically acceptable material such as polycarbonate. The curvature of the base layer 120 can be incorporated into a molded lens blank. A lens blank can include the desired curvature and taper in its as-molded condition. One or two or more lens bodies of the desired shape may then be cut from the optically appropriate portion of the lens blank as is understood in the art.

The thickness of the base layer 120 can be selected to provide the lens with a desired level of optical power. In some embodiments, a concave side (or back side) of the base layer 120 can be surfaced to produce a desired curvature and/or magnification.

Figure 3:
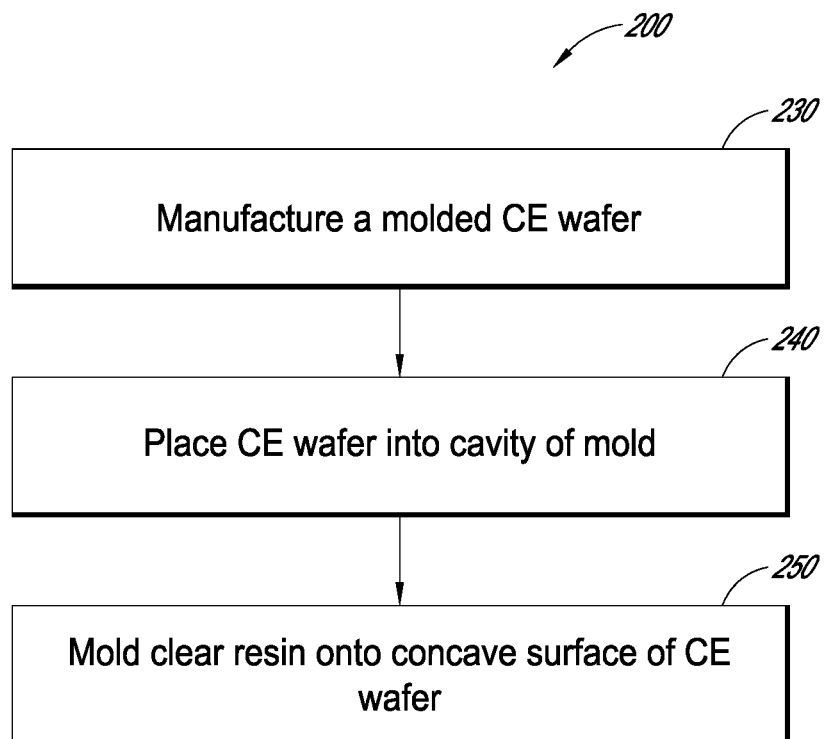
FIG. 3 is a flowchart showing an example process for making the lens of FIG. 1.

FIG. 3 is a flowchart showing an example process 200 for making the lens 102 depicted in FIG. 2. At 230, a molded wafer is formed. The molded wafer can be formed by a variety of manufacturing methods including but not limited to injection molding and/or casting. The wafer can include an optical filter comprising one or more dyes, dopants, other chromophores or coatings. Accordingly, the wafer can be called a chroma enhancement or CE wafer (and can include the lens wafer 110, for example). In various implementations the optical filter can comprise one or more chroma enhancement dyes described below and in U.S. Patent Application Publication No. 2013/0141693 which is incorporated by reference herein for all it discloses and is made part of this disclosure. In some implementations, the one or more dyes, dopants or other chromophores could be added to a molten resin before the resin is injected to form the wafer. In some implementations, the one or more dyes, dopants or other chromophores could be added after molding the lens wafer. In some implementations, the one or more dyes, dopants or other chromophores can be compounded into a raw resin material (e.g., a thermoplastic resin, pellets, etc). The raw resin material can be melted to form a molten resin which is then molded to form the lens wafer. In some implementations, the resin-dye mixture can be extruded and pelletized prior to molding into a lens wafer. When the CE wafer is manufactured using a casting process, the one or more dyes, dopants or other chromophores can be incorporated into the casting resin system prior to the casting process. For example, the one or more dyes, dopants or other chromophores can be included in the carrier solvent of the uncured resin and/or in other resin component, such as, for example, the monomer that forms the resin. At 240, the CE wafer is placed in a mold cavity with an outer surface of the CE wafer facing an interior wall of the cavity. In various implementations, the outer surface of the CE wafer can be curved (e.g. a convex surface). At 250, the mold cavity is closed, and molten resin material is injected through a runner and gate into the mold cavity to back-mold on an inside surface of the CE wafer. In various implementations, the inside surface of the CE wafer can be curved (e.g., a concave surface). The combined action of high temperature from the molten resin and high pressure from an injection screw can conform the CE wafer to the interior wall of the mold and bond the CE wafer and the resin material of the lens body (for example, the lens body 120). After the resin melt is hardened, a desired lens can be achieved having the thin CE wafer and the clear lens body. It is noted that curvature of the outer and inner surfaces of the CE wafer is not a result of the molding process. For example, the CE wafer can have a desired shape and/or curvature prior to being placed in the mold cavity at block 240. This process is significantly different from a molding proves in which a sheet that is flat or has less curvature than desired is placed into the mold cavity and the heat and pressure of the molding process can cause the sheet to conform to a desired shape and/or curvature.

Figure 4:
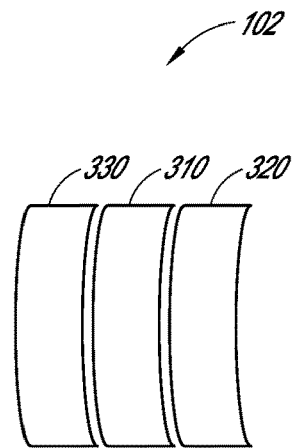
FIG. 4 illustrates a lens with a polarizing wafer, a molded wafer, and a clear lens body.

FIG. 4 illustrates an implementation of a lens 102 comprising with a polarizing wafer 330, a molded wafer 310, and a clear base layer 320. The molded wafer 310 can have generally similar physical, optical and chemical properties as the molded wafer 110 described above with reference to FIG. 2. The clear base layer 320 can also have generally similar physical, optical and chemical properties as the base layer 120 described with reference to FIG. 2.

The polarizing wafer 330 can be integrated with the outer (e.g., the front or the convex) surface of the molded wafer 310, for example, by insert molding. An implementation of a method of integrating the polarizing wafer 330 with the wafer 310 includes inserting the polarizing wafer 330 into a mold cavity and molding the wafer 310 onto the surface (e.g., concave surface) of the polarizing wafer 330. The resulting CE wafer 310 and polarizing wafer 330 combination (also referred to as functional wafer system in some implementations) can have a thickness that is greater than or equal to about 0.8 mm and/or less than or equal to about 1.8 mm. For example, the thickness of the functional wafer system can be greater than or equal to 0.8 mm and less than or equal to 1.7 mm, greater than or equal to 0.9 mm and less than or equal to 1.6 mm, greater than or equal to 1.0 mm and less than or equal to 1.5 mm, less than or equal to 1.4 mm, greater than or equal to 1.1 mm and/or less than or equal to 1.2 mm. The thickness of the functional wafer system can be increased beyond 1.8 mm in some embodiments. For example, in some implementations, the functional wafer system can be up to 2.0 mm thick. However, a thicker functional wafer system can have a reduced range for prescription optical power. For example, a thicker functional wafer system can have a reduced range for the negative prescription power. Moreover, a thicker functional wafer system may not be aesthetically pleasing. Nevertheless, thicker functional wafer system may be used in applications that require little to no prescription power and/or are not cosmetic.

Various embodiments of the functional wafer can be configured as a variable and/or fixed attenuation filter as discussed in International Application No. PCT/US2015/060103, filed on Nov. 11, 2015, which is incorporated by reference herein in its entirety. Various embodiments of the variable and/or fixed attenuation filter can be embodied in one or more lens components having a thickness that is within any of the one or more ranges discussed herein. For example, various embodiments of the variable and/or fixed attenuation filter can be embodied in one or more than one lens wafers having a thickness greater than or equal to about 0.8 mm and/or less than or equal to about 1.8 mm. For example, the thickness of the functional wafer system can be greater than or equal to 0.8 mm and less than or equal to 1.7 mm, greater than or equal to 0.9 mm and less than or equal to 1.6 mm, greater than or equal to 1.0 mm and less than or equal to 1.5 mm, less than or equal to 1.4 mm, greater than or equal to 1.1 mm and/or less than or equal to 1.2 mm. As another example, various embodiments of the variable and/or fixed attenuation filter can have a thickness greater than or equal to about 0.3 mm and/or less than or equal to about 1.1 mm, greater than or equal to about 0.4 mm and/or less than or equal to about 1.0 mm, greater than or equal to about 0.5 mm and/or less than or equal to about 0.9 mm, greater than or equal to about 0.6 mm and/or less than or equal to about 0.8 mm, greater than or equal to about 0.7 mm and/or less than or equal to about 0.8 mm, or having a thickness within a range between any two of the thickness values identified in this paragraph, wherein the range can include the endpoints or exclude the endpoints.

In some embodiments, the polarizing wafer 330 has a thickness that is less than or equal to about 0.8 mm and/or greater than or equal to about 0.6 mm. In certain embodiments, the polarizing wafer 330 has a thickness of about 0.7 mm.

In certain embodiments, the polarizing wafer 330 can include a polarizing film disposed between a first polymeric insulating layer and a second polymeric insulating layer. The polarizing film can provide polarizing properties. In various implementations, the polarizing film can comprise one or more dichroic dyes, iodine, or other suitable dyes that are incorporated into a polyvinyl alcohol-type film having a thickness ranging from about 20 µm to about 120 µm, or ranging from about 30 µm to about 50 µm. Examples of a polyvinyl alcohol-type film are a polyvinyl alcohol (PVA) film, a polyvinylformal film, a polyvinylacetal film and a saponified (ethylene/vinyl acetate) copolymer film. In some embodiments, the polarizing properties of the wafer can be provided by a nano-wire grid which filters light through plasmon reflection. The first and second polymeric layers can comprise polycarbonate sheets. In various implementations, the polycarbonate sheets can be clear. In some implementations, the polycarbonate sheets include stretched polycarbonate sheets. In various implementations, the front most polymeric layer that receives light incident from the object or the scene is a stretched polycarbonate such that the polarizing wafer 330 provides the desired amount of polarization. The other polymeric layer through which light exits the polarizing wafer 330 can be un-stretched and/or dispersive. The polycarbonate sheets used in the first and/or second polymeric layers can have a thickness ranging from about 0.03 mm to about 0.4 mm, or a thickness ranging from about 0.05 mm to about 0.3 mm. For example, the polycarbonate sheets used in the first and/or second polymeric layers can have a thickness greater than or equal to about 0.03 mm and/or less than or equal to about 0.4 mm. In some embodiments, a bonding layer of polyurethane adhesive is disposed between the polyvinyl alcohol-type film and the polymeric layers.

In various implementations, the CE wafer 310 is distinct from the polarizing wafer 330. In such implementations, the CE wafer 310 can be integrated with the first or the second polymeric layer of the polarizing wafer 330 using insert molding, 2-shot injection molding process, multi-shot injection molding process or casting. In some implementations, one or more chroma enhancement dyes can be incorporated into the first or second polymeric layers of the polarizing wafer 330. An example method of manufacturing the lens 102 illustrated in FIG. 4 is discussed below with reference to FIG. 5.

Figure 5:
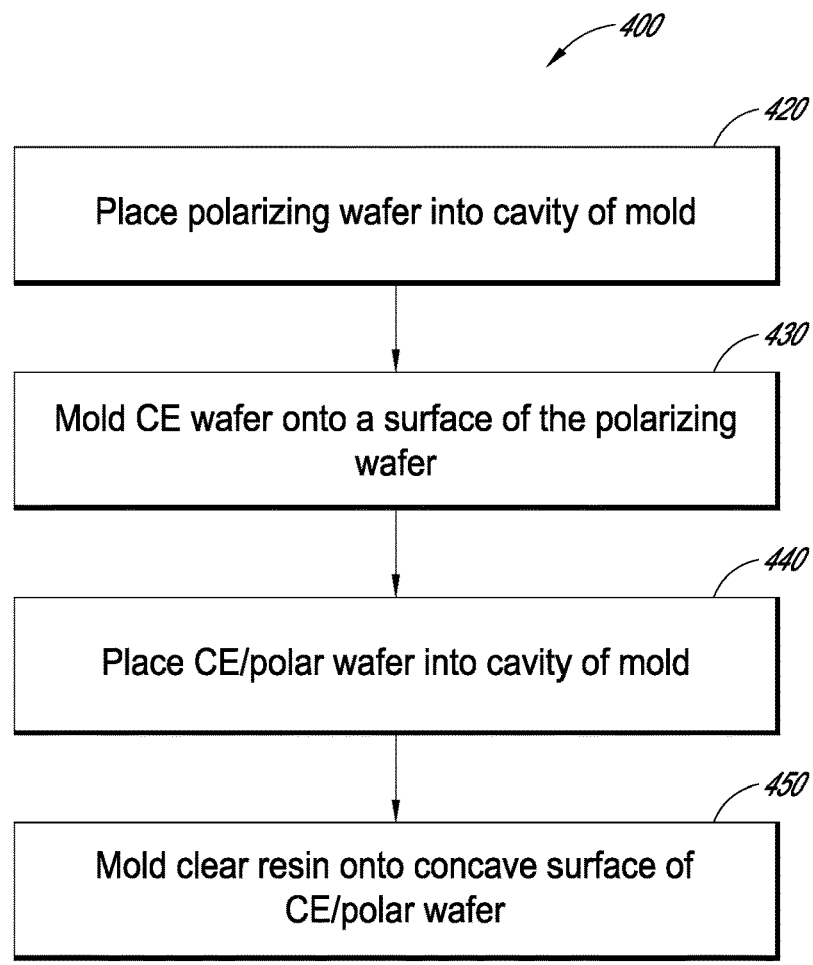
FIG. 5 is a flowchart showing an example process for making the lens of FIG. 3.

FIG. 5 is a flowchart showing an example process 400 for making the lens 102 of FIG. 4. At 420, a polarizing wafer (e.g., wafer 330) is placed into a mold cavity. The polarizing wafer 330 can be pre-formed using a variety of processes including but not limited to casting or injection molding. An implementation of the method of forming the polarizing wafer (e.g., wafer 330) includes pre-forming the polarizing wafer to a desired curvature and inserting it into a mold cavity such that an outer or front surface of the polarizing wafer substantially conforms to an inner surface of the mold cavity. In various implementations, the outer or front surface can be curved (e.g., convex). The polarizing wafer can be pre-formed to a desired curvature by punching the polarizing wafer against a heated mold before the polarizing wafer is inserted into the mold cavity. In some embodiments, the polarizing wafer can be formed to a desired curvature within the mold cavity. At 430, a lens wafer including an optical filter (e.g., a CE wafer, wafer 310) is integrated (e.g., molded) onto a surface of the polarizing wafer (e.g., wafer 330). The CE wafer can be pre-formed by a variety of manufacturing processes including but not limited to process 230 illustrated in FIG. 3 and described above. As discussed above, the CE wafer (e.g., the wafer 310) can include an optical filter comprising one or more dyes, dopants, other chromophores or coatings. In various implementations, the optical filter can comprise one or more chroma enhancement dyes described below and described in U.S. Patent Publication No. 2013/0141693 which is incorporated by reference herein in its entirety for all that it discloses and is made part of this disclosure. In some implementations, the one or more dyes, dopants or other chromophores could be added to a molten resin before the resin is injected to form the CE wafer. In some implementations, the one or more dyes, dopants or other chromophores could be added after molding the CE wafer. In some implementations, the one or more dyes, dopants or other chromophores can be compounded into a raw resin material (e.g., a thermoplastic resin, pellets, etc). The raw resin material can be melted to form a molten resin which is then molded to form the CE wafer. In some implementations, the resin-dye mixture can be extruded and pelletized prior to molding into a CE wafer.

When the CE wafer is manufactured using a casting process, the one or more dyes, dopants or other chromophores can be incorporated into the casting resin system prior to the casting process. For example, the one or more dyes, dopants or other chromophores can be included in the carrier solvent of the uncured resin and/or in other resin component, such as, for example, the monomer that forms the resin. In one implementation of manufacturing, the CE wafer is integrated with the polarizing wafer by molding the resin-dye mixture (e.g., the extruded polymer pellets) on the inner surface (e.g., an inner concave surface) of the polarizing wafer at 430. The resulting combination of the CE wafer and the polarizing wafer can be called a CE/polar wafer (e.g., a combination of wafer 330 and wafer 310) or a functional wafer system. At 440, the CE/polar wafer is placed in a mold cavity with a convex surface or outer surface of the CE/polar wafer facing an interior wall of the cavity. At 450, the mold cavity is closed, and molten clear resin material is injected through a runner and gate into the mold cavity to back-mold on a concave surface or inside surface of the CE/polar wafer. The combined action of high temperature from the molten resin and high pressure from an injection screw can conform the CE/polar wafer to the interior wall of the mold and bond the CE/polar wafer and the resin material of the lens body (e.g., the base layer 320). After the resin melt is hardened, a lens with a desired chroma enhancing and polarizing properties and including the combined CE/polar wafer and the clear base layer can be achieved.

In some embodiments, one or more advantages can be realized in at least some circumstances when a lens combining a molded CE wafer and a molded base layer is made. For example, molding a thin CE wafer (e.g., wafer 110 via process 200) can reduce or eliminate the costly limitations of an equivalent lens that could be produced by laminating an optical-grade extruded sheet containing the chroma enhancement dyes that can be die cut and thermoformed to form a stand-alone CE wafer, which is then inserted into the mold for injection of resin for the lens body (e.g., lens body 120). Molding a thin CE wafer into the CE/polar wafer (e.g., combined wafers 310 and 330 via process 400) can also reduce or eliminate the costly limitations of an equivalent lens that could be produced by laminating an optical-grade extruded sheet containing the chroma enhancement dyes as part of the manufacturing of a polarizing sheet that can be die cut and thermoformed to form a CE/polar wafer, which is then inserted in to the mold for injection of resin for the lens body (e.g., lens body 320). For example, it may not be necessary to manufacture large volumes of optical-grade extruded sheet containing the chroma enhancement dyes to manufacture a lens including a molded CE wafer and a molded base layer, or to manufacture a lens including a molded CE/polar wafer and a molded base layer. This can translate to an increase in the efficiency of utilization of expensive organic dyes which can reduce manufacturing costs significantly. Furthermore, die cutting waste can be reduced or eliminated when manufacturing a lens including a molded CE wafer and a molded base layer, or when manufacturing a lens including a molded CE/polar wafer and a molded base layer. As such a lens including a molded CE wafer and a molded base layer, or a lens including a molded CE/polar wafer and a molded base layer, can advantageously reduce lead time, minimum order volumes, inventory carrying costs as compared to an equivalent lens that could be produced by laminating an optical-grade extruded sheet containing the chroma enhancement dyes as part of the manufacturing of a polarizing sheet that can be die cut and thermoformed to form a CE/polar wafer, which is then inserted in to the mold for injection of resin for the lens body. Additionally, a lens including a molded CE wafer and a molded lens body, or a lens including a molded CE/polar wafer and a molded lens body, can advantageously have a faster market response and/or increased market flexibility as compared to an equivalent lens that could be produced by laminating an optical-grade extruded sheet containing the chroma enhancement dyes as part of the manufacturing of a polarizing sheet that can be die cut and thermoformed to form a CE/polar wafer, which is then inserted in to the mold for injection of resin for the lens body.

A lens including a molded CE wafer and a molded base layer can provide a thin molded lens. For example, various implementations of the molded CE wafer and a molded base layer described herein can have a thickness less than or equal to 1.1 mm. Additional optical components that provide additional functionality (e.g., polarizing components) can be integrated with a thin molded lens without significantly increasing the thickness of the lens. Additionally, the curvatures of the various optical surfaces of the thin molded lens can be designed and manufactured with greater precision as compared to an equivalent lens that could be produced by laminating an optical-grade extruded sheet containing the chroma enhancement dyes as part of the manufacturing of a polarizing sheet that can be die cut and thermoformed to form a CE/polar wafer, which is then inserted in to the mold for injection of resin for the lens body. Furthermore, since no adhesive layers or very few adhesive layers are used during manufacturing various embodiments of a thin molded lens (e.g., CE wafer or a CE/polar wafer molded with a base layer), delamination of the various layers in such embodiments of a thin lens (e.g., CE wafer or a CE/polar wafer molded with a base layer) can be prevented which can make these embodiments of a thin molded lens (e.g., CE wafer or a CE/polar wafer molded with a base layer) more durable. Additionally, warpage of various surfaces can be prevented in various embodiments of a thin molded lens (e.g., CE wafer or a CE/polar wafer molded with a base layer) manufactured by the processes described herein.

Molding a very CE wafer can also eliminate a large amount of wasted chroma enhancement dyes. The process of die cutting wafers from an extruded sheet has large inherent waste since the die cutting process does not allow for perfect nesting of each wafer and has some trim and handling margin that is wasted. If the chroma enhancement dyes were contained in the lens body of the lens, they would be partially wasted by grinding them away as part of the surfacing process to achieve desired optical power.

The thin CE wafer can allow for accuracy and precision in the design of an optical filter, such as a chroma-enhancing filter, for a given environment. For example, a thin, uniform thickness CE wafer allows for the same optical filtering properties (e.g., chroma enhancement properties) over the complete area of the lens blank and, therefore, of the finished lens with optical power. Compared to certain lamination processes, the thin CE wafer can reduce or eliminate additional layers of adhesive, which can degrade optics, durability and be a source of unwanted haze.

Figure 6A:
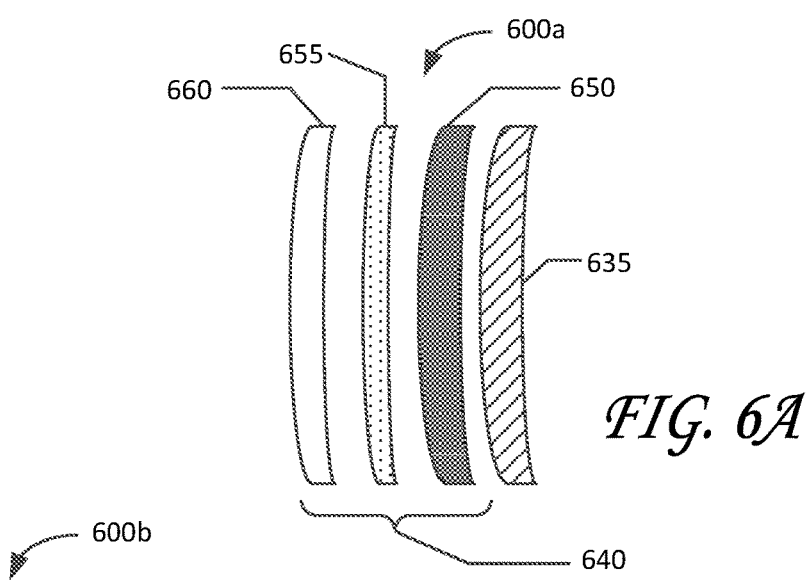
FIGS. 6A, 6B, and 6C illustrate various embodiments of a lens.
Figure 6B:
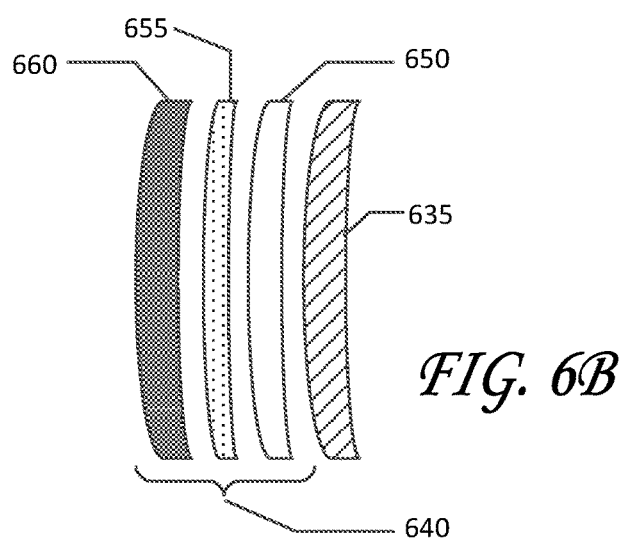
Figure 6C:
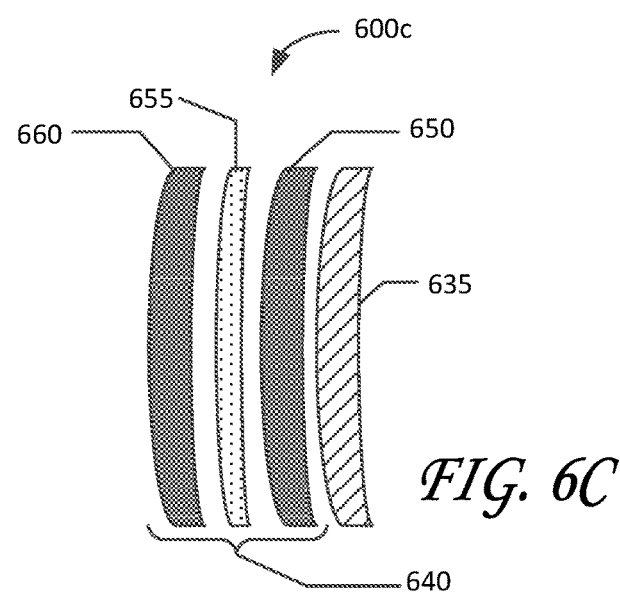

FIGS. 6A-6C illustrate various implementations 600a-600c of a lens configured to provide one or more functionalities including but not limited to chroma enhancement, polarization control, or combinations thereof. The one or more functionalities can be accomplished by providing a chroma-enhancement filter and/or a polarizer in the various lens implementations 600a-600c depicted in FIGS. 6A-6C. The lens implementations 600a-600c depicted in FIGS. 6A-6C can be configured to provide additional functionality, such as, for example, anti-reflection functionality, anti-static functionality, anti-fog functionality, scratch resistance, mechanical durability, hydrophobic functionality, reflective functionality, darkening functionality, or aesthetic functionality including tinting. The additional functionality can be accomplished by providing an anti-reflection layer, an anti-static layer, an anti-fog layer, a hard-coat, a hydrophobic layer, a reflective coating, mirror elements, interference stacks, a light attenuation layer, photochromic/electrochromic materials, pigments or combinations thereof in the various lens implementations 600a-600c depicted in FIGS. 6A-6C. The various lens implementations 600a-600c are described in further detail below.

The various lens implementations 600a-600c depicted in FIGS. 6A-6C comprise a lens base 635 integrated with a wafer 640. The lens base 635 is also referred to herein as a substrate. The wafer 640 can be integrated with the lens base 635 using various manufacturing methods including but not limited to molding, overmolding, insert injection molding, transfer molding, 2-shot injection molding process, multi-shot injection molding process, casting or lamination. For example, the lens base 635 can be overmolded onto the wafer 640. Without subscribing to any particular theory, overmolding can refer to a process in which the base element 635 is molded onto and/or around the wafer 640 or vice-versa.

The lens base 635 can have generally similar physical, optical and chemical properties as the base layer 120 described above with reference to FIG. 2 and/or the base layer 320 described above with reference to FIG. 3.

The lens base 635 has a convex front surface and a planar or a concave back surface. The wafer 640 can be integrated with the convex front surface of the lens base 635 as depicted in FIGS. 6A-6C. The lens base 635 can be made of polycarbonate (or PC), allyl diglycol carbonate monomer (being sold under the brand name CR-39®), glass, nylon, polyurethane (e.g., materials sold under the brand name TRIVEX® or NXT®), polyethylene, polyimide, polyethylene terephthalate (or PET), biaxially-oriented polyethylene terephthalate polyester film (or BoPET, with one such polyester film sold under the brand name MYLAR®), acrylic (polymethyl methacrylate or PMMA), a polymeric material, a co-polymer, a doped material, any other suitable material, or any combination of materials. In certain embodiments, the lens base 635 can be made from a polymeric material, such as a thermoplastic or thermosetting polymer.

The lens base 635 can be symmetrical across a vertical axis of symmetry, symmetrical across a horizontal axis of symmetry, symmetrical across another axis, or asymmetrical. In some embodiments, the front and back surfaces of the lens base 635 can conform to the surfaces of respective cylinders, spheres, or other curved shapes that have a common center point and different radii. In some embodiments, the lens base 635 can have a front and back surfaces that conform to the surfaces of respective cylinders that have center points offset from each other, such that the thickness of the lens base 635 tapers from a thicker central portion to thinner edge portions. The surfaces of the lens base 635 can conform to other shapes, as discussed herein, such as a sphere, toroid, ellipsoid, asphere, plano, frusto-conical, and the like. For example, the lens base 635 can be a plano lens having a convex front surface and a planar back surface.

The lens implementations 600a-600c can be a prescription lens. Accordingly, the lens base 635 can be configured to provide optical power. The lens base 635 can be contoured during initial formation or after the molding process to have an optical magnification characteristic that modifies the focal power of the lens. In some embodiments, the lens base 635 is surfaced (e.g., machined, ground, and/or polished) after initial formation to modify the optical or focal power of the lens. The lens base 635 can provide a substantial amount of the optical power and magnification characteristics to the lens. In some embodiments, the lens base 635 provides the majority of the optical power and magnification characteristics. Apportioning the majority, substantially all, or all of the optical power and magnification to the lens base 635 can permit selection of lens base 635 materials and lens base 635 formation techniques that provide improved lens optical power and magnification characteristics, without adversely affecting selection of wafer 640 materials and formation techniques. Further, the configuration of an optical filter present in the wafer 640 can be independent of the optical power selected for the lens. For example, the lens base 635 can be surfaced without changing the thickness of the lens component that contains the optical filter chromophores.

The lens base 635 can be casted or injection molded, and additional processes can be used to form the shape of the lens base 635, such as thermoforming or machining. In some embodiments, the lens base 635 can be casted or injection molded and includes a relatively rigid and optically acceptable material such as polycarbonate. The curvature of the lens base 635 can be incorporated into a molded lens blank. A lens blank can include the desired curvature and taper in its as-molded condition. One or two or more lens bodies of the desired shape may then be cut from the optically appropriate portion of the lens blank as is understood in the art. In some embodiments, the lens base 635 can be configured as a plano lens blank. In some other embodiments, the lens base 635 can be configured as a prescription lens blank.

The thickness of the lens base 635 can be selected to provide the lens with a desired level of optical power. In some embodiments, a concave side (or back side) of the lens base 635 can be surfaced to produce a desired curvature and/or magnification.

The wafer 640 comprises a plurality of components that are configured to provide one or more of the functionalities discussed above. The wafer 640 comprises at least two polymeric layers 650 and 660 and a functional layer 655 disposed between the at least two polymeric layers 650 and 660. In some implementations, the wafer 640 can comprise the polymeric layer 650, the functional layer 655 and the polymeric layer 660 in sequence. However, in other implementations, one or more other layers can be disposed between the polymeric layer 650, the functional layer 655 and the polymeric layer 660. The functional layer 655 can be configured to provide one or more of the functionalities discussed herein. One or both the polymeric layers 650 and 660 can be configured as polymeric insulating layers. One or both of the polymer layers 650 and 660 can comprise an optical filter layer configured to provide static and/or variable light attenuation. The functional layer 655 can comprise a polarizer, an anti-reflective coating, a mirror coating, an anti-static coating, a hydro-phobic coating, a hard coat, or combinations thereof. The polymeric layers 650 and 660 can be configured as protective polymeric layers that provide mechanical strength and stability to the wafer 640 and/or the lens. One or both of the polymeric layers 650 and 660 can comprise anti-scratch coatings to provide anti-scratch functionality to the lens.

As depicted in FIGS. 6A-6C, the wafer 640 is integrated with a convex front surface of the lens base 635. Accordingly, the polymeric layer 650 can have a rear or a back surface that substantially conforms to the convex front surface of the lens base 635. For example, the polymeric layer 650 can have a concave surface having a curvature that conforms to the curvature of the convex front surface of the lens base 635. The front surface of the polymeric layer 650 can be configured to conform to the shape of the rear or back surface of the functional layer 655. For example, the front surface of the polymeric layer 650 can be convex as depicted in FIGS. 6A-6C to conform to a concave rear or back surface of the functional layer 655. In other implementations, the rear or back surface of the functional layer 655 can be planar or convex. In such implementations, the front surface of the polymeric layer 650 can be planar or concave. The rear or back surface of the polymeric layer 660 can have a shape that conforms to the shape of the front surface of the adhesive layer 650. For example, the front surface of the functional layer 655 can be convex as depicted in FIGS. 6A-6C. In such implementations, the rear or back surface of the polymeric layer 660 can be concave. As another example, the front surface of the functional layer 655 can be planar or concave. In such implementations, the rear or back surface of the polymeric layer 660 can be planar or convex. The front surface of the polymeric layer 660 can be convex as depicted in FIGS. 6A-6C. In various implementations, the front surface of the polymeric layer 660 can be planar or concave.

One or both the polymeric layers 650 and 660 can comprise polycarbonate (or PC), allyl diglycol carbonate monomer (being sold under the brand name CR-39®), glass, nylon, polyurethane (e.g., materials sold under the brand name TRIVEX® or NXT®), polyethylene, polyimide, polyethylene terephthalate (or PET), biaxially-oriented polyethylene terephthalate polyester film (or BoPET, with one such polyester film sold under the brand name MYLAR®), acrylic (polymethyl methacrylate or PMMA), a polymeric material, a co-polymer, a doped material, thermoplastic, thermosetting polymer, any other suitable material, or any combination of materials. One or both the polymeric layers 650 and 660 can comprise polycarbonate sheets. In various implementations, the polycarbonate sheets can be clear. In some implementations, the polycarbonate sheets include stretched, un-stretched and/or dispersive polycarbonate sheets. The polycarbonate sheets used in the polymeric layers 650 and 660 can have a thickness ranging from about 0.03 mm to about 0.4 mm, or a thickness ranging from about 0.05 mm to about 0.3 mm. For example, the polycarbonate sheets used in the first and/or second polymeric layers can have a thickness greater than or equal to about 0.03 mm and/or less than or equal to about 0.4 mm.

One or both the polymeric layers 650 and 660 can have any suitable shape, including, for example, plano-plano, meniscus, cylindrical, spherical, parabolic, aspherical, elliptical, flat, another shape, or a combination of shapes. One or both the polymeric layers 650 and 660 can be symmetrical across a vertical axis of symmetry, symmetrical across a horizontal axis of symmetry, symmetrical across another axis, or asymmetrical. In some embodiments, the front and back surfaces of one or both the polymeric layers 650 and 660 can conform to the surfaces of respective cylinders, spheres, or other curved shapes that have a common center point and different radii. In some embodiments, one or both the polymeric layers 650 and 660 can have front and back surfaces that conform to the surfaces of respective cylinders, spheres, or other curved shapes that have center points offset from each other, such that the thickness of one or both the polymeric layers 650 and 660 tapers from a thicker central portion to thinner outer portions. The surfaces of one or both the polymeric layers 650 and 660 can conform to other shapes, as discussed herein, such as a sphere, toroid, ellipsoid, asphere, plano, frusto-conical, and the like.

One or both the polymeric layers 650 and 660 can have a thickness that is greater than or equal to about 0.3 mm and/or less than or equal to about 2.0 mm, greater than or equal to about 0.4 mm and/or less than or equal to about 1.8 mm, greater than or equal to about 0.5 mm and/or less than or equal to about 1.7 mm, greater than or equal to about 0.6 mm and/or less than or equal to about 1.6 mm, greater than or equal to about 0.7 mm and/or less than or equal to about 1.5 mm, greater than or equal to 0.8 mm and less than or equal to 1.7 mm, greater than or equal to 0.9 mm and less than or equal to 1.6 mm, greater than or equal to 1.0 mm and less than or equal to 1.5 mm, less than or equal to 1.4 mm, greater than or equal to 1.1 mm and/or less than or equal to 1.2 mm. In certain embodiments, the thickness of one or both the polymeric layers 650 and 660 can be substantially uniform. For example, the thickness can be considered substantially uniform when one or both the polymeric layers 650 and 660 does not contribute to the optical power of the lens implementations 600a-600c and/or when the thickness varies by less than or equal to about 5% from the average thickness of the component.

As discussed above, a functional layer 655 can be disposed between the at least two polymeric layers 650 and 660. The functional layer 655 can comprise a polarizing film that can provide polarizing properties. In various implementations, the polarizing film can comprise one or more dichroic dyes, iodine, or other suitable dyes that are incorporated into a polyvinyl alcohol-type film having a thickness ranging from about 20 µm to about 120 µm, or ranging from about 30 µm to about 50 µm. Examples of a polyvinyl alcohol-type film are a polyvinyl alcohol (PVA) film, a polyvinylformal film, a polyvinylacetal film and a saponified (ethylene/vinyl acetate) copolymer film. In some embodiments, the polarizing properties of the wafer can be provided by a nano-wire grid which filters light through plasmon reflection. In various implementations, the polymeric layer 660 that receives light incident from the object or the scene is a stretched polycarbonate such that the polarizing film provides the desired amount of polarization. The other polymeric layer through which light exits the polarizing film can be un-stretched and/or dispersive. In some embodiments, a bonding layer of polyurethane adhesive can be disposed between the polyvinyl alcohol-type film and the polymeric layers 650 and 660.

One or both the polymeric layers 650 and 660 can at least partially comprise an optical filter. For example, in FIG. 6A, the polymeric layer 650 disposed adjacent to the lens base 635 at least partially comprises the optical filter. In FIG. 6B, the polymeric layer 660 disposed away from the lens base 635 at least partially comprises the optical filter. In FIG. 6C, the polymeric layers 650 and 660 at least partially comprise the optical filter. The optical filter can be a static/fixed filter, a variable/dynamic filter or combination thereof. As discussed above, when configured as a static/fixed filter, the optical filter provides a fixed attenuation. As discussed above, when configured as a variable attenuation filter, the optical filter can be configured to switch between two or more filter states having different light attenuation characteristics. As discussed above, the optical filter can be configured to switch between two or more filter states based on an input from a user, an electrical signal, a signal from a control circuit, an input from a sensor, in response to exposure to electromagnetic radiation or combinations thereof.

The optical filter can be configured to provide chroma enhancement and enhance a scene viewed through the lens. In various embodiments, the optical filter can comprise materials that absorb and/or reflect light, including but not limited to dyes, dopants, other chromophores, coatings, and so forth. The optical filter can provide optical properties to the lens such as color enhancement, chroma enhancement, and/or any other type of optical enhancement. The optical filter can have physical and/or spectral characteristics similar to the optical filters described in U.S. Patent Application Publication No. 2013/0141693 (OAKLY1.514A), the entire contents of which are incorporated by reference herein and made part of this specification.

The optical filter can be configured to provide chroma enhancement as discussed above. Accordingly, the optical filter can comprise one or more dyes, dopants, pigments, chromophores, coatings or combinations thereof. For example, the optical filter can comprise one or more chroma enhancement dyes discussed herein and in U.S. Patent Application Publication No. 2013/0141693 which is incorporated by reference herein for all it discloses and is made part of this disclosure. The optical filter can have spectral characteristics substantially similar to the spectral characteristics that are depicted in and described with respect to FIGS. 31A-35C below to provide chroma enhancement for certain specific activities.

The optical filter can be configured as a layer that is at least partially integrated with one or both of the polymeric layers 650 and 660. The thickness of the optical filter layer comprising one or more chroma enhancement dyes can depend at least partially on the strength, and/or concentration of the one or more chroma enhancement dyes that are incorporated into the optical filter. As discussed above, the strength, and/or concentration of the one or more chroma enhancement dyes can be selected to provide a desired chroma enhancement effect. For example, in various implementations, the strength, and/or concentration of the one or more chroma enhancement dyes can be reduced if a small amount of attenuation (or chroma enhancement) in a certain spectral bandwidth is desired. As another example, in various implementations, the strength, and/or concentration of the one or more chroma enhancement dyes can be increased if a large amount of attenuation (or chroma enhancement) in a certain spectral bandwidth is desired. Implementations of the optical filter layer that are configured to provide a small amount of attenuation (or chroma enhancement) may be thinner as compared to implementations of the optical filter layer that are configured to provide a large amount of attenuation (or chroma enhancement).

The thickness of the optical filter layer can also depend on the solubility of the one or more chroma enhancement dyes in the synthetic material (e.g., polymeric material, resin, etc.) that is selected to form the optical filter layer. For example, if the solubility of the one or more chroma enhancement dyes in the synthetic material that is selected to form the optical filter is low then a larger amount of the synthetic material may be required to achieve a desired strength, and/or concentration of the one or more chroma enhancement dyes which can result in a thicker optical filter layer. As another example, if the solubility of the one or more chroma enhancement dyes in the synthetic material that is selected to form the optical filter layer is high then a smaller amount of the synthetic material may be required to achieve a desired strength, and/or concentration of the one or more chroma enhancement dyes which can result in a thinner optical filter layer.

The optical filter can have one or more absorptance or absorbance peaks having a spectral bandwidth, a maximum absorptance or absorbance, a center wavelength located at a midpoint of the spectral bandwidth and an integrated absorptance peak area within the spectral bandwidth. The spectral bandwidth can be equal to the full width of the absorbance/absorptance peak at 80% of the maximum absorbance/absorptance of the absorbance/absorptance peak. In some implementations, the spectral bandwidth can be equal to the full width of the absorbance/absorptance peak at 50%-90% of the maximum absorbance/absorptance of the absorbance/absorptance peak. In various implementations, the full width of the absorbance/absorptance peak at 50% of the maximum absorbance/absorptance of the absorbance/absorptance peak can be greater than the full width of the absorbance/absorptance peak at 80% of the maximum absorbance/absorptance by an amount between 2-30 nm.

In various implementations, the center wavelength of the absorptance/absorbance peak can be between 440 nm and 500 nm. For example, the center wavelength of the absorptance/absorbance peak can be between 440 nm and 450 nm, between 445 nm and between 455 nm, between 450 nm and between 460 nm, between 455 nm and between 465 nm, between 460 nm and between 470 nm, between 465 nm and between 475 nm, between 470 nm and between 480 nm, between 475 nm and between 485 nm, between 480 nm and between 490 nm, between 485 nm and between 485 nm and/or between 490 nm and between 500 nm.

In various implementations, the center wavelength of the absorptance/absorbance peak can be between 560 nm and 585 nm. For example, the center wavelength of the absorptance/absorbance peak can be between 560 nm and 570 nm, between 565 nm and 575 nm, between 570 nm and 580 nm, and/or between 575 nm and 585 nm. In some implementations, the center wavelength of the absorptance/absorbance peak can be between 560 nm and 600 nm or between 630 nm and 680 nm.

In various implementations, an attenuation factor of the absorptance/absorbance peak can be greater than or equal to about 0.8 and less than 1.0, wherein the attenuation factor of the absorptance/absorbance peak is obtained by dividing an integrated absorptance peak area within the spectral bandwidth by the spectral bandwidth of the absorptance/absorbance peak.

The optical filter can comprise one or organic dyes. The optical filter can comprise one or more chroma enhancement dyes. For example, the optical filter can comprise a violet, blue, green, yellow, or red chroma enhancement dye. The optical filter can be configured to increase the average chroma value of uniform intensity light stimuli having a bandwidth of 30 nm transmitted through the optical filter within a spectral range of 440 nm to 510 nm by an amount greater than or equal to 5% as compared to a neutral filter that uniformly attenuates the same average percentage of light as the optical filter within the spectral range of 440 nm to 510 nm. For example, the optical filter can be configured to increase the average chroma value of uniform intensity light stimuli having a bandwidth of 30 nm transmitted through the optical filter within a spectral range of 440 nm to 510 nm by an amount greater than or equal to 8%, 10%, 14%, 18%, 20% or 25% as compared to a neutral filter that uniformly attenuates the same average percentage of light as the optical filter within the spectral range of 440 nm to 510 nm.

The optical filter can be configured to increase the average chroma value of uniform intensity light stimuli having a bandwidth of 30 nm transmitted through the optical filter within a spectral range of 540 nm to 600 nm by an amount greater than or equal to 5% as compared to a neutral filter that uniformly attenuates the same average percentage of light as the optical filter within the spectral range of 540 nm to 600 nm. For example, the optical filter can be configured to increase the average chroma value of uniform intensity light stimuli having a bandwidth of 30 nm transmitted through the optical filter within a spectral range of 540 nm to 600 nm by an amount greater than or equal to 8%, 10%, 14%, 18%, 20% or 25% as compared to a neutral filter that uniformly attenuates the same average percentage of light as the optical filter within the spectral range of 540 nm to 600 nm.

The functional layer 655 can be separable from optical filter integrated with one or both of the polymeric layers 650 and 660 and/or one or both of the polymeric layers 650 and 660. The functional layer 655 can be adhered to one or both of the polymeric layers 650 and 660 using one or more adhesive layers. For example, the functional layer 655 and one or both of the polymeric layers 650 and 660 can be attached through electrostatic adhesion, a pressure sensitive adhesive, another adhesive, or any combination of adhesives. In some implementations, the functional layer 655 can be laminated to one or both the polymeric layers 650 and 660. The functional layer 655 can be attached to one or both of the polymeric layers 650 and 660 using methods that allow the removal of the functional layer 655. The functional layer 655 can be configured to be removable by a user by applying a pulling force to the functional layer 655 and/or one or both of the polymeric layers 650 and 660. The adhesion between the functional layer 655 and the polymeric layer to which it is attached can be such that applying a force by a person can be sufficient to remove the functional layer 655 from the eyewear. For example, the functional layer 655 can be attached to one or both of the polymeric layers 650 and 660 through the use of electrostatic adhesion. By overcoming the electrostatic force maintaining the functional layer 655 joined to one or both of the polymeric layers 650 and 660, a user can peel the functional layer 655 from the eyewear. In some embodiments, the frame or other component of the eyewear includes a mechanism that aids in the removal of the functional layer 655. For example, a roller or slider can be built into the frame that aids a user in pulling the functional layer 655 off of the one or both of the polymeric layers 650 and 660. In some implementations, the functional layer 655 can at least partially comprise the optical filter.

Figure 6D:
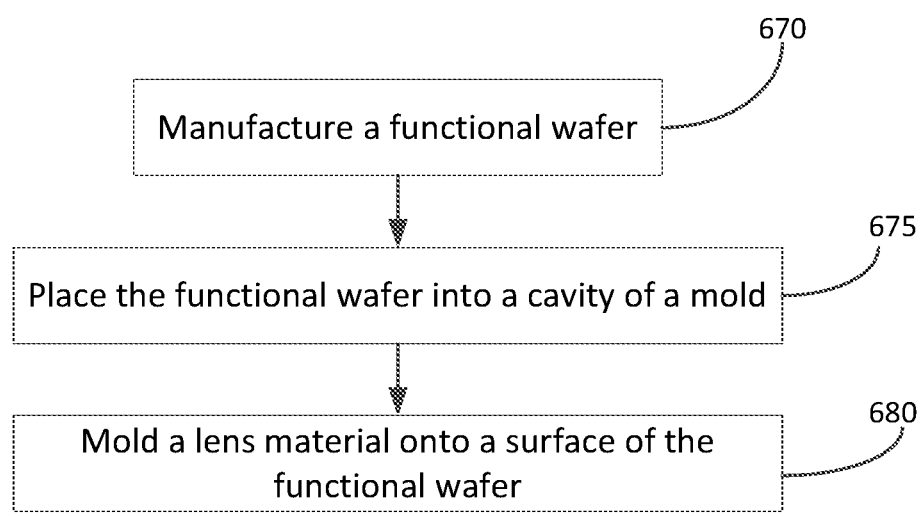
FIG. 6D illustrates a flowchart showing an example process for manufacturing various embodiments of lenses described herein.

The implementations of lenses 600a-600c can be manufactured using the various manufacturing methods described herein. One method of manufacturing the implementations of lenses 600a-600c is depicted in FIG. 6D. The method comprises manufacturing the wafer 640 as depicted in block 670. The wafer 640 can be manufactured according to one or more manufacturing methods described herein. For example, the wafer 640 can be manufactured using molding, overmolding, insert injection molding, transfer molding, 2-shot injection molding process, multi-shot injection molding process, casting or lamination. The manufactured wafer 640 is placed into the cavity of a mold as shown in block 675 of FIG. 6D. The material of the lens base 635 is introduced into the mold cavity to integrate the lens base 635 with the wafer 640 as shown in block 680 of FIG. 6D.

Figure 7A:
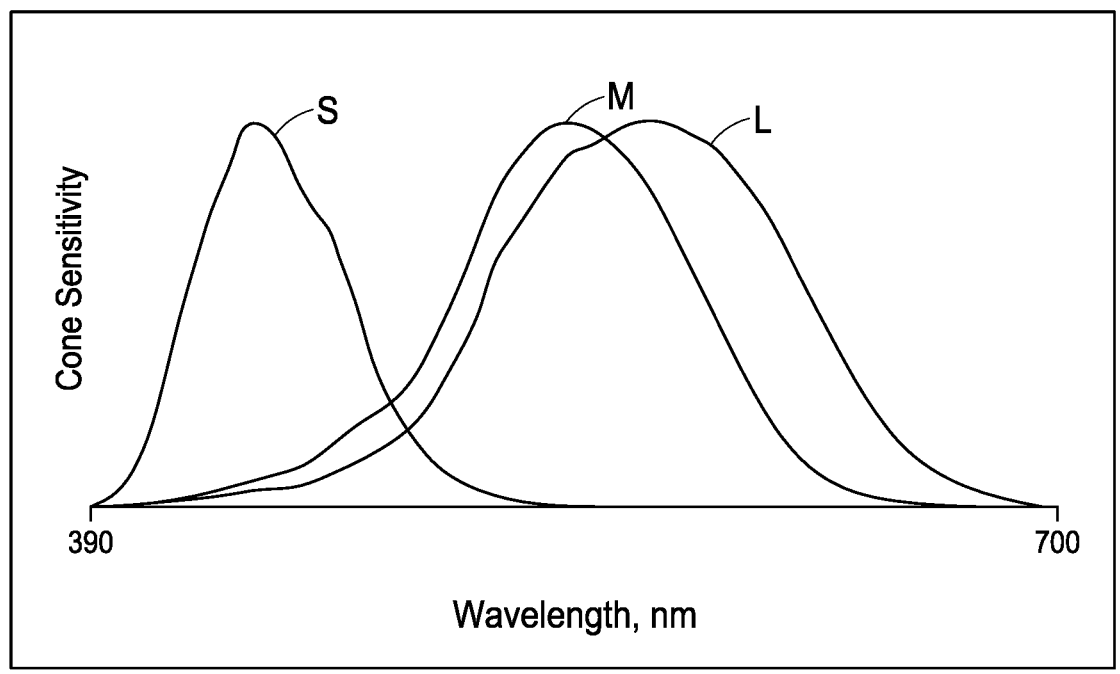
FIG. 7A is a graph showing sensitivity curves for cone photoreceptor cells in the human eye.

Various implementations of optical filters that can enhance chroma in one or more spectral bands are described below. To design a filter that increases chroma for an array of colors, one can account for the mechanisms involved in the eye's perception of color. The photopically adapted eye (e.g., the human eye) shows peak sensitivities at 440, 545, and 565 nm. These peak sensitivities correspond to each of three optical sensors found in the eye's retina known as cones. The location and shape of the cone sensitivity profiles have recently been measured with substantial accuracy in Stockman and Sharpe, "The spectral sensitivities of the middle- and long-wavelength-sensitive cones derived from measurements in observers of known genotype," Vision Research 40 (2000), pp. 1711-1737, which is incorporated by reference herein and made a part of this specification. The sensitivity profiles S, M, L for cone photoreceptor cells in the human eye as measured by Stockman and Sharpe are shown in FIG. 7A.

Figure 7B:
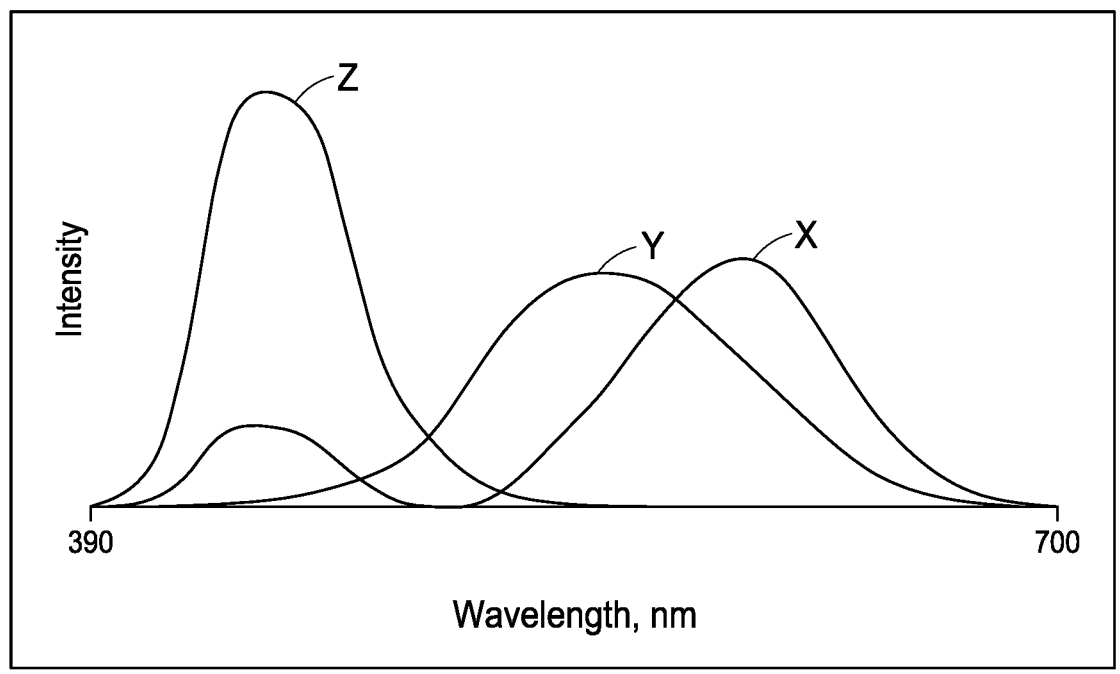
FIG. 7B is a graph showing the 1931 CIE XYZ tristimulus functions.

The cone sensitivity profiles can be converted from sensitivity data to quantities describing color such as, for example, the CIE tristimulus color values. The 1931 CIE XYZ tristimulus functions are shown in FIG. 7B. In some embodiments, the CIE tristimulus color values are used to design an optical filter. For example, the CIE color values can be used to calculate the effect of an optical filter on perceived color using values of chroma, C*, in the CIE L*C*h* color space.

The human cone sensitivities can be converted to the 1931 CIE XYZ color space using the linear transformation matrix M described in Golz and Macleod, "Colorimetry for CRT displays," J. Opt. Soc. Am. A vol. 20, no. 5 (May 2003), pp. 769-781, which is incorporated by reference herein and made a part of this specification. The linear transformation is shown in Eq. 1:

$$M = \begin{bmatrix} 0.17156 & 0.52901 & 0.02199 \\ 0.15955 & 0.48553 & 0.04298 \\ 0.01916 & 0.03989 & 1.03993 \end{bmatrix} \quad \text{(Eq. 1)}$$

$$\begin{bmatrix} L \\ M \\ S \end{bmatrix} = M \begin{bmatrix} X \\ Y \\ Z \end{bmatrix}$$

To solve for the 1931 CIE XYZ color space values (X Y Z), the Stockman and Sharpe 2000 data can be scaled by factors of 0.628, 0.42, and 1.868 for L, M, and S cone sensitivities, respectively, and multiplied by the inverse of the linear transformation matrix M in the manner shown in Eqs. 2-1 and 2-2:

$$\begin{bmatrix} X \\ Y \\ Z \end{bmatrix} = M^{-1} \begin{bmatrix} L \\ M \\ S \end{bmatrix} \quad \text{(Eq. 2-1)}$$

where:

$$M^{-1} = \begin{bmatrix} 2.89186 & -3.13517 & 0.19072 \\ 0.95178 & 1.02077 & -0.02206 \\ -0.01677 & 0.09691 & 0.95724 \end{bmatrix} \quad \text{(Eq. 2-2)}$$

The CIE tristimulus values, X Y Z, can be converted to the 1976 CIE L*a*b* color space coordinates using the nonlinear equations shown in Eqs. 3-1 through 3-7. Where $X_n=95.02$, $Y_n=100.00$, and $Z_n=108.82$, $$L^* = 116\sqrt[3]{Y/Y_n} - 16 \quad \text{(Eq. 3-1)}$$

$$a^* = 500(\sqrt[3]{X/X_n} - \sqrt[3]{Y/Y_n}) \quad \text{(Eq. 3-2)}$$

$$b^* = 200(\sqrt[3]{Y/Y_n} - \sqrt[3]{Z/Z_n}) \quad \text{(Eq. 3-3)}$$

If $X/X_n$, $Y/Y_n$, or $Z/Z_n < 0.008856$, then:

$$L^* = 903.3(Y/Y_n) \quad \text{(Eq. 3-4)}$$

$$a^* = 500[f(X/X_n) - f(Y/Y_n)] \quad \text{(Eq. 3-5)}$$

$$b^* = 200[f(Y/Y_n) - f(Z/Z_n)] \quad \text{(Eq. 3-6)}$$

For $\alpha > 0.005586$; $\alpha = X/X_n$, $Y/Y_n$, or $Z/Z_n$ $$f(\alpha) = \sqrt[3]{\alpha}$$

Otherwise:

$$f(\alpha) = 7.87\alpha + 16/116 \quad \text{(Eq. 3-7)}$$

Chroma or C* can be then be calculated by further conversion from CIE L*a*b* to CIE L*C*h* using Eq. 4:

$$C^* = \sqrt{a^{*2} + b^{*2}} \quad \text{(Eq. 4)}$$

As mentioned above, the colors observed in the physical world are stimulated by wide bands of wavelengths. To simulate this and then calculate the effects of an optical filter, filtered and non-filtered bands of light are used as input to the cone sensitivity space. The effect on chroma can then be predicted via the transformations listed above.

When inputting a spectrum of light to the cone sensitivity space, the mechanism of color recognition in the human eye can be accounted for. Color response by the eye is accomplished by comparing the relative signals of each of the three cones types: S, M, and L. To model this with broad band light, a sum of the intensities at each wavelength in the input spectrum is weighted according to the cone sensitivity at that wavelength. This is repeated for all three cone sensitivity profiles. An example of this calculation is shown in Table B:

TABLE B

| Wavelength λ (nm) | Input light intensity, arbitrary units | | L Cone Sensitivity | | L Weighted light intensity |
| --- | --- | --- | --- | --- | --- |
| 500 | 0.12 | × | 0.27 | = | 0.032 |
| 501 | 0.14 | × | 0.28 | = | 0.039 |
| 502 | 0.16 | × | 0.31 | = | 0.05 |
| 503 | 0.17 | × | 0.33 | = | 0.056 |
| 504 | 0.25 | × | 0.36 | = | 0.09 |
| 505 | 0.41 | × | 0.37 | = | 0.152 |
| 506 | 0.55 | × | 0.39 | = | 0.215 |
| 507 | 0.64 | × | 0.41 | = | 0.262 |
| 508 | 0.75 | × | 0.42 | = | 0.315 |
| 509 | 0.63 | × | 0.44 | = | 0.277 |
| 510 | 0.54 | × | 0.46 | = | 0.248 |
| 511 | 0.43 | × | 0.48 | = | 0.206 |
| 512 | 0.25 | × | 0.49 | = | 0.123 |
| 513 | 0.21 | × | 0.50 | = | 0.105 |
| 514 | 0.18 | × | 0.51 | = | 0.092 |
| 515 | 0.16 | × | 0.52 | = | 0.083 |
| 516 | 0.15 | × | 0.54 | = | 0.081 |
| 517 | 0.13 | × | 0.56 | = | 0.073 |

TABLE B-continued

| Wavelength λ (nm) | Input light intensity, arbitrary units | | L Cone Sensitivity | | L Weighted light intensity | |
|---|---|---|---|---|---|---|
| 518 | 0.11 | × | 0.57 | = | 0.063 | |
| 519 | 0.09 | × | 0.59 | = | 0.053 | Total |
| 520 | 0.08 | × | 0.61 | = | 0.049 | weighted |
| Sum | 6.15 | | | | 2.664 | light intensity, normalized 0.433 |

Normalized weighted light intensities for all three cone types can then be converted to the 1931 CIE XYZ color space via a linear transformation matrix, M. This conversion facilitates further conversion to the 1976 CIE L*a*b* color space and the subsequent conversion to the CIE L*C*h color space to yield chroma values.

To simulate the effect of a filter placed between the eye and the physical world, an input band of light can be modified according to a prospective filter's absorption characteristics. The weighted light intensity is then normalized according to the total sum of light that is transmitted through the filter.

In certain embodiments, to test the effect of a filter on various colors of light, the spectral profile, or at least the bandwidth, of an input is determined first. The appropriate bandwidth for the model's input is typically affected by the environment of use for the optical filter. A reasonable bandwidth for a sunglass lens can be about 30 nm, since this bandwidth represents the approximate bandwidth of many colors perceived in the natural environment. Additionally, 30 nm is a narrow enough bandwidth to permit transmitted light to fall within responsive portions of the cone sensitivity functions, which are approximately twice this bandwidth. A filter designed using a 30 nm input bandwidth will also improve the chroma of colors having other bandwidths, such as 20 nm or 80 nm. Thus, the effect of a filter on chroma can be determined using color inputs having a 30 nm bandwidth or another suitable bandwidth that is sensitive to a wide range of natural color bandwidths.

Other bandwidths are possible. The bandwidth can be significantly widened or narrowed from 30 nm while preserving the chroma-enhancing properties of many filter designs. The 30 nm bandwidth described above is representative of wider or narrower input bandwidths that can be used to produce desired features of an optical filter. The term "bandwidth" is used herein in its broad and ordinary sense. This disclosure sets forth several techniques for characterizing the bandwidth of a spectral feature. Unless otherwise specified, any suitable bandwidth characterization disclosed herein can be applied to define the spectral features identified in this specification. For example, in some embodiments, the bandwidth of a peak encompasses the full width of a peak at half of the peak's maximum value (FWHM value) and any other commonly used measurements of bandwidth.

A sample calculation of the normalized L weighted light intensity using the 30 nm bandwidth and an example filter is shown in Table C:

TABLE C

| Wavelength λ (nm) | Incoming light intensity arbitrary units | | Filter T % | | L Cone Sensitivity | | Filtered L weighted light intensity | |
|---|---|---|---|---|---|---|---|---|
| 499 | 0 | × | 0.12 | × | 0.25 | = | 0.00 | |
| 500 | 1 | × | 0.34 | × | 0.27 | = | 0.09 | |
| 501 | 1 | × | 0.41 | × | 0.28 | = | 0.11 | |
| 502 | 1 | × | 0.42 | × | 0.31 | = | 0.13 | |
| 503 | 1 | × | 0.44 | × | 0.33 | = | 0.15 | |
| 504 | 1 | × | 0.51 | × | 0.36 | = | 0.18 | |
| 505 | 1 | × | 0.55 | × | 0.37 | = | 0.20 | |
| 506 | 1 | × | 0.61 | × | 0.39 | = | 0.24 | |
| 507 | 1 | × | 0.78 | × | 0.41 | = | 0.32 | |
| 508 | 1 | × | 0.75 | × | 0.42 | = | 0.32 | |
| 509 | 1 | × | 0.85 | × | 0.44 | = | 0.37 | |
| 510 | 1 | × | 0.87 | × | 0.46 | = | 0.40 | |
| 511 | 1 | × | 0.91 | × | 0.48 | = | 0.44 | |
| 512 | 1 | × | 0.95 | × | 0.49 | = | 0.47 | |
| 513 | 1 | × | 0.96 | × | 0.50 | = | 0.48 | |
| 514 | 1 | × | 0.97 | × | 0.51 | = | 0.49 | |
| 515 | 1 | × | 0.96 | × | 0.52 | = | 0.50 | |
| 516 | 1 | × | 0.98 | × | 0.54 | = | 0.53 | |
| 517 | 1 | × | 0.76 | × | 0.56 | = | 0.43 | |
| 518 | 1 | × | 0.75 | × | 0.57 | = | 0.43 | |
| 519 | 1 | × | 0.61 | × | 0.59 | = | 0.36 | |
| 520 | 1 | × | 0.55 | × | 0.61 | = | 0.34 | |
| 521 | 1 | × | 0.48 | × | 0.72 | = | 0.35 | |
| 522 | 1 | × | 0.42 | × | 0.78 | = | 0.33 | |
| 523 | 1 | × | 0.41 | × | 0.81 | = | 0.33 | |
| 524 | 1 | × | 0.35 | × | 0.84 | = | 0.29 | |
| 525 | 1 | × | 0.33 | × | 0.85 | = | 0.28 | |
| 526 | 1 | × | 0.31 | × | 0.88 | = | 0.27 | |
| 527 | 1 | × | 0.28 | × | 0.87 | = | 0.24 | |
| 528 | 1 | × | 0.27 | × | 0.89 | = | 0.24 | |
| 529 | 1 | × | 0.22 | × | 0.91 | = | 0.20 | Total Filtered |
| 530 | 0 | × | 0.18 | × | 0.92 | = | 0.00 | L Weighted |
| 531 | 0 | × | 0.15 | × | 0.93 | = | 0.00 | Light Intensity, |
| Sum | 30 | | 18.4 | | | | 9.51 | Normalized 0.52 |

In some embodiments, an optical filter is designed by using spectral profiles of candidate filters to calculate the effect of the candidate filters on chroma. In this way, changes in the filter can be iteratively checked for their effectiveness in achieving a desired result. Alternatively, filters can be designed directly via numerical simulation. Examples and comparative examples of optical filters and the effects of those optical filters on chroma are described herein. In each case, the chroma of input light passing through each filter is compared to the chroma of the same input without filtering. Plots of "absorptance %" against visible spectrum wavelengths show the spectral absorptance profile of the example or comparative example optical filter. Each plot of "chroma, C*, relative" against visible spectrum wavelengths shows the relative chroma of a 30 nm wide light stimulus of uniform intensity after the stimulus passes through a wavelength-dependent optical filter as a thinner curve on the plot, with the center wavelength of each stimulus being represented by the values on the horizontal axis. Each plot of "chroma, C*, relative" also shows the relative chroma of the same 30 nm wide light stimulus passing through a neutral filter that attenuates the same average percentage of light within the bandwidth of the stimulus as the wavelength-dependent optical filter.

One goal of filter design can be to determine the overall color appearance of a lens. In some embodiments, the perceived color of overall light transmitted from the lens is bronze, amber, violet, gray, or another color. In some cases, the consumer has preferences that are difficult to account for quantitatively. In certain cases, lens color adjustments can be accomplished within the model described in this disclosure. The impact of overall color adjustments to the filter design can be calculated using a suitable model. In some cases, color adjustments can be made with some, little, or no sacrifice to the chroma characteristics being sought. In some embodiments, a lens has an overall color with a relatively low chroma value. For example, the lens can have a chroma value of less than 60. A chroma-increasing optical filter used in such a lens can provide increased colorfulness for at least some colors as compared to when the same optical filter is used in a lens with an overall color having a higher chroma value.

Specific bandwidths of light with uniform intensity were used to calculate the relative chroma profiles in this disclosure. In figures where the relative chroma profile of a filter is shown, the scale is maintained constant throughout this disclosure such that relative chroma shown in one figure can be compared to relative chroma shown in other figures, unless otherwise noted. In some figures, the chroma profile of a filter can be clipped in order to show detail and maintain consistent scale.

Figure 8:
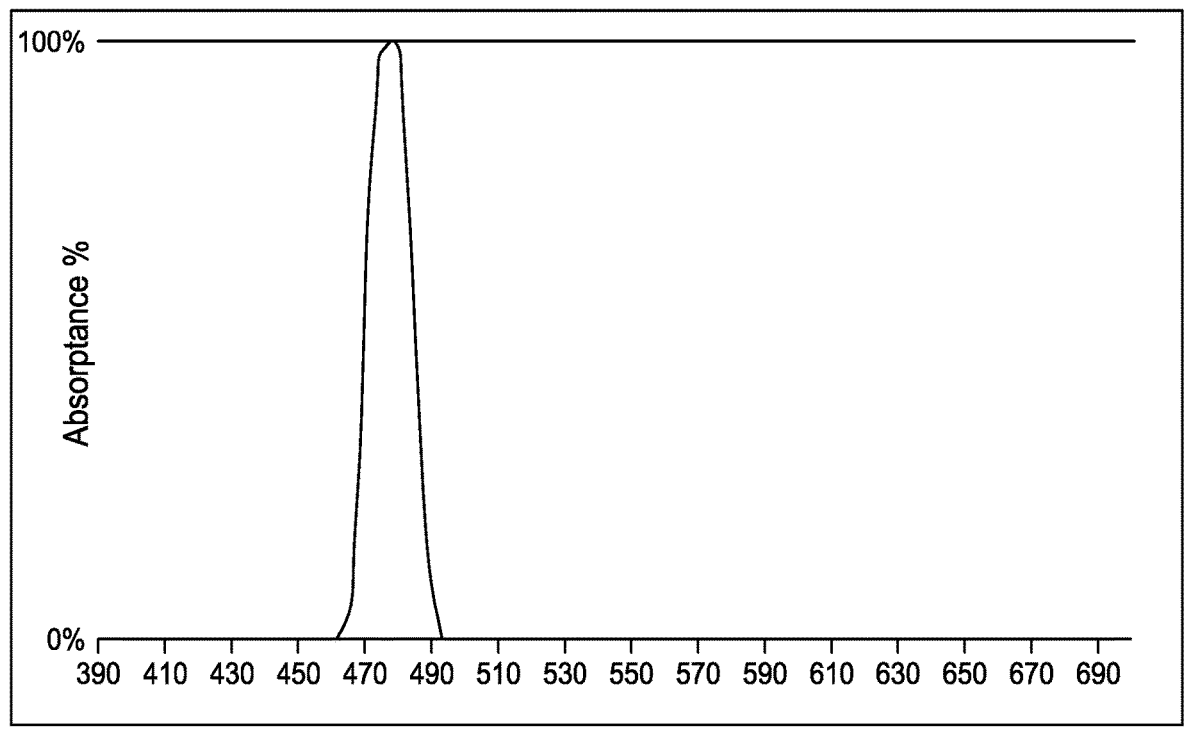
FIG. 8 is a graph showing the spectral absorptance profile of an optical filter.

In some embodiments, an optical filter is configured to increase or maximize chroma in the blue to blue-green region of the visible spectrum. A filter with such a configuration can have an absorptance peak centered at about 478 nm or at about 480 nm, as shown in FIG. 8. The full width at half maximum (FWHM) of the absorptance peak shown in FIG. 8 is about 20 nm. However, other absorptance peak widths can be used, including bandwidths greater than or equal to about 10 nm, greater than or equal to about 15 nm, greater than or equal to about 20 nm, less than or equal to about 60 nm, less than or equal to about 50 nm, less than or equal to about 40 nm, between about 10 nm and about 60 nm, or between any of the other foregoing values. The bandwidth of an absorptance peak can be measured in any suitable fashion in addition to or in place of FWHM. For example, the bandwidth of an absorptance peak can include the full width of a peak at 80% of the maximum, the full width of a peak at 90% of the maximum, the full width of a peak at 95% of the maximum, or the full width of a peak at 98% of the maximum.

The spectral features of an optical filter can also be evaluated by considering the transmittance profile of the filter and/or a lens incorporating the filter. In some embodiments, the bandwidth and/or attenuation factors of transmittance valleys can be measured. The bandwidth of a transmittance valley can be defined, for example, as the full width of the valley at a certain transmittance, such as 2%, 5%, 10%, or 20%. In certain embodiments, the bandwidth of a transmittance valley is defined as the full width of the valley at 1.5 times, two times, four times, ten times, or one hundred times the minimum transmittance. In some embodiments, the bandwidth of a transmittance valley is defined as the full width of the valley at a certain offset from the minimum transmittance, such as, for example, the minimum transmittance plus 1% transmittance, plus 2% transmittance, plus 5% transmittance, plus 10% transmittance, or plus 20% transmittance. The attenuation factor of a transmittance valley can be calculated by dividing the area between 100% and the transmittance profile curve by the bandwidth, within the spectral bandwidth of the transmittance valley. Alternatively, the attenuation factor of a transmittance valley can be calculating by finding the absorptance within the bandwidth by subtracting the area under the transmittance curve from 1 and dividing the result by the bandwidth.

The spectral features of an optical filter can also be evaluated by considering the absorbance profile of the filter and/or a lens incorporating the filter. In some embodiments, an optical filter is configured to increase or maximize chroma in the blue to blue-green region of the visible spectrum. A filter with such a configuration can have an absorbance peak centered at about 478 nm or at about 480 nm, as shown in FIG. 8. The full width at half maximum (FWHM) of the absorbance peak shown in FIG. 8 is about 20 nm. However, other absorbance peak widths can be used, including bandwidths greater than or equal to about 10 nm, greater than or equal to about 15 nm, greater than or equal to about 20 nm, less than or equal to about 60 nm, less than or equal to about 50 nm, less than or equal to about 40 nm, between about 10 nm and about 60 nm, or between any of the other foregoing values. The bandwidth of an absorbance peak can be measured in any suitable fashion in addition to or in place of FWHM. For example, the bandwidth of an absorbance peak can include the full width of a peak at 80% of the maximum, the full width of a peak at 90% of the maximum, the full width of a peak at 95% of the maximum, or the full width of a peak at 98% of the maximum.

Figure 9A:
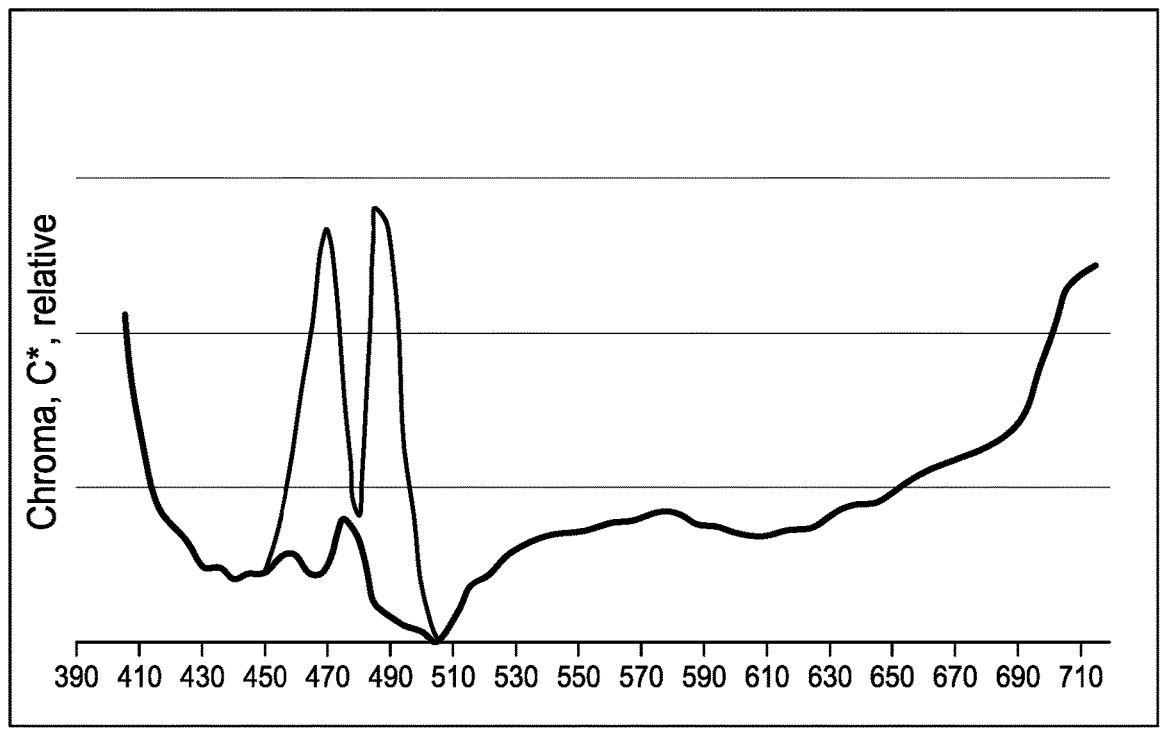
FIG. 9A is a graph showing the chroma profile of a filter with the absorptance profile shown in FIG. 8 and of neutral filter.
Figure 9B:
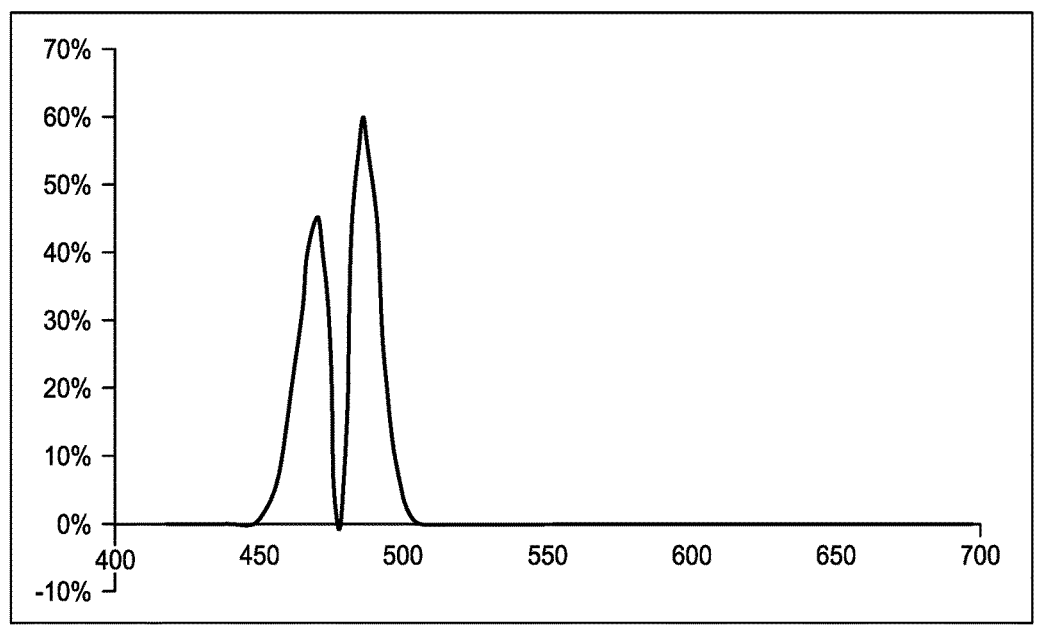
FIG. 9B is a graph showing the percentage difference in chroma of a filter with the absorptance profile shown in FIG. 8 compared to a neutral filter.

FIG. 9A shows the relative chroma, as a function of wavelength, of a filter having the absorptance profile shown in FIG. 8. Once again, the thicker black line corresponds to the chroma profile of a neutral filter having the same integrated light transmittance within each 30 nm stimulus band as within each corresponding band of the optical filter shown in FIG. 8. FIG. 9B shows a percentage difference in chroma between the output of the optical filter of FIG. 8 and the output of a filter that uniformly attenuates the same average percentage of light within each stimulus band as the optical filter of FIG. 8, wherein the input is a 30 nm uniform intensity stimulus and the horizontal axis indicates the center wavelength of each stimulus band.

Figure 10:
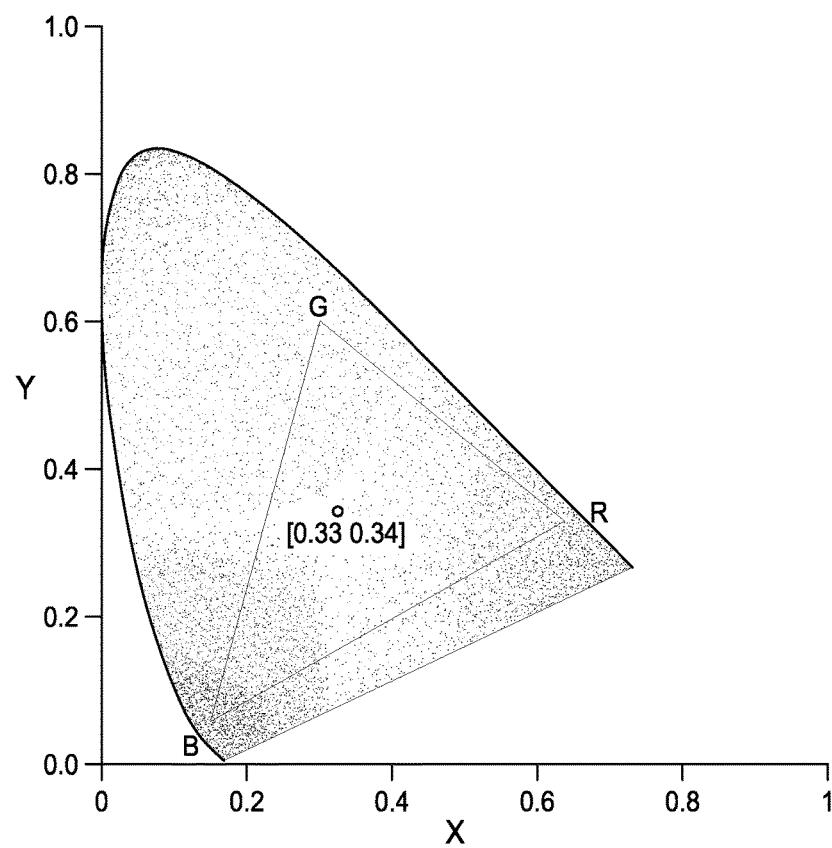
FIG. 10 is a chromaticity diagram for an optical filter having the absorptance profile shown in FIG. 8.

A CIE xy chromaticity diagram for the optical filter having an absorptance profile as shown in FIG. 8 is provided in FIG. 10. The chromaticity diagram shows the chromaticity of the filter as well as the gamut of an RGB color space.

Each of the chromaticity diagrams provided in this disclosure shows the chromaticity of the associated filter or lens, where the chromaticity is calculated using CIE illuminant D65.

In certain embodiments, an optical filter is configured to increase or maximize chroma in the blue region of the visible spectrum. A filter with such a configuration can provide an absorptance peak with a center wavelength and/or peak location at about 453 nm, at about 450 nm, or between about 445 nm and about 460 nm. The bandwidth of the absorptance peak can be greater than or equal to about 10 nm, greater than or equal to about 15 nm, greater than or equal to about 20 nm, or another suitable value.

Figure 11:
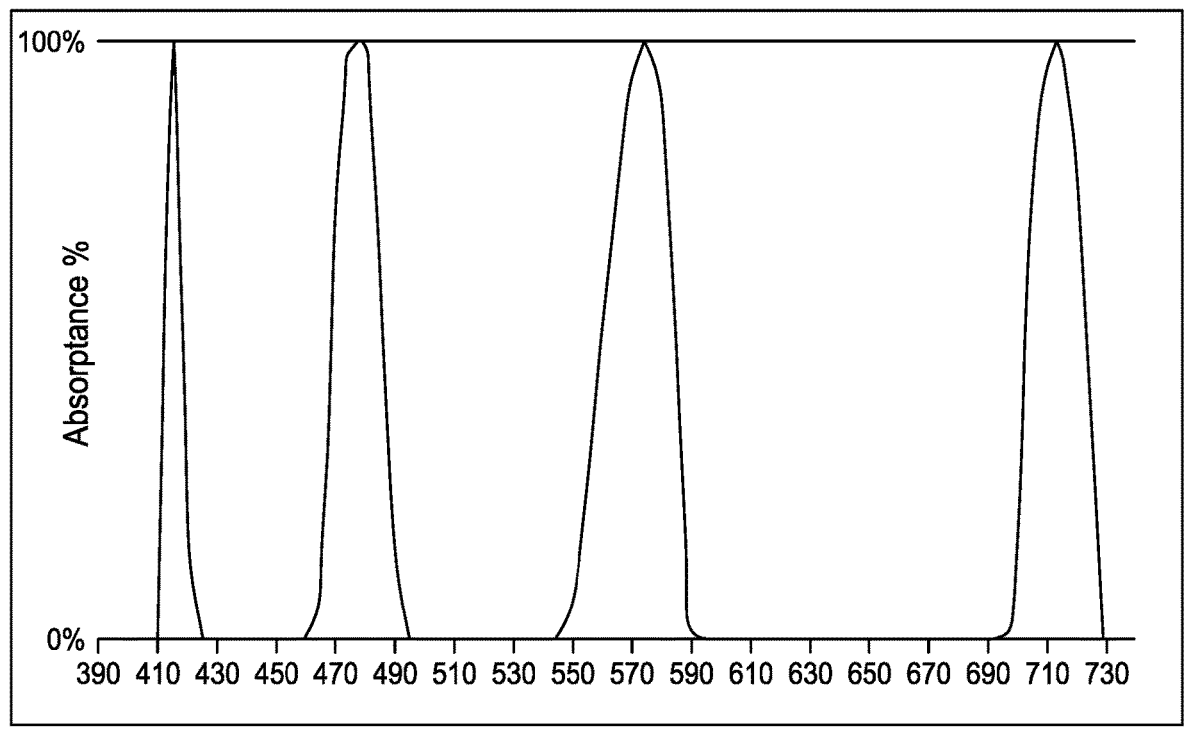
FIG. 11 is a graph showing the spectral absorptance profile of another optical filter.
Figure 12A:
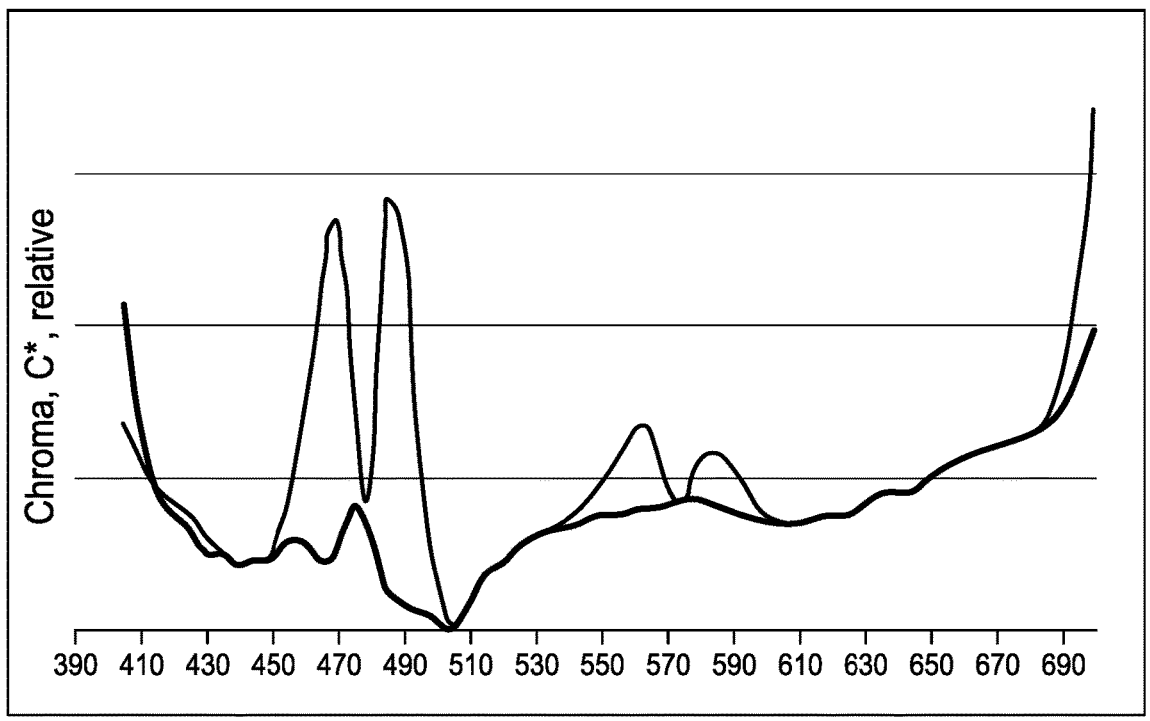
FIG. 12A is a graph showing the chroma profile of a filter with the absorptance profile shown in FIG. 11 and of a neutral filter.
Figure 12B:
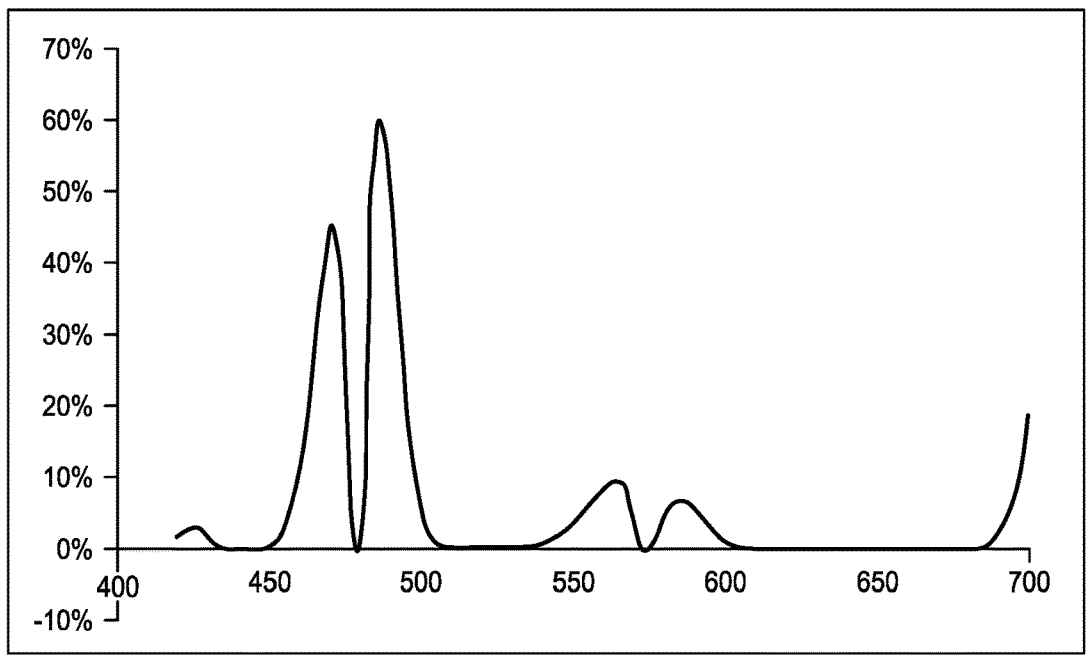
FIG. 12B is a graph showing the percentage difference in chroma of a filter with the absorptance profile shown in FIG. 11 compared to a neutral filter.
Figure 13:
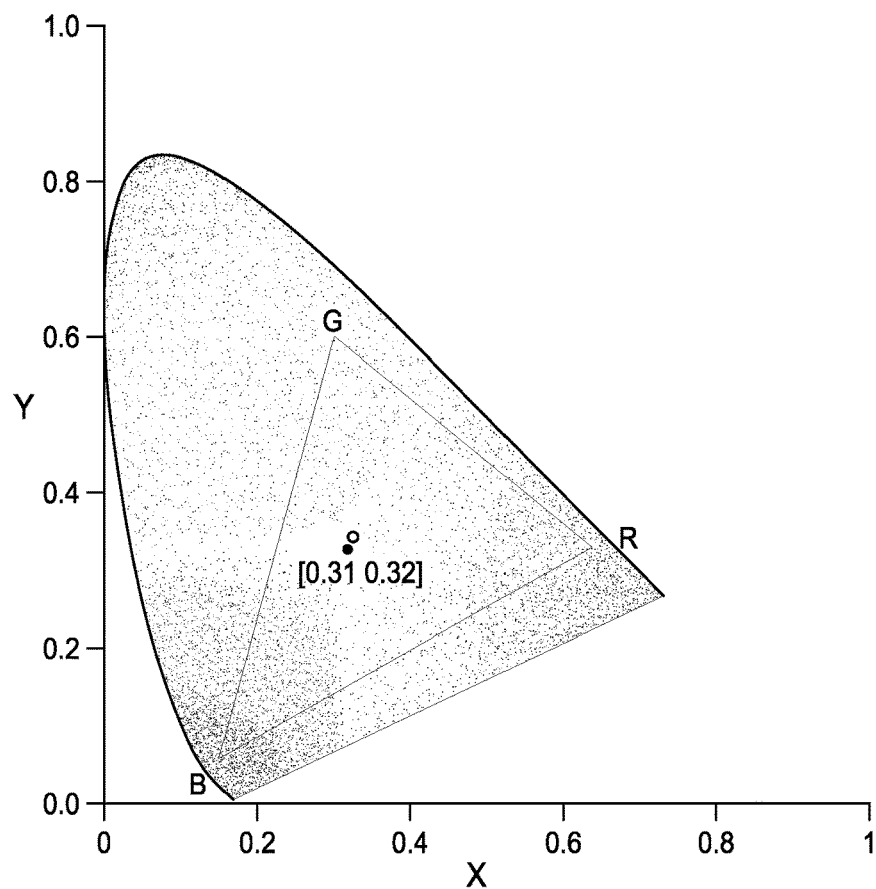
FIG. 13 is a chromaticity diagram for an optical filter having the absorptance profile shown in FIG. 11.

In some embodiments, an optical filter is configured to increase or maximize chroma across several, many, or most colors, or at least many colors that are commonly encountered in the environment of the wearer. Such an optical filter can include a plurality of absorptance peaks. For example, FIG. 11 shows a spectral absorptance profile of an embodiment of an optical filter including four absorptance peaks with center wavelengths at about 415 nm, about 478 nm, about 574 nm, and about 715 nm. Relative chroma profiles and a chromaticity diagram for the example filter are shown in FIGS. 12A, 12B and 13. The relative chroma profile shown in FIG. 12A shows that the optical filter of FIG. 11 provides a substantial increase in chroma in at least four spectral windows compared to a neutral filter having the same integrated light transmittance within each 30 nm stimulus band as within each corresponding band of the optical filter shown in FIG. 11. FIG. 12B shows a percentage difference in chroma between the output of the optical filter of FIG. 11 and the output of a filter that uniformly attenuates the same average percentage of light within each stimulus band as the optical filter of FIG. 11, wherein the input is a 30 nm uniform intensity stimulus and the horizontal axis indicates the center wavelength of each stimulus band.

Many other variations in the location and number of absorptance peaks are possible. For example, some embodiments significantly attenuate light between about 558 nm and about 580 nm by providing a peak at about 574 nm and adding an additional peak at about 561 nm. Such embodiments can provide substantially greater chroma in the green region, including at wavelengths near about 555 nm.

In certain embodiments, an optical filter increases chroma in the visible spectrum by increasing the degree to which light within the bandwidth of each absorptance peak is attenuated. The degree of light attenuation within the spectral bandwidth of an absorptance peak can be characterized by an "attenuation factor" defined as the integrated absorptance peak area within the spectral bandwidth of the absorptance peak divided by the spectral bandwidth of the absorptance peak. An example of an absorptance peak with an attenuation factor of 1 is a square wave. Such an absorptance peak attenuates substantially all light within its spectral bandwidth and substantially no light outside its spectral bandwidth. In contrast, an absorptance peak with an attenuation factor of less than 0.5 attenuates less than half of the light within its spectral bandwidth and can attenuate a significant amount of light outside its spectral bandwidth. It may not be possible to make an optical filter having an absorptance peak with an attenuation factor of exactly 1, although it is possible to design an optical filter having an absorptance peak with an attenuation factor that is close to 1.

In certain embodiments, an optical filter is configured to have one or more absorptance peaks with an attenuation factor close to 1. Many other configurations are possible. In some embodiments, an optical filter has one or more absorptance peaks (or transmittance valleys) with an attenuation factor greater than or equal to about 0.8, greater than or equal to about 0.9, greater than or equal to about 0.95, greater than or equal to about 0.98, between about 0.8 and about 0.99, greater than or equal to about 0.8 and less than 1, or between any of the other foregoing values. Any combination of one or more of the foregoing limitations on attenuation factor can be called "attenuation factor criteria." In certain embodiments, the attenuation factor of each absorptance peak in an optical filter meets one or more of the attenuation factor criteria. In some embodiments, the attenuation factor of each absorptance peak having a maximum absorptance over a certain absorptance threshold in an optical filter meets one or more of the attenuation factor criteria. The absorptance threshold can be about 0.5, about 0.7, about 0.9, about 1, between 0.5 and 1, or another value. It is understood that while certain spectral features are described herein with reference to an optical filter, each of the spectral features can equally apply to the spectral profile of a lens containing the optical filter, unless indicated otherwise.

Figure 14:
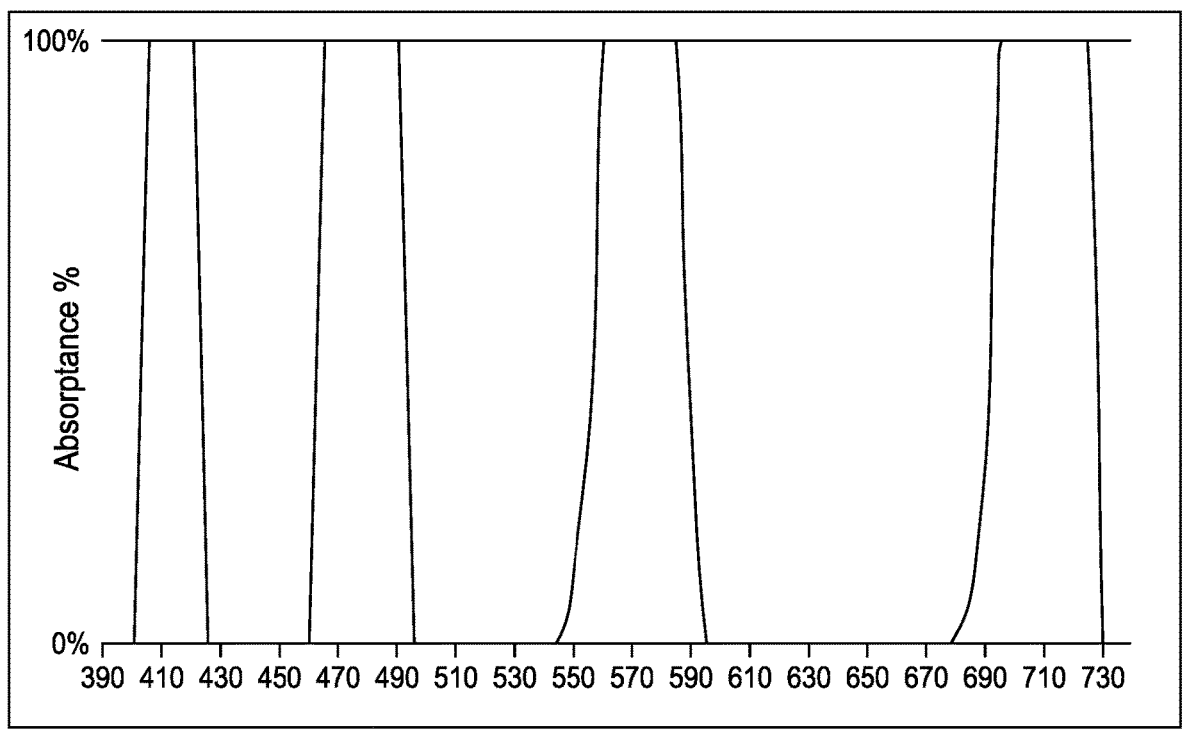
FIG. 14 is a graph showing the spectral absorptance profile of another optical filter.
Figure 15A:
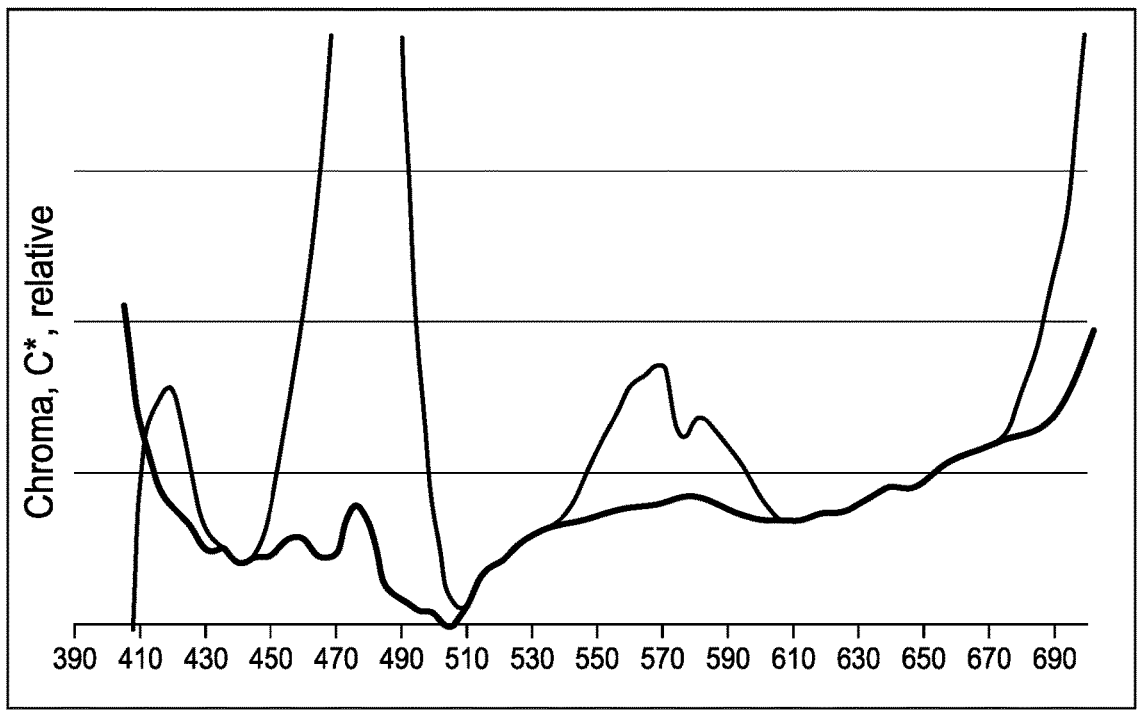
FIG. 15A is a graph showing the chroma profile of a filter with the absorptance profile shown in FIG. 14 and of a neutral filter.
Figure 15B:
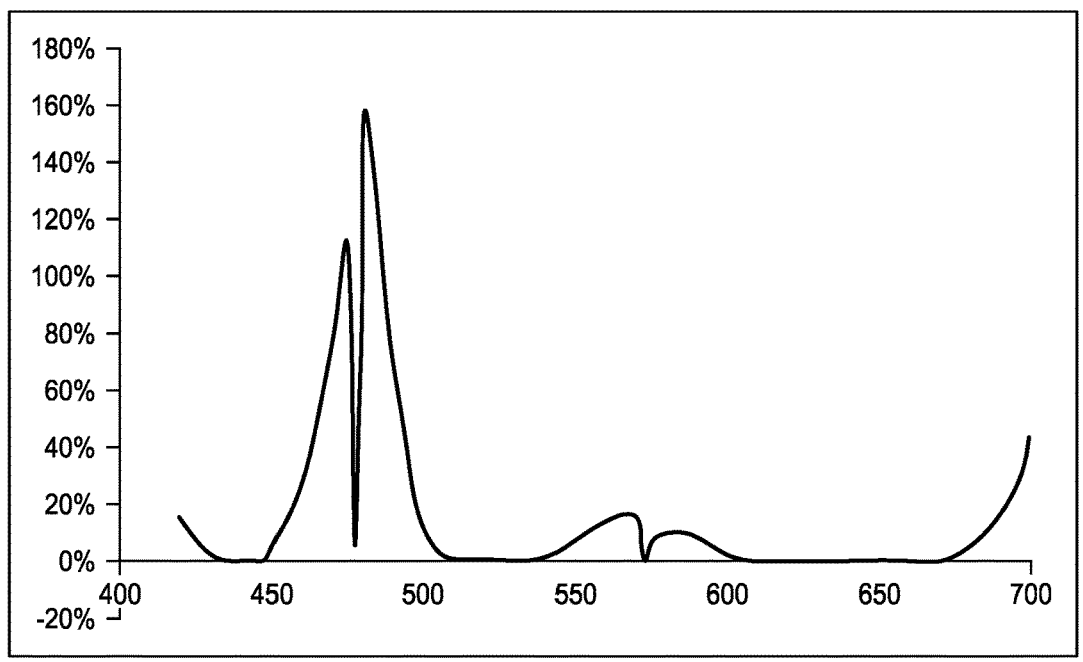
FIG. 15B is a graph showing the percentage difference in chroma of a filter with the absorptance profile shown in FIG. 14 compared to a neutral filter.
Figure 16:
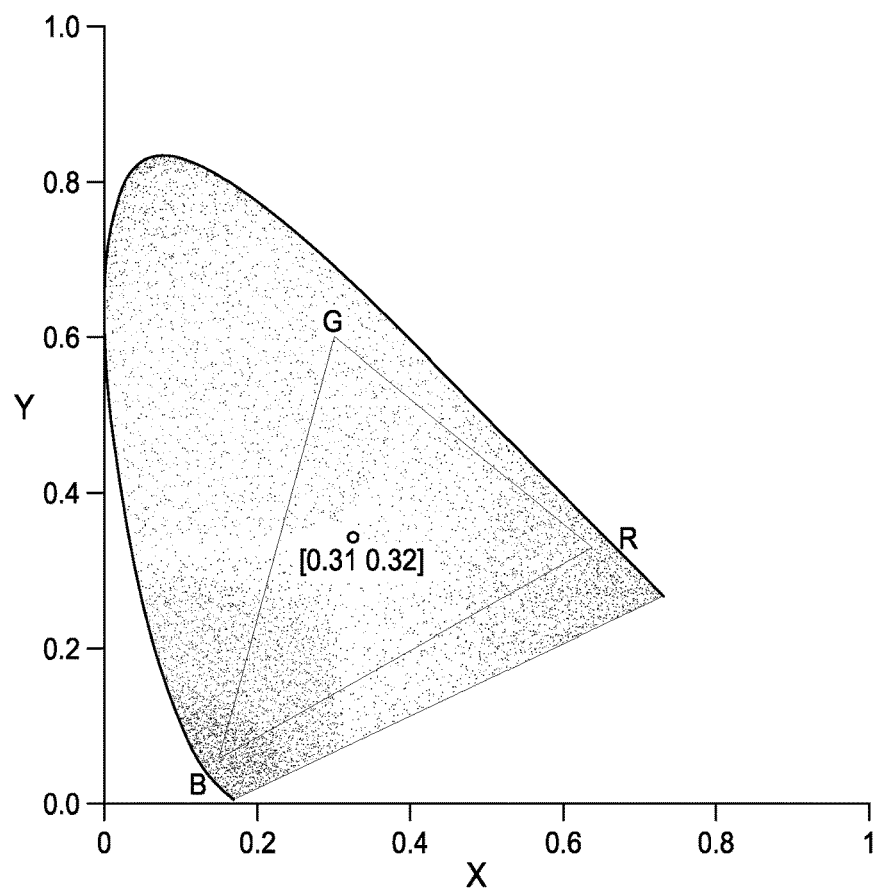
FIG. 16 is a chromaticity diagram for an optical filter having the absorptance profile shown in FIG. 14.

In some embodiments, an optical filter has absorptance peaks in each of four spectral bands, each of which has an attenuation factor greater than or equal to about 0.95. Because it is rare to observe monochromatic light in the physical world, some narrow bands of light can be nearly or completely blocked out without significant detriment to the overall variety of perceived spectral colors in the natural world. In other words, the optical filter can be employed in everyday vision without the loss of any substantial visual information. A spectral absorptance profile of an example optical filter having these attributes is shown in FIG. 14. Relative chroma profiles and a chromaticity diagram for the same optical filter are shown in FIGS. 15A, 15B, and 16. The relative chroma profiles shown in FIG. 15A include the chroma profile of a neutral filter having the same integrated light transmittance within each 30 nm stimulus band as within each corresponding band of the optical filter shown in FIG. 14, indicated by a thicker black line, and the chroma profile of the wavelength-dependent filter shown in FIG. 14, which is indicated by a thinner black line and is generally higher than the neutral filter profile. FIG. 15B shows a percentage difference in chroma between the output of the optical filter of FIG. 14 and the output of a filter that uniformly attenuates the same average percentage of light within each stimulus band as the optical filter of FIG. 14, wherein the input is a 30 nm uniform intensity stimulus and the horizontal axis indicates the center wavelength of each stimulus band.

In some embodiments, an optical filter has one or more absorptance peaks with a bandwidth that is at least partially within a chroma enhancement window. The width of the chroma enhancement window can be between about 22 nm and about 45 nm, between about 20 nm and about 50 nm, greater than or equal to about 20 nm, greater than or equal to about 15 nm, or another suitable bandwidth range. In certain embodiments, an optical filter is configured such that every absorptance peak with an attenuation factor greater than or equal to an absorptance threshold has a bandwidth within a chroma enhancement window. For example, the bandwidth of each of the absorptance peaks can be greater than or equal to about 10 nm, greater than or equal to about 15 nm, greater than or equal to about 20 nm, greater than or equal to about 22 nm, less than or equal to about 60 nm, less than or equal to about 50 nm, less than or equal to about 40 nm, between about 10 nm and about 60 nm, between about 20 nm and about 45 nm, or between any of the other foregoing values.

Figure 17:
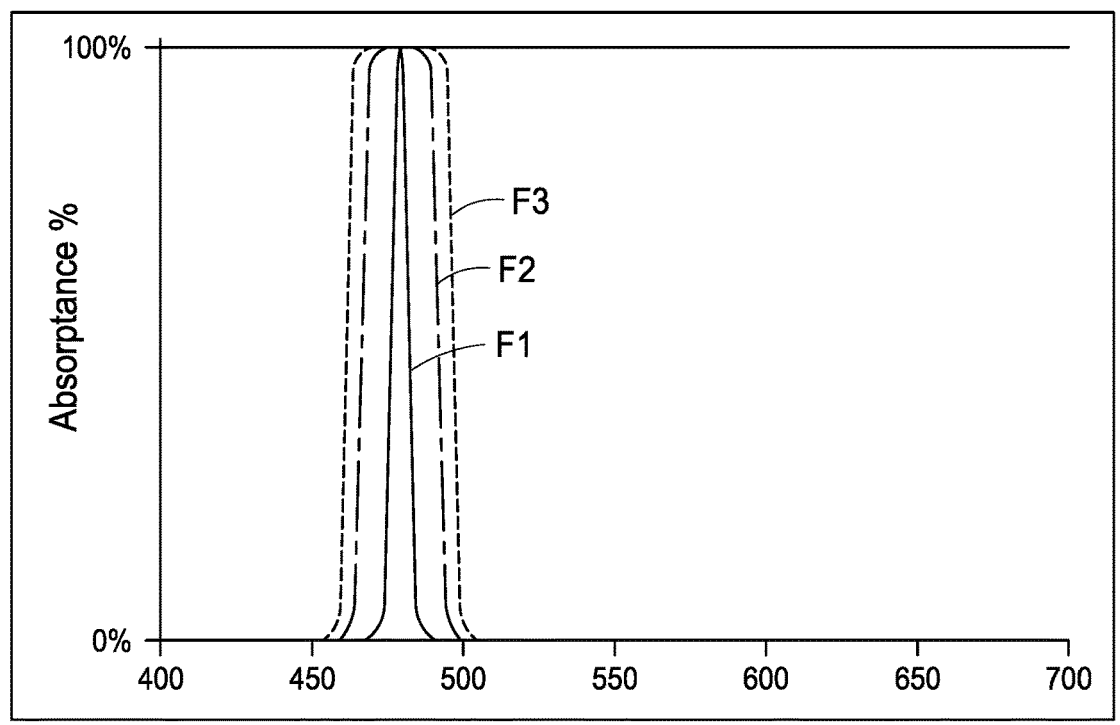
FIG. 17 is a graph showing the spectral absorptance profiles of three different optical filters.
Figure 18A:
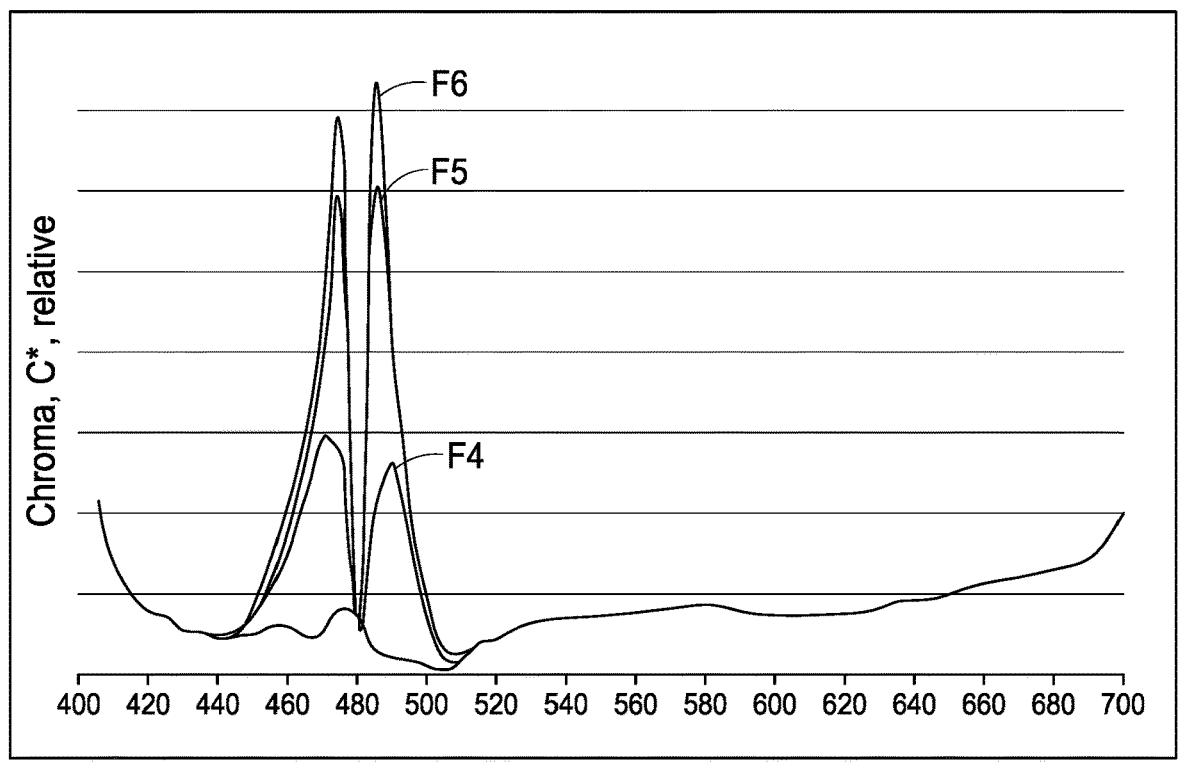
FIG. 18A is a graph showing the chroma profiles of three filters, each filter with one of the absorptance profiles shown in FIG. 17, and of a neutral filter.
Figure 18B:
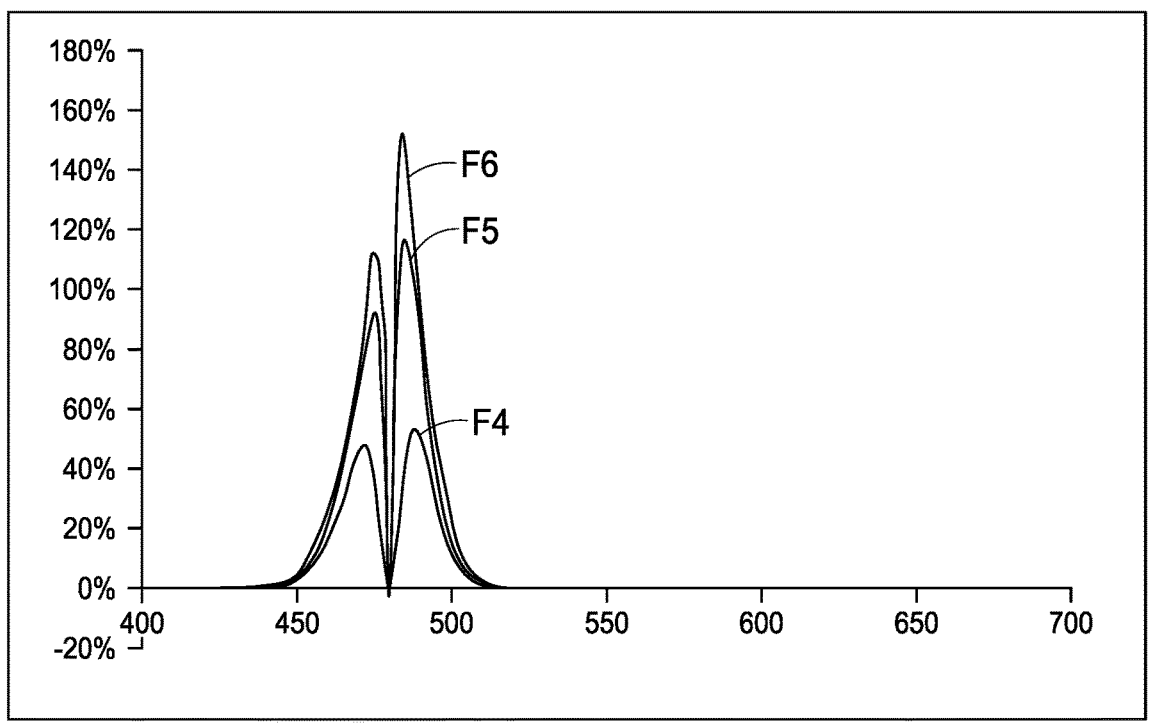
FIG. 18B is a graph showing the percentage differences in chroma of the three different filters with the absorptance profiles shown in FIG. 17 compared to a neutral filter.

Variations in the bandwidth (e.g., the FWHM value) and in the slopes of the sides of an absorptance peak can have marked effects on chroma. Generally, increases in the FWHM and/or slopes of the chroma-enhancing peaks are accompanied by increases in chroma and vice-versa, in the case of chroma-lowering peaks. In FIGS. 17, 18A and 18B, example optical filters are shown where the FWHM and slopes of an absorptance peak are separately varied. The effects of these variations on chroma are shown in the accompanying chroma profiles in FIGS. 18A-18B and 20A-20B. In FIG. 17, an overlay of absorptance peaks centered at 478 nm for three different filters F1, F2, and F3 is shown. The absorptance peaks have equal side slopes and varying FWHM values, with filter F1 having the lowest FWHM value and filter F3 having the highest FWHM value. The relative chroma profile in FIG. 18A shows the effect of the filters F1, F2, and F3 shown in FIG. 17 on chroma. The absorptance and chroma profiles of each of the filters F1, F2, and F3 are shown with the same corresponding line style in each graph, with a neutral filter included as a thick line in FIG. 18A. FIG. 18B shows a percentage difference in chroma between the output of the three optical filters F1, F2, and F3 of FIG. 17 and the output of a filter that uniformly attenuates the same average percentage of light within each stimulus band as the optical filters of FIG. 17, wherein the input in each case is the same 30 nm uniform intensity stimulus and the horizontal axis indicates the center wavelength of each stimulus band.

Figure 19:
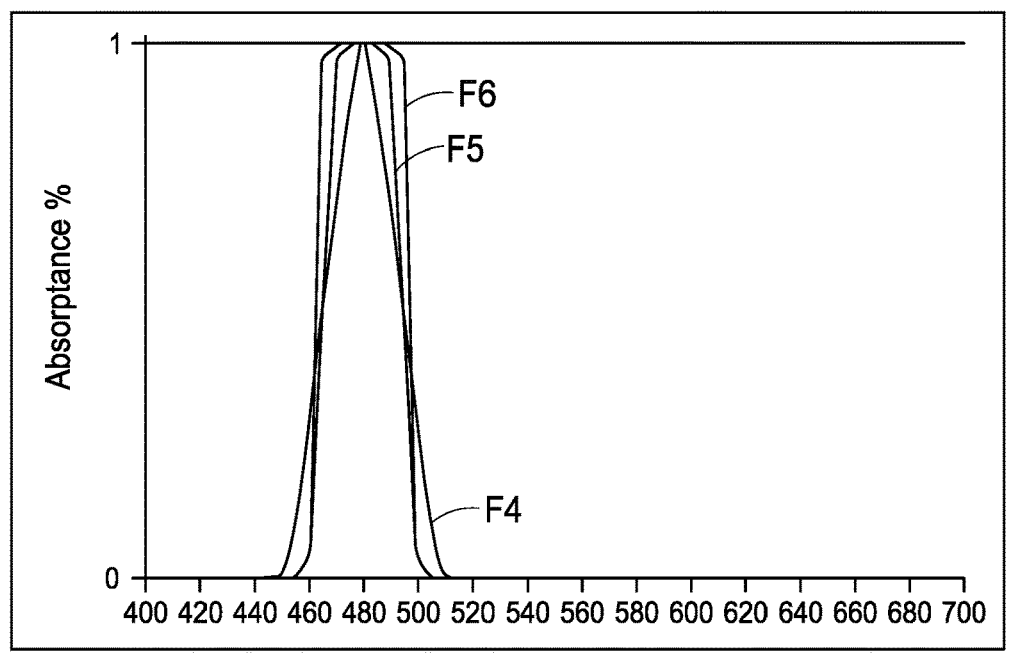
FIG. 19 is a graph showing the spectral absorptance profiles of three different optical filters.
Figure 20A:
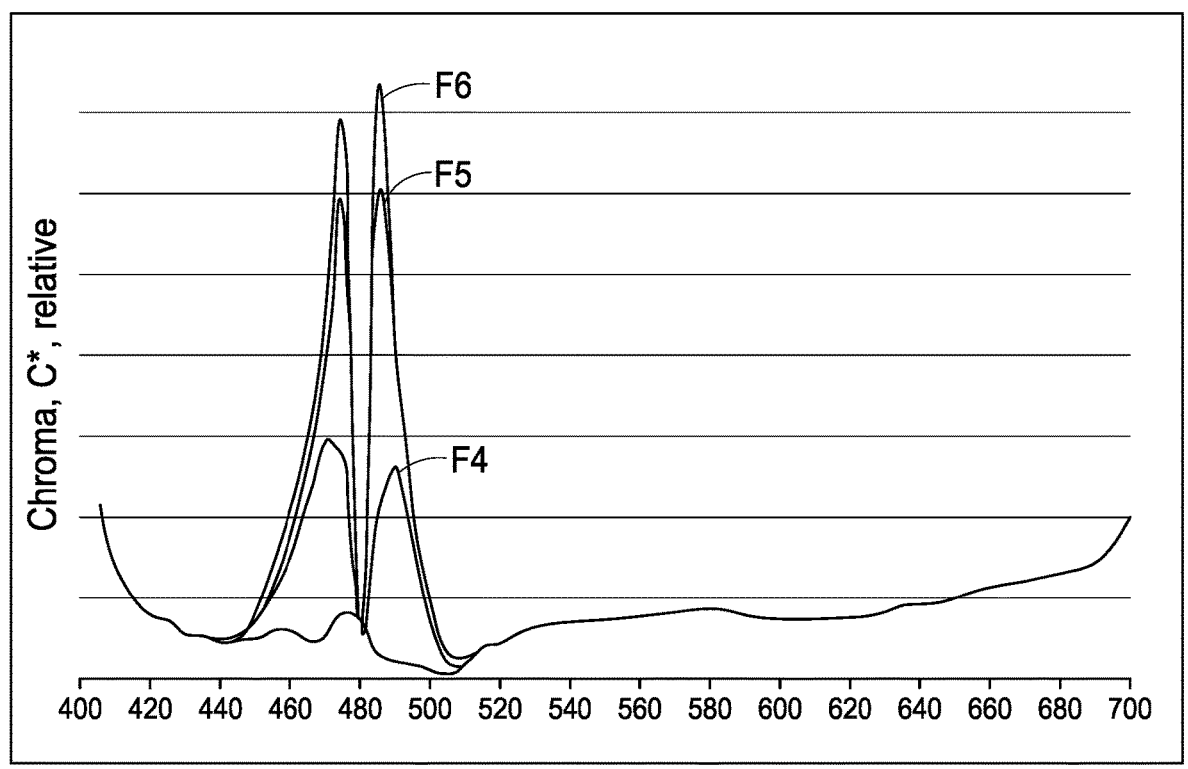
FIG. 20A is a graph showing the chroma profiles of three filters, each filter with one of the absorptance profiles shown in FIG. 19, and of a neutral filter.
Figure 20B:
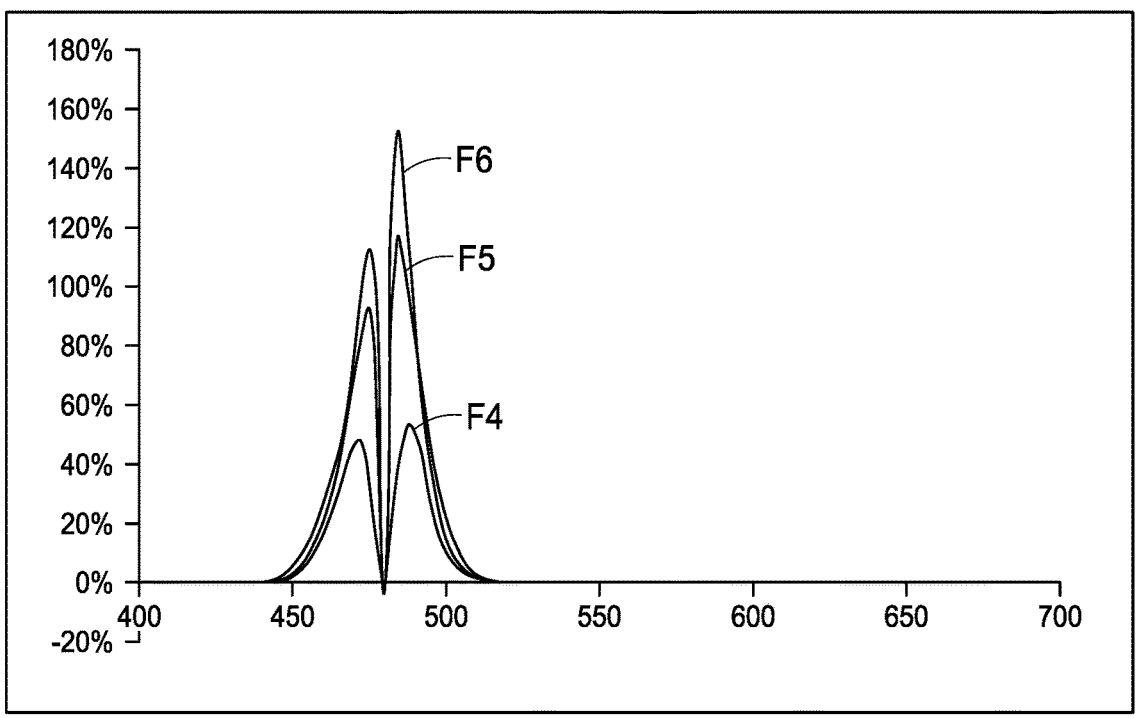
FIG. 20B graph showing the percentage differences in chroma of the three different filters with the absorptance profiles shown in FIG. 19 compared to a neutral filter.

FIG. 19 shows an overlay of three absorptance peaks centered at 478 nm, with equal FWHM and varying slopes. FIG. 20A shows the effect of the filters F4, F5, and F6 shown in FIG. 19 on chroma, with a neutral filter again included as a thick solid line. FIG. 20B shows a percentage difference in chroma between the output of the three optical filters F4, F5, and F6 of FIG. 19 and the output of a filter that uniformly attenuates the same average percentage of light within each stimulus band as the optical filters of FIG. 19, wherein the input in each case is the same 30 nm uniform intensity stimulus and the horizontal axis indicates the center wavelength of each stimulus band.

Figure 21:
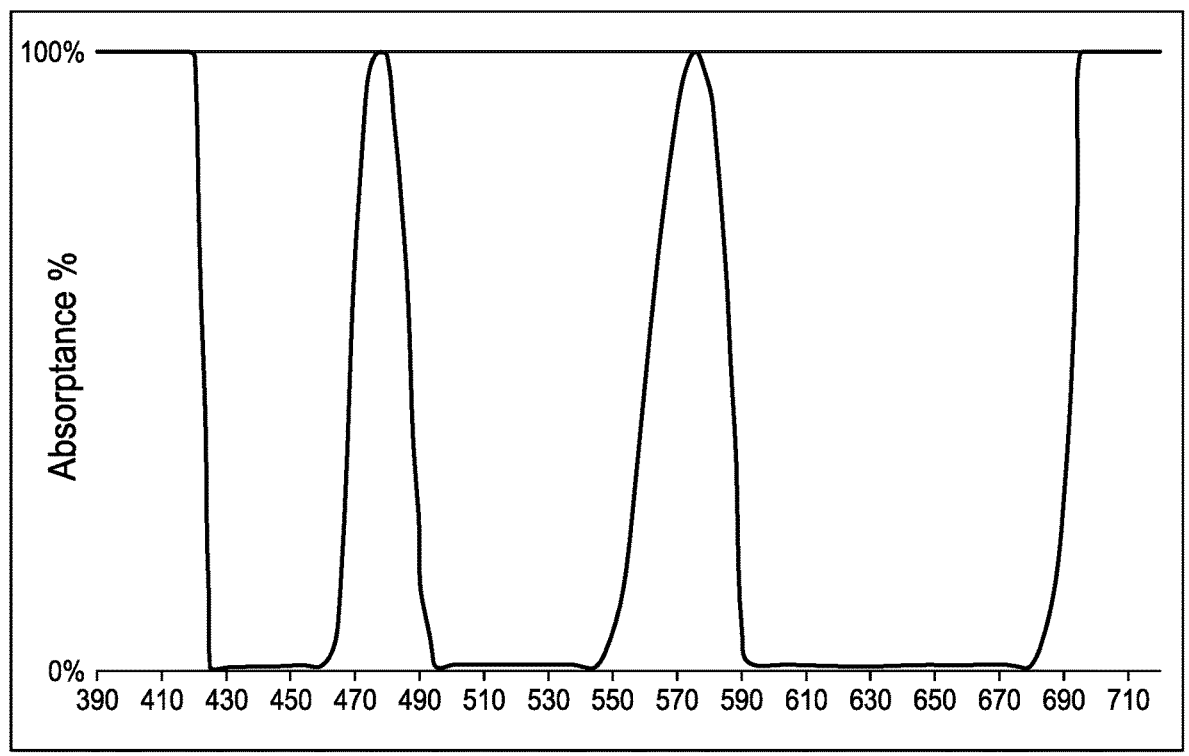
FIG. 21 is a graph showing the spectral absorptance profile of another optical filter.
Figure 22A:
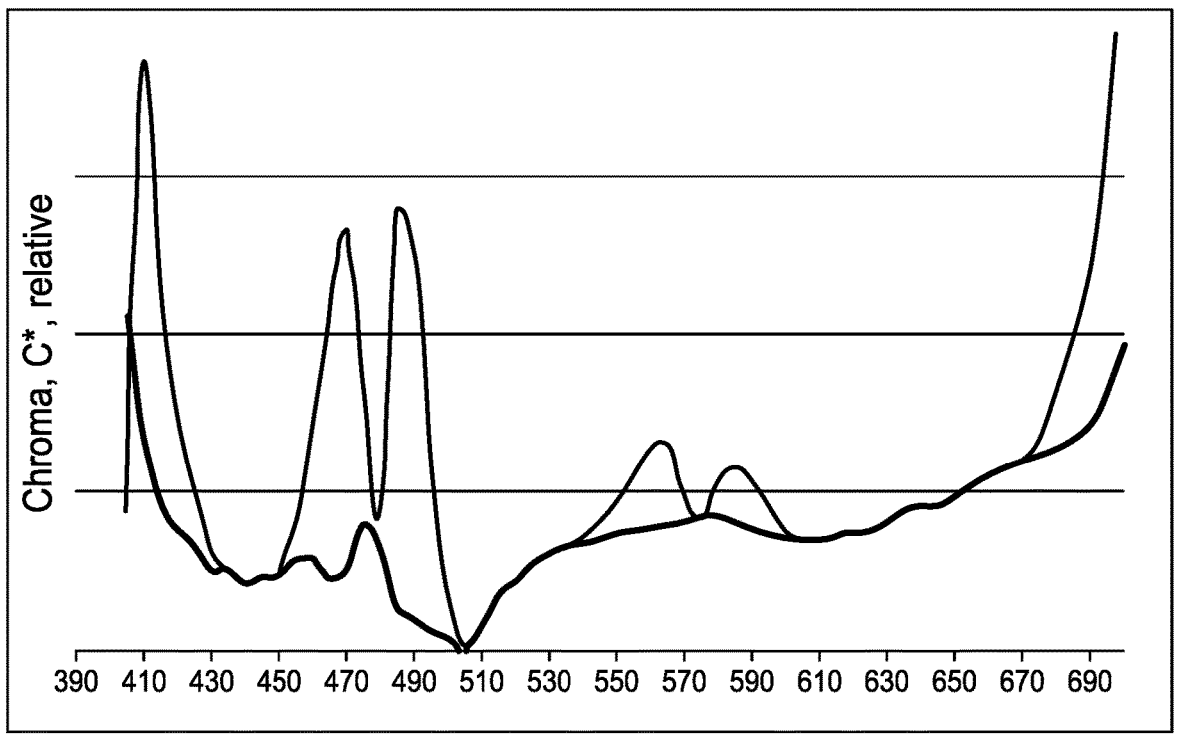
FIG. 22A is a graph showing the chroma profile of a filter with the absorptance profile shown in FIG. 21 and of a neutral filter.
Figure 22B:
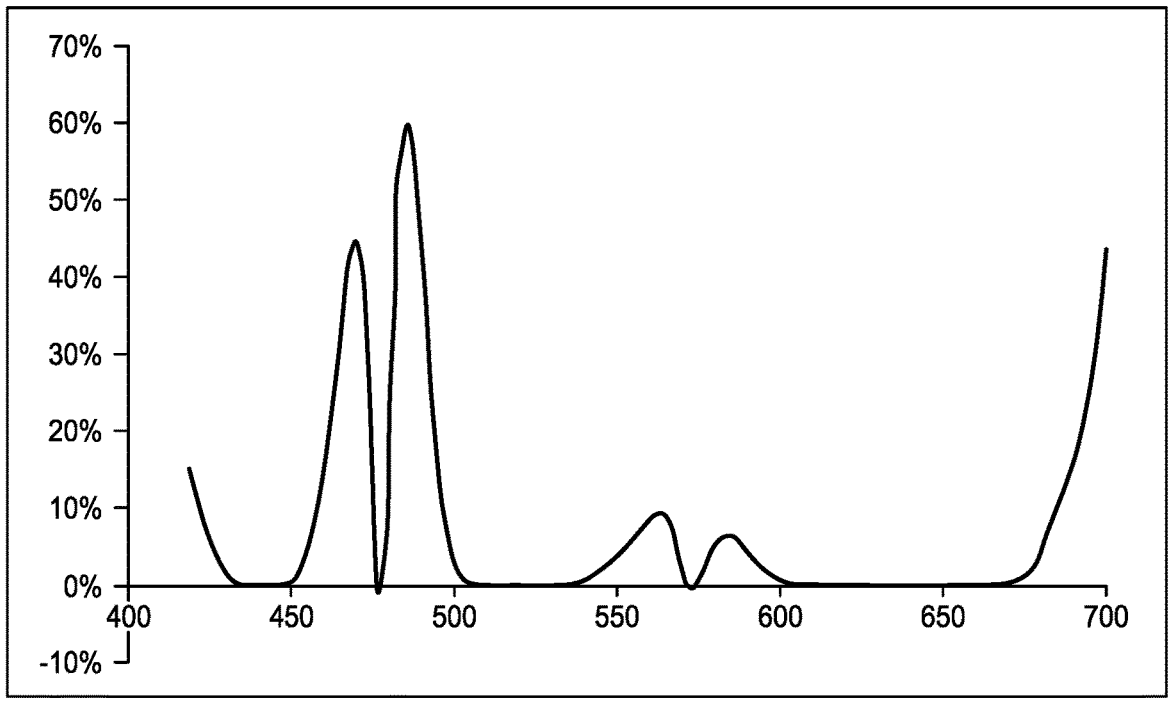
FIG. 22B is a graph showing the percentage difference in chroma of a filter with the absorptance profile shown in FIG. 21 compared to a neutral filter.
Figure 23:
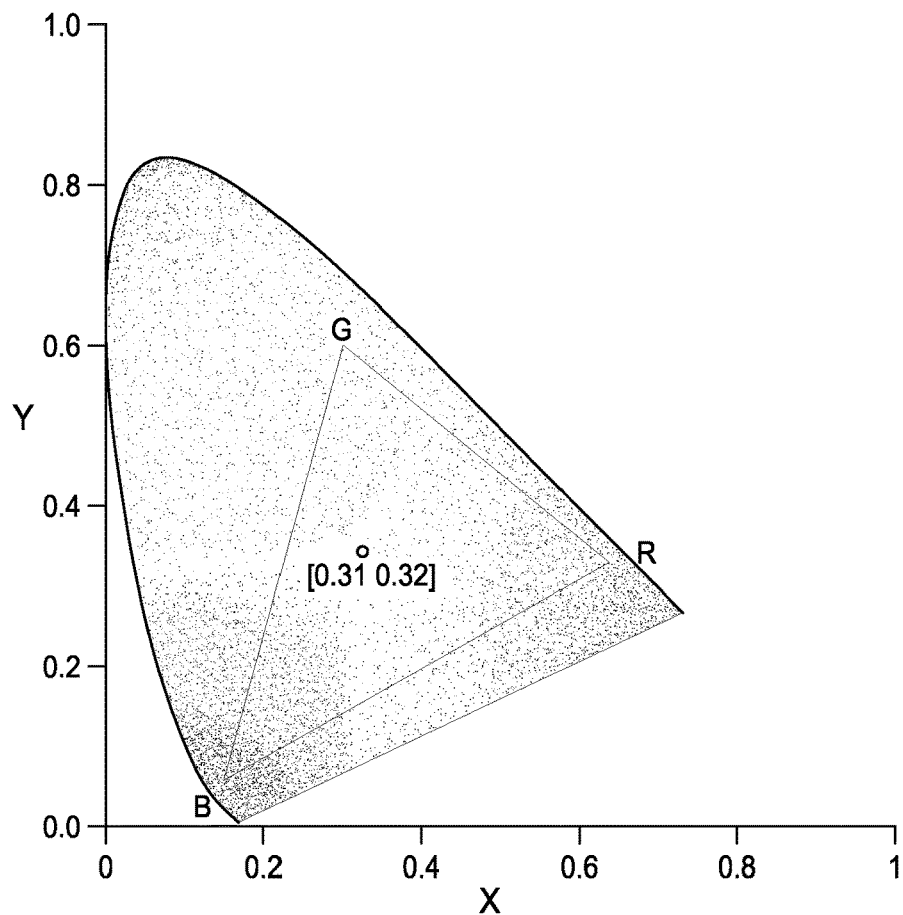
FIG. 23 is a chromaticity diagram for an optical filter having the absorptance profile shown in FIG. 21.

Returning to the optical filter shown in FIG. 14, the outer two absorptance peaks centered at 415 nm and 715 nm have outside slopes (i.e., at the lower limit of the 415 nm peak and at the upper limit of the 715 nm peak) that affect light wavelengths at generally the fringes of the visible spectrum. In some embodiments, the absorptance profiles of these peaks can be altered to significantly, mostly, or almost entirely attenuate light at wavelengths outside of about the 400 nm to 700 nm range, which can be regarded as the dominant portion of the visible range. The spectral absorptance profile of an example optical filter having these attributes is shown in FIG. 21. Relative chroma profiles and the chromaticity diagram for the same optical filter are shown in FIGS. 22A, 22B, and 23. FIG. 22B shows a percentage difference in chroma between the output of the optical filter of FIG. 21 and the output of a filter that uniformly attenuates the same average percentage of light within each stimulus band as the optical filter of FIG. 21, wherein the input is a 30 nm uniform intensity stimulus and the horizontal axis indicates the center wavelength of each stimulus band.

By controlling chroma according to the techniques disclosed herein, the chroma of one or more color bands can also be decreased in situations where less colorfulness in those color bands is desired. In some embodiments, an optical filter can be configured to decrease chroma in one or more color bands and increase chroma in other color bands. For example, eyewear designed for use while hunting ducks can include one or more lenses with an optical filter configured to lower the chroma of a blue background and increase the chroma for green and brown feathers of a duck in flight. More generally, an optical filter can be designed to be activity-specific by providing relatively lower chroma in one or more spectral regions associated with a specific background (e.g., the ground, the sky, an athletic field or court, a combination, etc.) and providing relatively high chroma in one or more spectral regions associated with a specific foreground or object (e.g., a ball). Alternatively, an optical filter can have an activity-specific configuration by providing increased chroma in both a background spectral region and an object spectral region.

The ability to identify and discern moving objects is generally called "Dynamic Visual Acuity." An increase in chroma in the spectral region of the moving object is expected to improve this quality because increases in chroma are generally associated with higher color contrast. Furthermore, the emphasis and de-emphasis of specific colors can further improve Dynamic Visual Acuity.

Figure 24:
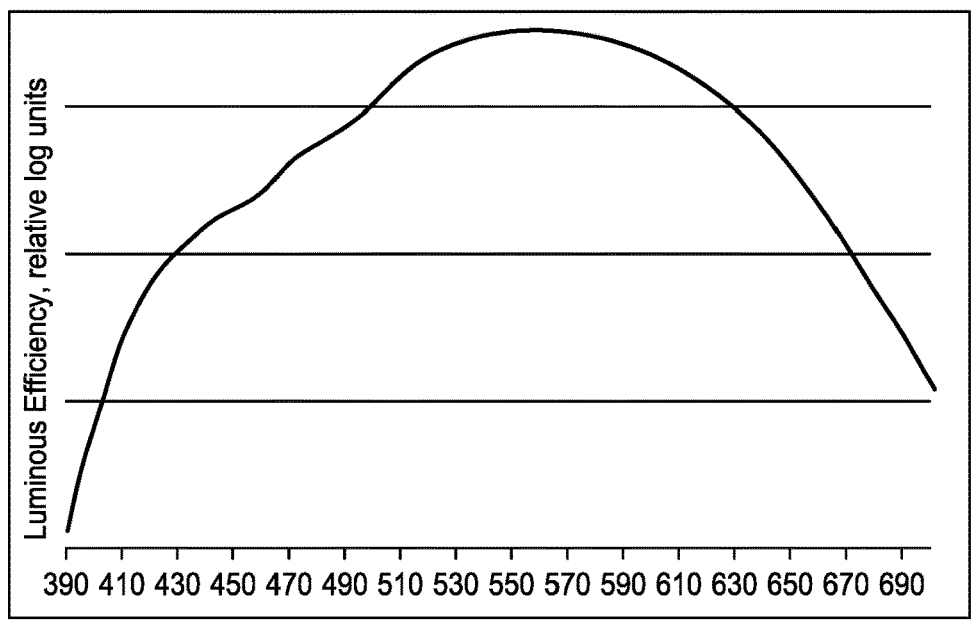
FIG. 24 is a graph showing the luminous efficiency profile of the human eye.

In some embodiments, an optical filter is configured to account for variation in luminous efficiency over the visible spectrum. By accounting for luminous efficiency, the filter can compensate for differences in relative sensitivities at different wavelengths of the human eye to various color bands can be compared. Luminous efficiency over the visible spectrum, consistent with the Stockman and Sharpe cone sensitivity data, is shown in FIG. 24.

In certain embodiments, an optical filter is configured to selectively increase chroma in the red wavelengths at which the human eye is most sensitive. For example, the red color band can be described as the spectral range extending between about 625 nm and about 700 nm. When looking at the luminous efficiency function shown in FIG. 24, it is apparent that the eye is significantly more sensitive to red light between about 625 nm and 660 nm than at longer wavelengths.

In certain embodiments, an optical filter includes one or more organic dyes that provide absorptance peaks with a relatively high attenuation factor. For example, in some embodiments, a lens has an optical filter incorporating organic dyes supplied by Exciton of Dayton, Ohio. At least some organic dyes supplied by Exciton are named according to the approximate center wavelength and/or peak location of their absorptance peak.

Filters incorporating organic dyes can be fabricated using any suitable technique. In some embodiments, a sufficient quantity of one or more organic dyes is used to lower transmittance in one or more spectral regions to less than or equal to about 1%. To achieve peak transmittances under 1% in 1.75 mm thick polycarbonate lenses, dyes can be mixed into a batch of polycarbonate resin. If the mixture includes 5 lbs of polycarbonate resin, the following loadings of Exciton dyes can be used for an optical filter: 44 mg of ABS 407, 122 mg of ABS 473, 117 mg of ABS 574, and 63 mg of ABS 659. In the foregoing example, the ratios of dye loadings in polycarbonate can be generalized as follows: out of 1000 total units of dye, the filter could include about 130 units of violet-absorbing dye, about 350 units of blue-absorbing dye, about 340 units of green-absorbing dye, and about 180 units of deep red-absorbing dye.

In the same quantity of polycarbonate resin, the following loadings of Exciton dyes can be used for an optical filter: 44 mg of ABS 407, 122 mg of ABS 473, 117 mg of ABS 574, and 41 mg of ABS 647. In the foregoing example, the ratios of dye loadings in polycarbonate can be generalized as follows: out of 995 total units of dye, the filter could include about 135 units of violet-absorbing dye, about 375 units of blue-absorbing dye, about 360 units of green-absorbing dye, and about 125 units of red-absorbing dye. In certain embodiments, a lens can be created from the resin and dye mixture by a casting process, a molding process, or any other suitable process.

Other dyes for plastic exist that can also provide substantial increases in chroma. For example, Crysta-Lyn Chemical Company of Binghamton, N.Y. offers DLS 402A dye, with an absorptance peak at 402 nm. In some embodiments, the DLS 402A dye can be used in place of the Exciton ABS 407 dye in the formulations described above. Crysta-Lyn also offers DLS 461B dye that provides an absorptance peak at 461 nm. DLS 461B dye can be used in place of the Exciton ABS 473 dye in the formulations described above. Crysta-Lyn DLS 564B dye can be used in place of the Exciton ABS 574 dye in those formulations, while Crysta-Lyn DLS 654B dye can be used in place of Exciton ABS 659 dye. In some embodiments, the dye can be incorporated into one or more lens components, and the decision regarding which lens components include the dye can be based on properties, such as stability or performance factors, of each specific dye.

In another example, an optical filter is designed with relative amounts of certain dyes. The magnitude of absorptance peaks can be selected by adjusting the absolute mass loading of the dyes while maintaining the relative relationships between loadings of different dyes. For example, in a particular embodiment, an organic dye optical filter includes: 70 mg of Exciton ABS 473 dye, 108 mg of Exciton ABS 561 dye, 27 mg of Exciton ABS 574 dye, and 41 mg of Exciton ABS 659. The ratios of dye loadings in polyurethane can be generalized as follows: out of 1000 total units of dye, the filter could include about 280 units of blue-absorbing dye, about 440 units of yellow-green-absorbing dye, about 110 units of green-absorbing dye, and about 170 units of deep red-absorbing dye. A lens was cast using the foregoing dye loadings in 251 g of polyurethane. The resulting lens had a thickness of 1.9 mm. Loading levels can be adjusted to account for the characteristics of the particular base material used. For example, the loading levels can be somewhat or slightly higher when using a material with a lower density, such as certain types of polycarbonate. Likewise, the loading levels can be somewhat or slightly lower when a higher density material is used.

As discussed above, a lens with a chroma enhancing optical filter can be configured to provide multiple spectral regions of increased chroma compared to a neutral filter with the same average attenuation within each 30 nm stimulus band as the lens with a chroma enhancing optical filter. As discussed above, a lens with a chroma enhancing optical filter can comprise one or more organic dyes. The one or more organic dyes can increase or decrease chroma in one or more spectral regions. For example, a lens a chroma enhancing optical filter comprising one or more organic dyes can be configured to increase chroma in five or more spectral ranges. The spectral ranges over which an optical filter increases or decreases chroma can be called chroma enhancement windows (CEWs).

In some embodiments, CEWs include portions of the visible spectrum in which an optical filter provides a substantial change in chroma compared to a neutral filter having the same average attenuation within each 30 nm stimulus band, as perceived by a person with normal vision. In certain cases, a substantial enhancement of chroma can be seen when a filter provides a chroma increase greater than or equal to about 2% compared to the neutral filter. In other cases, a chroma increase greater than or equal to about 3% or greater than or equal to about 5% compared to the neutral filter is considered a substantial increase. Whether a chroma change represents a substantial increase can depend on the spectral region in which the increase is provided. For example, a substantial chroma enhancement can include an increase in chroma greater than or equal to about 6% over a neutral filter when the visual stimulus is centered at about 560 nm. A substantial chroma enhancement can include an increase in chroma greater than or equal to about 3% over a neutral filter when the visual stimulus is centered at about 660 nm. A substantial chroma enhancement can include an increase in chroma greater than or equal to about 15% over a neutral filter when the visual stimulus is centered at about 570 nm. Accordingly, the amount of change in chroma relative to the neutral filter that is considered substantial can differ depending on the spectral range of the CEW.

In certain embodiments, a substantial chroma enhancement is provided by an optical filter configured to increase chroma in one or more CEWs over a neutral filter without any significant decrease in chroma compared to a neutral filter within the one or more CEWs. A substantial chroma enhancement can also be provided by an optical filter configured to increase chroma in one or more CEWs over a neutral filter without any significant decrease in chroma compared to a neutral filter within a particular spectral range, such as, for example, between about 420 nm and about 650 nm.

FIGS. 24 through 30 illustrate various CEW configurations for a variety of chroma-enhancing optical filters. The spectral ranges of the CEWs can correspond to the spectral regions where an optical filter exhibits substantially changed chroma compared to a neutral filter in one or more of FIGS. 9A, 9B, 12A, 12B, 15A, 15B, 18A, 18B, 20A, 20B, 22A and 22B. The particular CEW configurations disclosed here are non-limiting examples that illustrate the wide variety of lens or eyewear configurations that exist.

Figure 25:
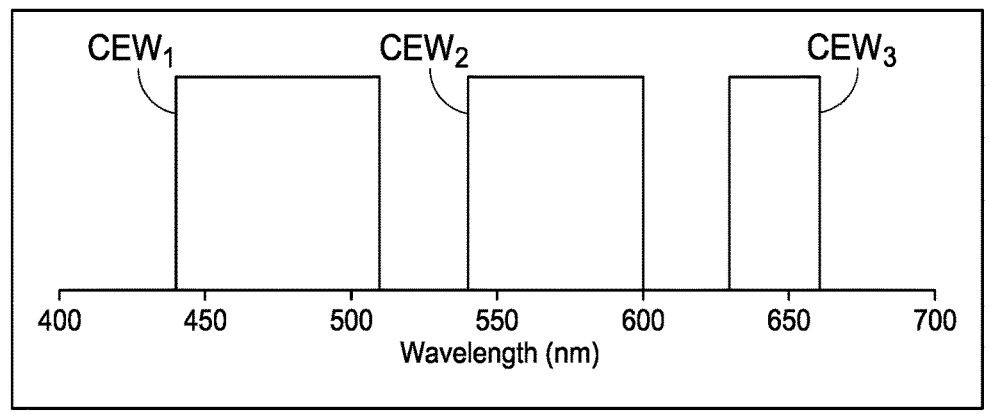
FIG. 25 illustrates an example chroma enhancement window configuration for various implementations of optical filters.

One example of an optical filter CEW configuration is shown in FIG. 25. In this example, $CEW_1$ encompasses a spectral range of about 440 nm to about 510 nm. $CEW_2$ encompasses a spectral range of about 540 nm to about 600 nm. $CEW_3$ encompasses a spectral range of about 630 nm to about 660 nm. Each CEW can be defined as a spectral range within which a lens or eyewear is configured to provide chroma enhancement. Alternatively, the lower end of one or more CEWs can encompass a wavelength above which the lens or eyewear provides chroma enhancement. The upper end of one or more CEWs can encompass a wavelength below which the lens or eyewear provides chroma enhancement. In some embodiments, the average increase in chroma within $CEW_1$ compared to a neutral filter having the same average attenuation within each 30 nm stimulus band is greater than or equal to about 20%. The average increase in chroma within $CEW_2$ compared to the neutral filter can be greater than or equal to about 3%. The average increase in chroma within $CEW_3$ compared to a neutral filter can be greater than or equal to about 5%.

Figure 26:
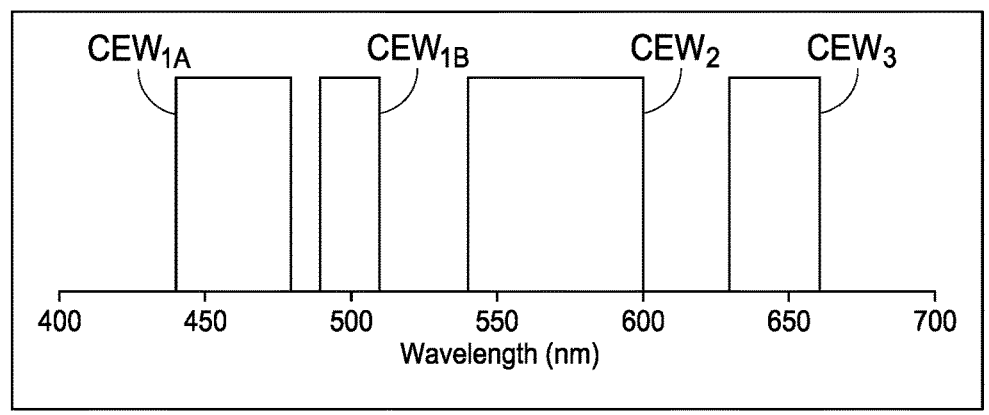
FIG. 26 illustrates an example chroma enhancement window configuration for various implementations of optical filters.

Another example of an optical filter CEW configuration is shown in FIG. 26. $CEW_{1A}$ encompasses a spectral range of about 440 nm to about 480 nm. $CEW_{1B}$ encompasses a spectral range of about 490 nm to about 510 nm. The average increase in chroma compared to a neutral filter can be greater than or equal to about 15% for the $CEW_{1A}$ region and greater than or equal to about 15% for the $CEW_{1B}$ region.

Figure 27:
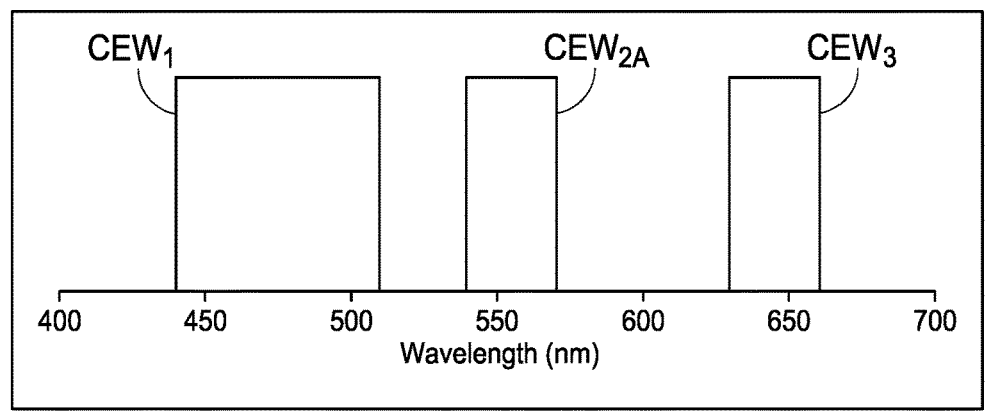
FIG. 27 illustrates an example chroma enhancement window configuration for various implementations of optical filters.
Figure 28:
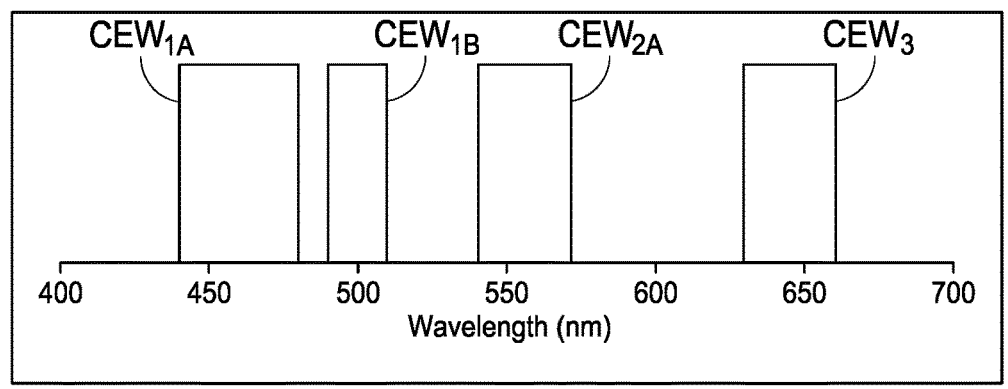
FIG. 28 illustrates an example chroma enhancement window configuration for various implementations of optical filters.

A further example of an optical filter CEW configuration is shown in FIG. 27, which is a configuration in which $CEW_{2A}$ encompasses a spectral range of about 540 nm to about 570 nm. FIG. 28 illustrates an additional embodiment in which an optical filter provides a CEW configuration including $CEW_{1A}$, $CEW_{1B}$, $CEW_{2A}$, and $CEW_3$. The average increase in chroma compared to a neutral filter can be greater than or equal to about 4% for the $CEW_{2A}$ spectral region, for example.

Figure 29:
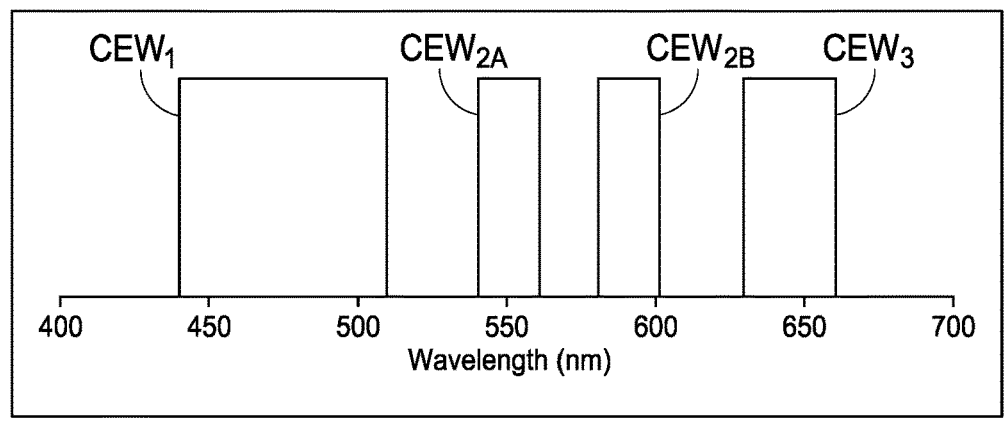
FIG. 29 illustrates an example chroma enhancement window configuration for various implementations of optical filters.
Figure 30:
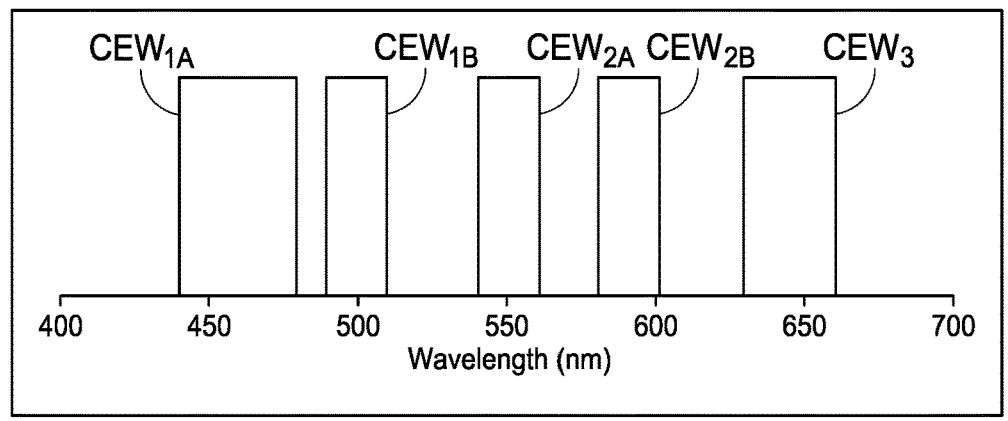
FIG. 30 illustrates an example chroma enhancement window configuration for various implementations of optical filters.

FIG. 29 illustrates an example of an optical filter CEW configuration with an additional enhancement window, $CEW_{2B}$. The $CEW_{2B}$ window encompasses a spectral range between about 580 nm and about 600 nm. The average increase in chroma compared to a neutral filter can be greater than or equal to about 2% for the $CEW_{2B}$ spectral region, for example. FIG. 30 illustrates the relative chroma enhancement of an optical filter configured to provide five or more chroma enhancement windows, including: $CEW_{2A}$, $CEW_{2B}$, $CEW_{1A}$, $CEW_{1B}$, and $CEW_3$. Each of FIGS. 24 through 30 illustrates a non-limiting example of an optical filter CEW configuration, and this disclosure should not be interpreted as limited to any specific configuration or combination of configurations.

In certain embodiments, an optical filter includes one or more chroma enhancement dyes that provide absorptance peaks with a relatively high attenuation factor. As used herein, the term "chroma enhancement dyes" includes dyes that, when loaded in a lens in sufficient quantity, produces a discernable and/or substantial chroma-enhancing effect in at least certain types of scenes viewed by a wearer of eyewear incorporating the lens. Chroma enhancement dyes include dyes that feature an absorptance or absorbance peak with a high attenuation factor (e.g., greater than or equal to about 0.8, greater than or equal to about 0.9, or greater than or equal to about 0.95) and a center wavelength and/or peak position located within at least one chroma enhancement window. In some embodiments, an optical filter for chroma enhancing eyewear includes two or more of the following: violet chroma enhancement dye, blue chroma enhancement dye, green chroma enhancement dye, yellow chroma enhancement dye, and red chroma enhancement dye. In some embodiments, a chroma-enhancing lens includes an optical filter incorporating one or more dyes that are thermally unstable at typical lens body molding temperatures.

Violet chroma enhancement dyes include dyes that have a relatively sharp absorptance peak with a wavelength between about 390 nm and about 440 nm, between about 405 nm and about 455 nm, between about 400 nm and about 420 nm, or between about 405 nm and 425 nm. Examples of such dyes include the Exciton ABS 407 dye, the Crysta-Lyn DLS 402A dye, and a dye that has one or more relatively sharp absorptance peaks within the violet portion of the spectrum. When incorporated into a chroma enhancing filter, chroma enhancement dyes can provide one or more absorptance peaks having any of the characteristics described herein, such as, for example, a bandwidth of greater than or equal to about 15 nm or greater than or equal to about 20 nm. Absorptance peaks that are relatively sharp can include absorptance peaks with a relatively high attenuation factor. Examples of relatively sharp absorptance peaks include peaks with an attenuation factor greater than or equal to about 0.8, greater than or equal to about 0.85, greater than or equal to about 0.9, or greater than or equal to about 0.95. Dyes that have relatively sharp absorptance peaks include dyes that can be used to create one or more spectral features of at least some of the chroma enhancing filters disclosed herein. Violet chroma enhancement dye can have a dye strength greater than or equal to 50 L/g·cm, greater than or equal to 100 L/g·cm, greater than or equal to 200 L/g·cm, greater than or equal to 400 L/g·cm, greater than or equal to 490 L/g·cm, less than or equal to 500 L/g·cm, less than or equal to 1000 L/g·cm, less than or equal to 2000 L/g·cm, or a dye strength within a range between any of the preceding values, when measured in a methylene chloride solution of the violet chroma enhancement dye.

Blue chroma enhancement dyes include dyes that have a relatively sharp absorptance peak with a wavelength between about 440 nm and about 490 nm, between about 445 nm and about 480 nm, between about 460 nm and about 480 nm, or between about 450 nm and 475 nm. In some embodiments, a blue chroma enhancement dye, when incorporated into an optical filter, is configured to produce an absorptance peak with a bandwidth of greater than or equal to about 15 nm or greater than or equal to about 20 nm. Examples of such dyes include the Exciton ABS 473 dye, the Crysta-Lyn DLS 461B dye, and a dye that has one or more relatively sharp absorptance peaks within the blue portion of the spectrum. In some embodiments, a blue chroma enhancement dye is a dye that has a relatively sharp absorptance peak within one or more of the chroma enhancement windows $CEW_1$, $CEW_{1A}$, or $CEW_{1B}$. Blue chroma enhancement dye can have a dye strength greater than or equal to 50 L/g·cm, greater than or equal to 100 L/g·cm, greater than or equal to 150 L/g·cm, greater than or equal to 175 L/g·cm, less than or equal to 200 L/g·cm, less than or equal to 500 L/g·cm, less than or equal to 1000 L/g·cm, or a dye strength within a range between any of the preceding values, when measured in a methylene chloride solution of the blue chroma enhancement dye.

Green chroma enhancement dyes include dyes that have a relatively sharp absorptance peak with a wavelength between about 520 nm and about 570 nm, between about 558 nm and about 580 nm, between about 540 nm and about 580 nm, or between about 540 nm and 565 nm. In some embodiments, a green chroma enhancement dye, when incorporated into an optical filter, is configured to produce an absorptance peak with a bandwidth of greater than or equal to about 15 nm or greater than or equal to about 20 nm. Examples of such dyes include the Exciton ABS 561 dye, the Crysta-Lyn DLS 564B dye, and a dye that has one or more relatively sharp absorptance peaks within the green portion of the spectrum. In some embodiments, a green chroma enhancement dye is a dye that has a relatively sharp absorptance peak within one or more of the chroma enhancement windows $CEW_2$ or $CEW_{2A}$. Green chroma enhancement dye can have a dye strength greater than or equal to 10 L/g·cm, greater than or equal to 20 L/g·cm, greater than or equal to 40 L/g·cm, greater than or equal to 44 L/g·cm, less than or equal to 50 L/g·cm, less than or equal to 100 L/g·cm, less than or equal to 500 L/g·cm, or a dye strength within a range between any of the preceding values, when measured in a methylene chloride solution of the green chroma enhancement dye.

Yellow chroma enhancement dyes include dyes that have a relatively sharp absorptance peak with a wavelength between about 570 nm and about 590 nm, between about 580 nm and about 600 nm, or between about 570 nm and about 580 nm. In some embodiments, a yellow chroma enhancement dye, when incorporated into an optical filter, is configured to produce an absorptance peak with a bandwidth of greater than or equal to about 15 nm or greater than or equal to about 20 nm. Examples of such dyes include the Exciton ABS 574 dye, and a dye that has one or more relatively sharp absorptance peaks within the yellow portion of the spectrum. In some embodiments, a yellow chroma enhancement dye is a dye that has a relatively sharp absorptance peak within one of the chroma enhancement windows $CEW_2$ or $CEW_{2B}$. Yellow chroma enhancement dye can have a dye strength greater than or equal to 50 L/g·cm, greater than or equal to 100 L/g·cm, greater than or equal to 150 L/g·cm, greater than or equal to 183 L/g·cm, less than or equal to 200 L/g·cm, less than or equal to 500 L/g·cm, less than or equal to 1000 L/g·cm, or a dye strength within a range between any of the preceding values, when measured in a methylene chloride solution of the yellow chroma enhancement dye.

Red chroma enhancement dyes include dyes that have a relatively sharp absorptance peak with a wavelength between about 600 nm and about 680 nm, between about 630 nm and about 660 nm, between about 640 nm and about 670 nm, or between about 600 nm and 660 nm. In some embodiments, a red chroma enhancement dye, when incorporated into an optical filter, is configured to produce an absorptance peak with a bandwidth of greater than or equal to about 15 nm or greater than or equal to about 20 nm. Examples of such dyes include the Exciton ABS 659 dye, the Crysta-Lyn DLS 654B dye, and a dye that has one or more relatively sharp absorptance peaks within the red portion of the spectrum. In some embodiments, a red chroma enhancement dye is a dye that has a relatively sharp absorptance peak within the chroma enhancement window $CEW_3$. Red chroma enhancement dye can have a dye strength greater than or equal to 100 L/g·cm, greater than or equal to 200 L/g·cm, greater than or equal to 300 L/g·cm, greater than or equal to 320 L/g·cm, less than or equal to 400 L/g·cm, less than or equal to 500 L/g·cm, less than or equal to 1000 L/g·cm, or a dye strength within a range between any of the preceding values, when measured in a chloroform solution of the red chroma enhancement dye.

Information related to certain example chroma enhancement dyes from the Crysta-Lyn Chemical Company is shown in Table D.

TABLE D

| Example dyes | Peak λ (nm) | Melting Pt. (° C.) |
| --- | --- | --- |
| Blue chroma enhancement dye | 461 | 257 |
| Green chroma enhancement dye | 564 | 242 |
| Red chroma enhancement dye | 654 | 223 |

Activity Specific Optical Filters

In some embodiments, an optical filter is configured to enhance object visibility while preserving the natural appearance of viewed scenes. Such optical filters (and eyewear that include such filters) can be configured for a wide range of recreational, sporting, professional, and other activities. In certain embodiments, eyewear and optical filters provide one or more CEWs corresponding to a specific activity. A filter can include one or more CEWs in a portion of the visible spectrum in which an object of interest, such as, for example, a golf ball, emits or reflects a substantial spectral stimulus. When referring to the spectral stimulus of an object of interest, a corresponding CEW can be referred to as the object spectral window. When referring to spectral stimulus of a background behind an object, a corresponding CEW can be referred to as the background spectral window. Moreover, when referring to the spectral stimulus of the general surroundings, the spectral window can be referred to as the surrounding spectral window. An optical filter can be configured such that one or more edges of an absorbance peak lie within at least one spectral window. In this way, an optical filter can enhance chroma in the spectral ranges corresponding to a given spectral stimulus (e.g. object, background, or surroundings).

In such implementations, the optical filter is configured to enhance object visibility while preserving the natural appearance of viewed scenes. Such implementations of optical filters (and implementations of eyewear that include such filters) can be configured for a wide range of recreational, sporting, professional, and other activities. For example, chroma-enhancing, enhanced-visibility filters can be provided for activities that include viewing objects against water such as fishing, sailing, rowing, surfing, etc. As another example, chroma-enhancing, enhanced-visibility filters can be provided for activities that include viewing objects against grass such as baseball, tennis, soccer, cricket, lacrosse, field hockey, etc. As another example, chroma-enhancing, enhanced-visibility filters can be provided for activities that include viewing objects indoors in artificial illumination such as badminton, basketball, target shooting, racquetball, squash, table tennis, etc. As another example, chroma-enhancing, enhanced-visibility filters can be provided for activities that include viewing objects against snow such as skiing, ice hockey. As another example, chroma-enhancing, enhanced-visibility filters can be provided for activities that include viewing objects outdoors in sunlight such as skiing, baseball, golf, shooting, hunting, soccer, etc.

Implementations of chroma-enhancing, enhanced-visibility filters that are configured for activities that include viewing objects against a particular background can have a common characteristic. For example, chroma-enhancing, enhanced-visibility filters that are provided for activities that include viewing objects against water can be configured to be polarizing to reduce glare resulting from light reflected from the water. As another example, chroma-enhancing, enhanced-visibility filters that are provided for activities that include viewing objects against water can be configured to attenuate light in the blue and/or blue-green spectral range to make objects stand-out against water. As another example, chroma-enhancing, enhanced-visibility filters that are provided for activities that include viewing objects against grass can be configured to attenuate light in the green spectral range to make objects stand-out against grass.

Specific activities can be grouped in more than one category. For example, baseball is played on grass as well as in different lighting conditions. Thus, optical filters can be further customized to provide enhanced visibility of the object under different conditions. For example, for sports such as golf, baseball and other racquet sports, the optical filter can include an object chroma enhancement window selected to increase the chroma of natural reflected light or wavelength-converted light produced by a fluorescent agent in a baseball, tennis ball, badminton birdie, or volleyball or light that is preferentially reflected by these objects. Background windows and spectral-width windows can be provided so that backgrounds are apparent, scenes appear natural, and the wearer's focus and depth perception are improved. For sports played on various surfaces, or in different settings such as tennis or volleyball, different background windows can be provided for play on different surfaces. For example, tennis is commonly played on grass courts or clay courts, and filters can be configured for each surface, if desired. As another example, ice hockey is played on an icy surface that is provided with a wavelength-conversion agent or colorant, and lenses can be configured for viewing a hockey puck with respect to such ice. Outdoor volleyball benefits from accurate viewing of a volleyball against a blue sky, and the background filter can be selected to permit accurate background viewing while enhancing chroma in outdoor lighting. A different configuration can be provided for indoor volleyball.

Eyewear that includes such filters can be activity-specific, surface-specific, or setting-specific. In addition, tinted eyewear can be provided for activities other than sports in which it is desirable to identify, locate, or track an object against backgrounds associated with the activity. Some representative activities include dentistry, surgery, bird watching, fishing, or search and rescue operations. Such filters can also be provided in additional configurations such as filters for still and video cameras, or as viewing screens that are placed for the use of spectators or other observers. Filters can be provided as lenses, unitary lenses, or as face shields. For example, a filter for hockey can be included in a face shield.

Various embodiments of lenses including one or more filters (e.g., static and/or variable attenuation filters) that provide chroma enhancement for certain example activities are described below with references to FIGS. 31A-35C. The one or more filters can include chroma enhancement dyes and/or color enhancing chromophores as described herein and/or as described in U.S. Patent Publication No. 2013/0141693 which is incorporated by reference herein for all that it discloses and is made part of this specification. In various embodiments, the lenses that provide chroma enhancement for certain example activities can include a thin CE wafer integrated with a molded base layer using methods such as insert molding, 2-shot injection molding, multi-shot injection molding or casting as discussed above. In various embodiments, the lenses that provide chroma enhancement for certain example activities can include a functional wafer system (e.g., a CE wafer/polarizing wafer) integrated with a molded base layer using methods such as insert molding, 2-shot injection molding, multi-shot injection molding or casting as discussed above. In various embodiments, the lenses including one or more filters that provide chroma enhancement for certain example activities can include coatings and/or thin film layers disposed on a substrate material, etc. In various embodiments, the one or more filters can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification. Some embodiments of interference coatings are sold by Oakley, Inc. of Foothill Ranch, Calif., U.S.A. under the brand name Iridium®. The example lens embodiments disclosed herein suitable for use in other applications than those indicated when such applications involve environments with similar colors of interest. The embodiments of the one or more filters for the sports activities are examples, and it is understood that other suitable filters can be used for the exemplary activities described herein.

A. Chroma Enhancing Lens for Outdoor Activities

Various embodiments of lenses used for outdoor activities (e.g., trail running, hiking, target shooting, hunting, etc.) preferably reduce glare (e.g., glare resulting from sunlight on a bright sunny day). Accordingly, various embodiments of lenses used for outdoor activities can include coatings, layers or films that reduce glare. The glare reducing components, coatings, layers or films can include polarizing wafers, polarizing films and/or coatings to filter out polarized light. Various embodiments of lenses suitable for outdoor activities can include lens components including optical filters with one or more chroma enhancing dyes (e.g., CE wafer) that transmit different colors in the visible spectral range with different values to create different viewing conditions. For example, some embodiments of lenses suitable for outdoor activities can transmit all colors of the visible spectrum such that there is little distortion on bright sunny days. As another example, some embodiments of lenses suitable for outdoor activities can transmit colors in the yellow and red spectral ranges and attenuate and/or absorb colors in the blue and green spectral ranges. Various embodiments of lenses used for shooting can also be tinted (e.g., grey, green, amber, brown or yellow) to increase contrast between the trails and the trees, reduce eye strain and/or for aesthetic purpose.

Figure 31A:
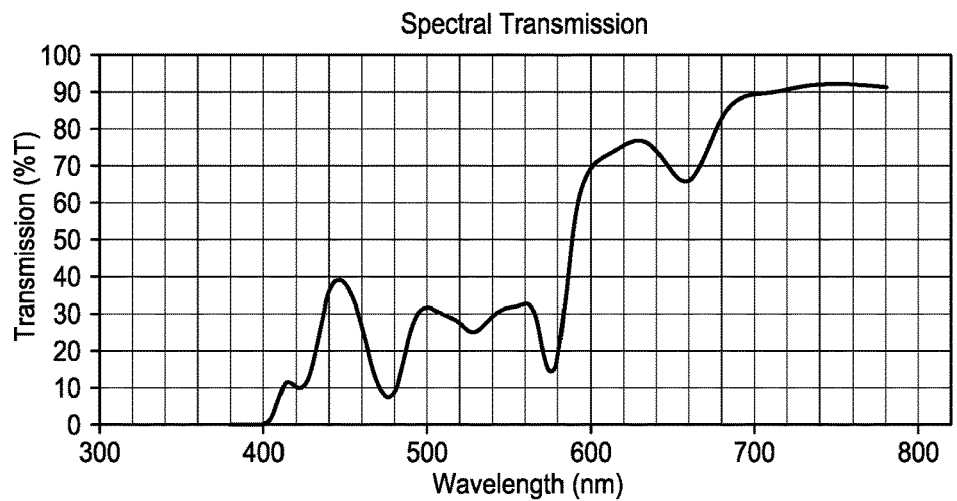
FIGS. 31A, 31B and 31C illustrate spectral characteristics of an implementation of optical filter that can be included in different embodiments of activity specific lenses.
Figure 31B:
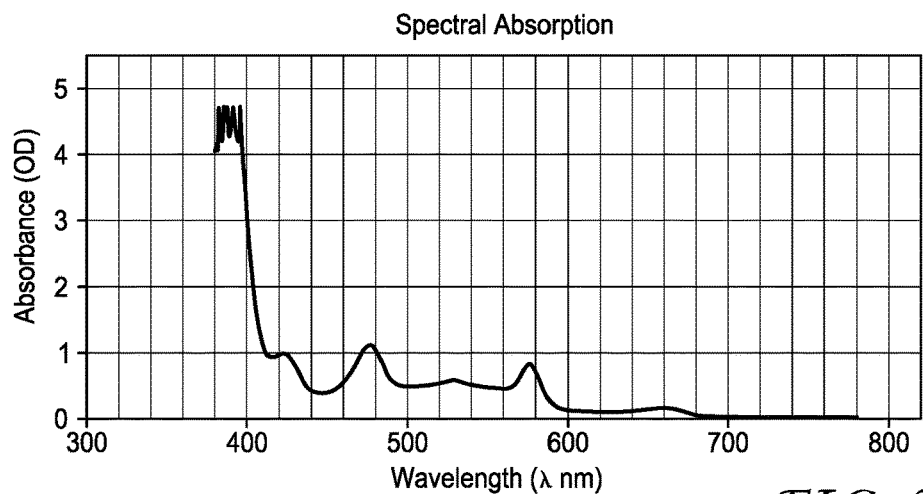
Figure 31C:
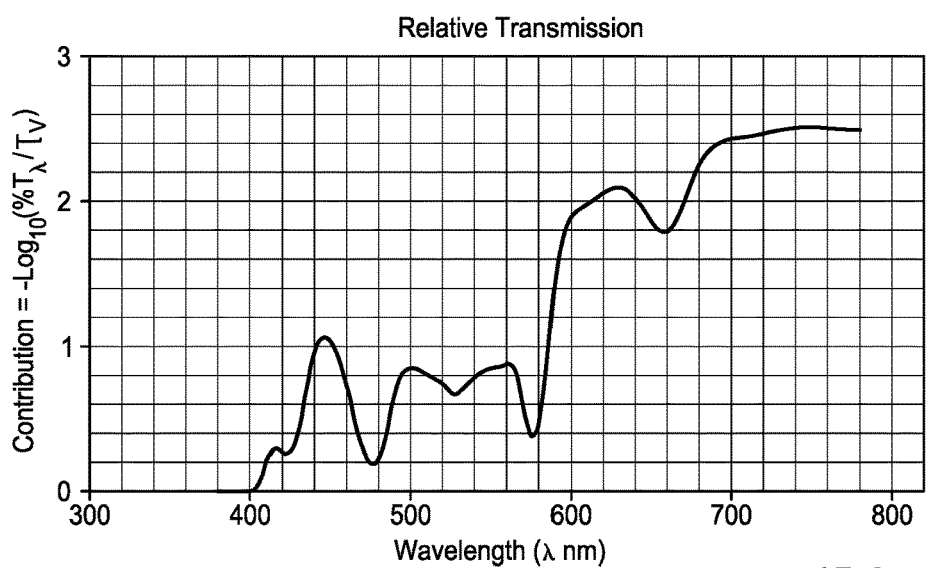

FIGS. 31A-31C illustrate the effective spectral response of one or more filters that can be included in an embodiment of a lens that is suitable for outdoor activities. FIG. 31B illustrates the effective absorbance profile of an implementation of an optical filter that can be included in an embodiment of a lens that is suitable for outdoor activities. FIGS. 31A and 31C show the effective transmittance profile and the relative absorbance profile of the same implementation of the optical filter. The implementation of the optical filter is configured such that the effective transmittance profile through the one or more filters has one or more "notches". The presence of the notches in the transmittance profile creates distinct "pass-bands". Wavelengths in each of the distinct pass-bands are transmitted with lower attenuation than wavelengths in the notches. The notches in the transmittance profile are depicted as "peaks" in the corresponding absorbance profile depicted in FIG. 31B. For example, as observed from FIG. 31B, the effective absorbance profile of the optical filter implementation has a first peak between about 460 nm and 495 nm and a second peak between about 560 nm and 590 nm.

Referring to FIG. 31B, it is observed that the effective absorbance profile of the optical filter implementation included in an embodiment of a lens that is suitable for outdoor activities has a first "valley" in the wavelength range between about 410 nm and about 460 nm; a second "valley" in the wavelength range between about 500 nm and about 560 nm; and a third "valley" in the wavelength range between about 600 nm and about 660 nm. Wavelengths in the first, second and third valleys have reduced absorbance as compared to the wavelengths in the vicinity of the first and second peaks. The valleys in the absorbance profile correspond to the pass-bands in the transmittance profile. It is noted from FIG. 31B that the first peak has a full width at 80% maximum (FW80M) of about 20-35 nm around a central wavelength of about 475 nm and the second peak has a FW80M of about 15-25 nm around a central wavelength of about 574 nm.

It is observed from FIG. 31B that (i) the value of the optical density for wavelengths in the vicinity of the first peak around 475 nm is about 100%-120% higher as compared to the average value of the optical density for wavelengths in the first valley; and (ii) the value of the optical density for wavelengths in the vicinity of the first peak around 475 nm is about 80%-100% higher as compared to the average value of the optical density for wavelengths in the second valley. Thus, wavelengths in the vicinity of the first peak around 475 nm are attenuated by about 100%-120% more on an average as compared to wavelengths in the vicinity of the first valley and by about 80%-100% more on an average as compared to wavelengths in the vicinity of the second valley.

It is further observed from FIG. 31B that (i) the value of the optical density for wavelengths in the vicinity of the second peak around 574 nm is about 50% higher as compared to the average value of the optical density for wavelengths in the second valley; and (ii) the value of the optical density for wavelengths in the vicinity of the second peak around 574 nm is about 350% higher as compared to the average value of the optical density for wavelengths in the third valley. Thus, wavelengths in the vicinity of the second peak around 574 nm are attenuated by about 50% more on an average as compared to wavelengths in the vicinity of the second valley and by about 350% more on an average as compared to wavelengths in the vicinity of the third valley.

It is observed from FIG. 31B that the second peak has a narrower bandwidth as compared to the first peak. Furthermore, the optical filter implementation included in the embodiment of the lens suitable for outdoor activities can be configured to attenuate light having wavelengths less than 400 nm (e.g., in the ultraviolet range). Thus, the embodiment of the lens suitable for suitable for outdoor activities can reduce the amount of ultraviolet light incident on a person's eyes thereby providing safety and health benefits. The attenuation factor of the absorbance peaks in the blue spectral region (e.g., between about 440 nm and 490 nm) and green spectral region (e.g., between about 550 nm and about 590 nm) can be greater than or equal to about 0.8 and less than 1 in various implementations of optical filters adapted to view objects on the surface of water or underwater. Without any loss of generality, the attenuation factor of an absorbance peak can be obtained by dividing an integrated absorptance peak area within the spectral bandwidth by the spectral bandwidth of the absorbance peak.

The transmittance profile depicted in FIG. 31A corresponds to the same optical filter implementation whose absorbance profile is depicted in FIG. 31B. Accordingly, the effective transmittance profile of the optical filter implementation includes a first pass-band corresponding to first valley of the absorbance profile, a second pass-band corresponding to the second valley of the absorbance profile and a third pass-band corresponding to the third valley absorbance profile. The first and the second pass-bands are separated by a first notch corresponding to the first peak of the absorbance profile. The second and the third pass-bands are separated by a second notch corresponding to the second peak of the absorbance profile.

It is observed from the transmittance profile that the first pass-band is configured to transmit between 10%-40% of light in the violet-blue spectral ranges (e.g., between about 420 nm and about 460 nm); the second pass-band configured to transmit between about 20% and about 30% of the light in the green-yellow spectral ranges (e.g., between about 500 nm and about 560 nm); and the third pass-band configured to transmit between about 70% and about 90% of the light in the orange-red spectral ranges (e.g., between about 600 nm and about 700 nm). It is further observed from FIG. 31A that the second and the third pass-bands have a substantially flat-top such that substantially all the wavelengths in each of the second and the third pass-bands are transmitted with almost equal intensity. Accordingly, the FW80M of the second pass-band is about 50-70 nm and the FW80M of the third pass-band is about 40-50 nm.

FIG. 31C illustrates the effective relative absorbance profile of an embodiment of a lens including an optical filter that is suitable for outdoor activities. The relative absorbance profile is obtained by plotting the term $-\log_{10}(\% T_\lambda/\tau_v)$ with respect to the wavelength ($\lambda$). The factor $\% T_\lambda$ represents the percentage of light transmitted through the one or more filters at a wavelength $\lambda$ and the factor $\tau_v$ represents luminous transmittance as determined according to a technique defined in section 5.6.1 the ANSI Z80.3-2009 specification for nonprescription sunglass and fashion eyewear requirements. It is observed that the relative absorption has a similar profile as the absorbance profile depicted in FIG. 31B.

Figure 36A:
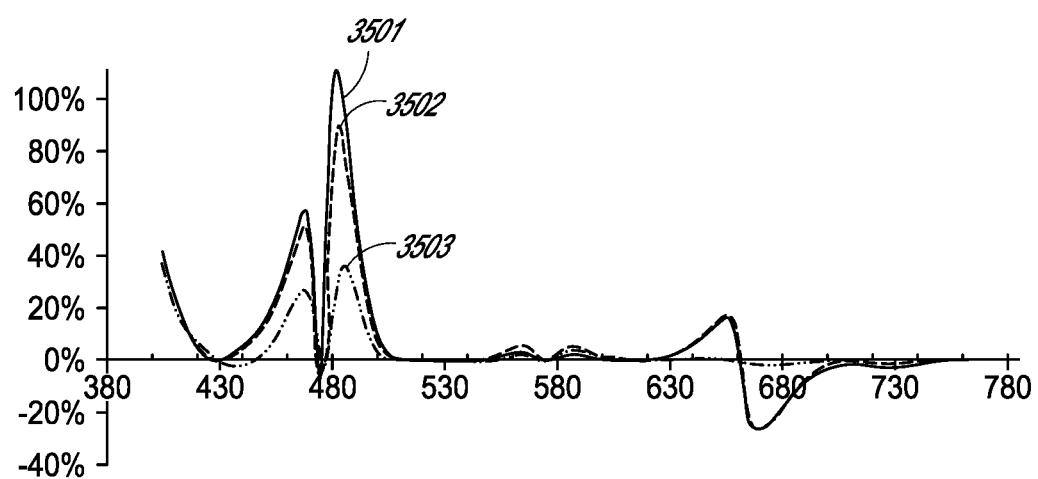
FIGS. 36A and 36B illustrate graphs showing the percentage difference in chroma of different implementations of activity specific chroma enhancement filters having spectral characteristics as shown in FIGS. 31A-35C compared to a neutral filter.

Curve 3601 of FIG. 36A shows a percentage difference in chroma between the output of the optical filter having spectral characteristics as shown in FIGS. 31A-31C and the output of a neutral filter that uniformly attenuates the same average percentage of light within each stimulus band as the optical filter having spectral characteristics as shown in FIGS. 31A-31C, wherein the input is a 30 nm uniform intensity stimulus and the horizontal axis indicates the center wavelength of each stimulus band. Using the information provided in curve 3601 it was calculated that lens suitable for suitable for outdoor activities can provide an average chroma increase of about 10% in the spectral bandwidth between 440 nm and 480 nm as compared to a neutral filter that uniformly attenuates the same average percentage of light as the optical filter within the spectral range of 440 nm to 480 nm.

Various embodiments of lenses including one or more filters that provide color enhancement for outdoor activities as described above can include polarization wafers, polarization films or layers such that they are polarized to reduce glare. Various embodiments of lenses including the one or more filters that provide color enhancement for outdoor activities as described above can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®. Various embodiments of lenses including the one or more filters that provide color enhancement for outdoor activities as described can also be configured to provide prescription optical power in the range of about ±25 Diopters and/or optical magnification as discussed above.

B. Filters to Provide Color Enhancement for Baseball

Various embodiments of lenses used for baseball preferably allow the ball player to spot the baseball in different lighting conditions (e.g., bright lighting on sunny days, diffused lighting on cloudy days, spot lighting and flood lighting for playing at night, etc.). It would also be advantageous to include filters that make the baseball stand out against the sky and the grassy field in various embodiments of the lenses used for baseball. Additionally, various embodiments of the lenses used for baseball can include wafers, coatings, layers or films that reduce glare (e.g., glare resulting from sunlight on bright sunny days or spot lights and flood light in the night). The wafers, coatings, layers or films that reduce glare can include polarizing wafers, polarizing films and/or coatings to filter out polarized light, holographic or diffractive elements that are configured to reduce glare and/or diffusing elements. Various embodiments of lenses suitable for baseball can include lens components including optical filters with one or more chroma enhancing dyes (e.g., CE wafer) that transmit different colors in the visible spectral range with different values to create different viewing conditions. For example, some embodiments of lenses for baseball can transmit all colors of the visible spectrum such that there is little distortion on bright sunny days. As another example, some embodiments of lenses for baseball can transmit colors in the yellow and red spectral ranges and attenuate and/or absorb colors in the blue and green spectral ranges such that the baseball can stand-out against the blue sky or the green grass. Various embodiments of lenses used for baseball can also be tinted (e.g., grey, green, amber, brown or yellow) to increase visibility of baseball against the sky or the grass, reduce eye strain and/or for aesthetic purpose.

Figure 32A:
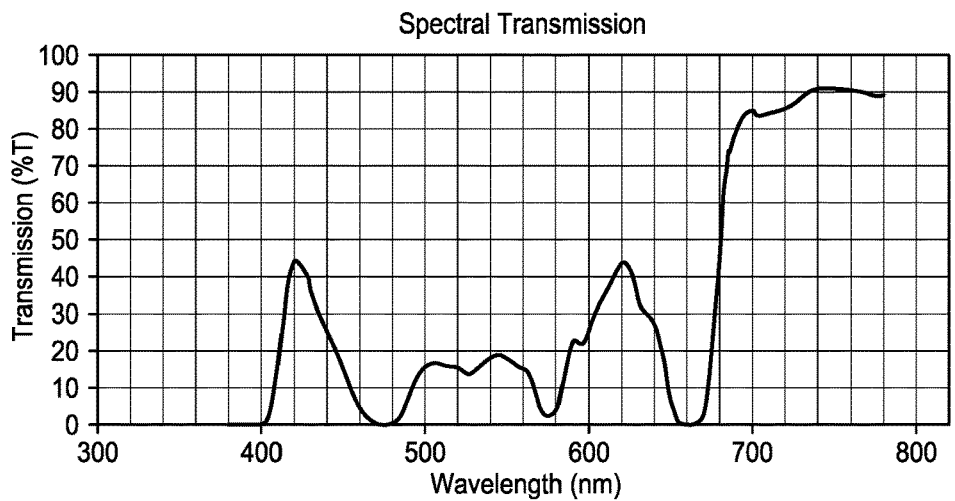
FIGS. 32A, 32B and 32C illustrate spectral characteristics of an implementation of optical filter that can be included in different embodiments of activity specific lenses.
Figure 32B:
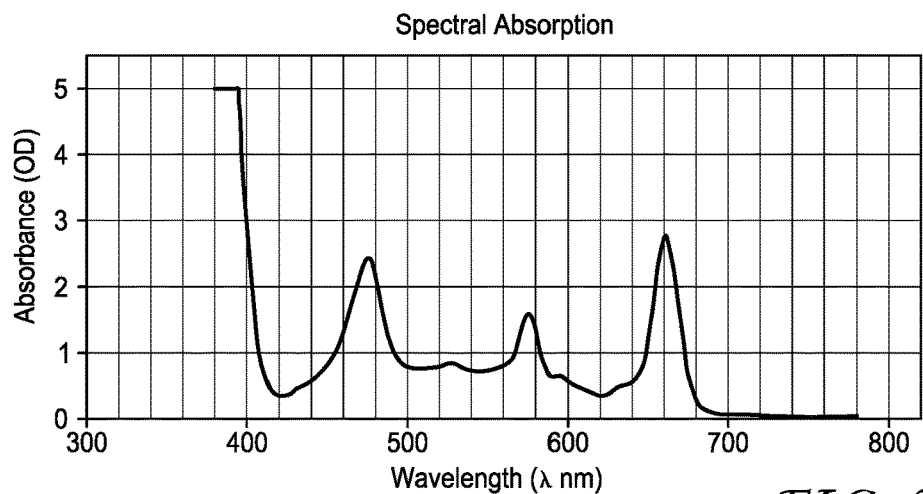
Figure 32C:
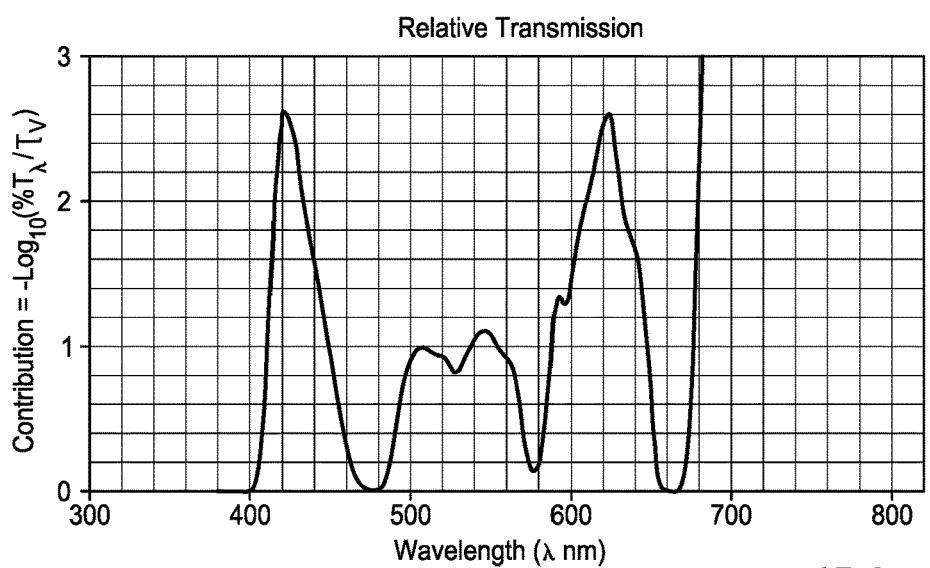
Figure 33A:
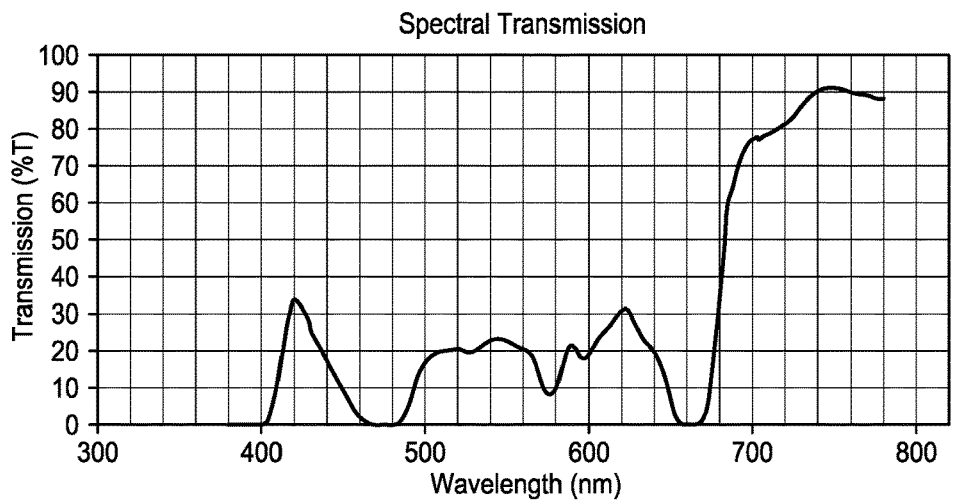
FIGS. 33A, 33B and 33C illustrate spectral characteristics of an implementation of optical filter that can be included in different embodiments of activity specific lenses.
Figure 33B:
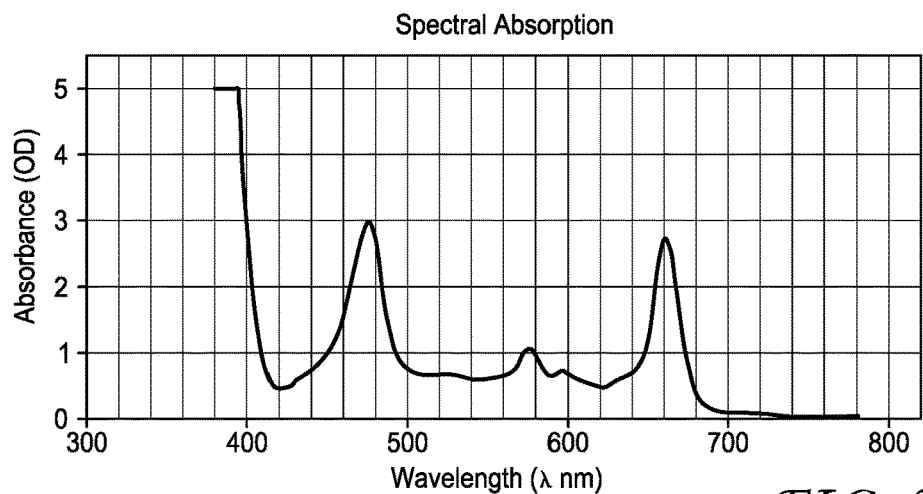
Figure 33C:
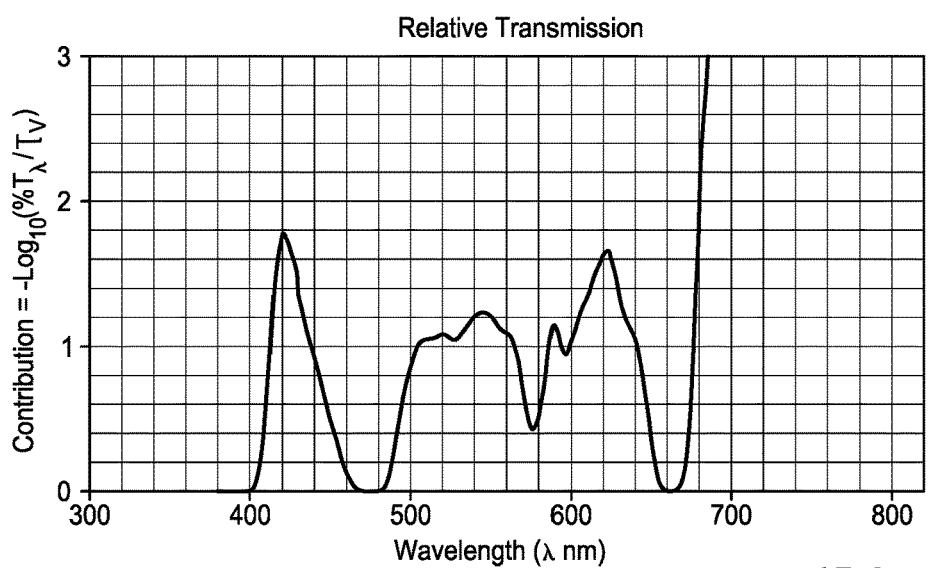

FIGS. 32A-32C and 33A-33C illustrate the effective spectral response of implementations of optical filters that can be included in various embodiments of lenses suitable for baseball. FIG. 32B illustrates an effective absorbance profile of an optical filter implementation that can be included in an embodiment of a lens that is suitable for players in the outfield. FIG. 33B illustrates the effective absorbance profile of an optical filter implementation that can be included in an embodiment of a lens that is suitable for players in the infield. FIG. 32A illustrates the effective transmittance profile of the same optical filter implementation that can be included in an embodiment of a lens that is suitable for players in the outfield. FIG. 33A illustrates the effective transmittance profile of the same optical filter implementation that can be included in an embodiment of a lens that is suitable for players in the infield. FIG. 32C illustrates the effective relative absorbance profile of the same optical filter implementation that can be included in an embodiment of a lens that is suitable for players in the outfield. FIG. 33C illustrates the effective relative absorbance profile of the same optical filter implementation that can be included in an embodiment of a lens that is suitable for players in the infield.

The outfield players and infield players play under different lighting conditions and thus would benefit from having lenses tailored to spot the baseball in their respective lighting conditions. Additionally, it would be advantageous for outfield players to have the ability to spot the baseball from a distance. Thus, it would be beneficial if various embodiments of lenses are configured to have different optical characteristics for infield players and outfield players. For example, since the outfield is usually sunnier than the infield and/or has less shadows as compared to the infield, it would be advantageous if the lenses configured for the players in the outfield included filters that reduced glare and overall brightness but transmitted different colors in the visible spectral range so that the white baseball can be spotted from a distance. As another example, it would be advantageous if the lenses configured for the players in the infield included filters that reduced glare, increased contrast between the blue sky and the green grass and in general made the white ball and the red stitching on the baseball stand-out against the field.

As discussed above, the effective absorbance profile depicted in FIGS. 32B and 33B exhibits peaks and valleys that correspond to the pass-bands and notches exhibited by the corresponding effective transmittance profile depicted in FIGS. 32A and 32B.

Referring to FIGS. 32B and 33B, the effective absorbance profiles for the optical filter implementations included in embodiments of lenses suitable for players in the outfield and players in the infield each has a first peak between about 460 nm and 490 nm, a second peak between about 560 nm and 590 nm and a third peak between about 640 nm and 680 nm. The effective absorbance profile for the optical filter implementation included in embodiments of lenses suitable for players in the outfield and players in the infield each has a first valley in the wavelength range between about 410 nm and about 460 nm; a second valley in the wavelength range between about 500 nm and about 560 nm; and a third valley in the wavelength range between about 590 nm and about 640 nm. As discussed above, wavelengths in the first, second and third valleys have reduced absorbance as compared to the wavelengths in the vicinity of the first, second and third peaks.

Referring to the effective absorbance profile, depicted in FIG. 32B, for the optical filter implementation included in embodiments of lenses suitable for players in the outfield, it is observed that the first peak has a FW80M of about 15-25 nm around a central wavelength of about 474 nm, the second peak has a FW80M of about 10-15 nm around a central wavelength of about 575 nm and the third peak has a FW80M of about 8-15 nm around a central wavelength of about 660 nm.

Referring to the effective absorbance profile, depicted in FIG. 32B, for the optical filter implementations included in embodiments of lenses suitable for players in the outfield, it is observed that (i) the value of the optical density for wavelengths in the vicinity of the first peak around 475 nm is about 300% higher as compared to the average value of the optical density for wavelengths in the first valley; (ii) the value of the optical density for wavelengths in the vicinity of the first peak around 475 nm is about 200% higher as compared to the average value of the optical density for wavelengths in the second valley. Thus, wavelengths in the vicinity of the first peak around 475 nm are attenuated by about 300% more as compared to wavelengths in the vicinity of the first valley and by about 200% more as compared to wavelengths in the vicinity of the second valley.

Referring to the effective absorbance profile, depicted in FIG. 32B, for the optical filter implementations included in embodiments of lenses suitable for players in the outfield, it is observed that (i) the value of the optical density for wavelengths in the vicinity of the second peak around 575 nm is about 100% higher as compared to the average value of the optical density for wavelengths in the second valley; and (ii) the value of the optical density for wavelengths in the vicinity of the second peak around 575 nm is about 150% higher as compared to the average value of the optical density for wavelengths in the third valley. Thus, wavelengths in the vicinity of the second peak around 575 nm are attenuated by about 100% more as compared to wavelengths in the vicinity of the second valley and by about 150% more as compared to wavelengths in the vicinity of the third valley.

Referring to the effective absorbance profile, depicted in FIG. 32B, for the optical filter implementations included in embodiments of lenses suitable for players in the outfield, it is observed that (i) the value of the optical density for wavelengths in the vicinity of the third peak around 660 nm is about 400% higher as compared to the average value of the optical density for wavelengths in the third valley. Thus, wavelengths in the vicinity of the third peak around 660 nm are attenuated by about 400% more as compared to wavelengths in the vicinity of the third valley.

Referring to the effective absorbance profile, depicted in FIG. 33B, for the optical filter implementations included in embodiments of lenses suitable for players in the infield, it is observed that the first peak has a FW80M of about 10-20 nm around a central wavelength of about 475 nm, the second peak has a full width at 90% maximum (FW90M) of about 8-15 nm around a central wavelength of about 575 nm and the third peak has a FWHM of about 15-25 nm around a central wavelength of about 660 nm.

Referring to the effective absorbance profile, depicted in FIG. 33B, for the optical filter implementations included in embodiments of lenses suitable for players in the infield, it is observed that (i) the value of the optical density for wavelengths in the vicinity of the first peak around 475 nm is about 320% higher as compared to the average value of the optical density for wavelengths in the first valley; (ii) the value of the optical density for wavelengths in the vicinity of the first peak around 475 nm is about 320% higher as compared to the average value of the optical density for wavelengths in the second valley. Thus, wavelengths in the vicinity of the first peak around 475 nm are attenuated by about 320% more as compared to wavelengths in the vicinity of the first and the second valley.

Referring to the effective absorbance profile, depicted in FIG. 33B, for the optical filter implementations included in embodiments of lenses suitable for players in the infield, it is observed that (i) the value of the optical density for wavelengths in the vicinity of the second peak around 575 nm is about 50% higher as compared to the average value of the optical density for wavelengths in the second valley; and (ii) the value of the optical density for wavelengths in the vicinity of the second peak around 575 nm is about 100% higher as compared to the average value of the optical density for wavelengths in the third valley. Thus, wavelengths in the vicinity of the second peak around 575 nm are attenuated by about 50% more as compared to wavelengths in the vicinity of the second valley and by about 100% more as compared to wavelengths in the vicinity of the third valley.

Referring to the effective absorbance profile, depicted in FIG. 33B, for the optical filter implementations included in embodiments of lenses suitable for players in the infield, it is observed that (i) the value of the optical density for wavelengths in the vicinity of the third peak around 660 nm is about 320% higher as compared to the average value of the optical density for wavelengths in the third valley. Thus, wavelengths in the vicinity of the third peak around 660 nm are attenuated by about 320% more as compared to wavelengths in the vicinity of the third valley.

Furthermore, the one or more filters included in the embodiment of the lens suitable for baseball players in the outfield and baseball players in the infield can be configured to attenuate light having wavelengths less than 400 nm (e.g., in the ultraviolet range). Thus, the embodiment of the lens suitable for baseball players in the outfield and baseball player in the infield can reduce the amount of ultraviolet light incident on the player's eyes thereby providing safety and health benefits.

Comparing the effective absorbance profiles of the implementations of optical filters configured for use by baseball players in the outfield and baseball players in the infield, it is noted that the optical filter implementation configured for use by baseball players in the infield absorb wavelengths around 475 nm (e.g., blue light) to a greater extent as compared to the optical filter implementations configured for use by baseball players in the outfield and absorb wavelengths around 575 nm (e.g., greenish-yellow light) to a lesser extent as compared to the optical filter implementations configured for use by baseball players in the outfield.

The attenuation factor of the absorbance peaks in the blue spectral region (e.g., between 440 nm and 490 nm) and red spectral region (e.g., between 620 nm and 670 nm) can be greater than or equal to about 0.8 and less than 1 in various implementations of optical filters configured for use by baseball players in the outfield and/or infield. Without any loss of generality, the attenuation factor of an absorbance peak can be obtained by dividing an integrated absorptance peak area within the spectral bandwidth by the spectral bandwidth of the absorbance peak.

As discussed above, the peaks in the effective absorbance profile corresponds to notches in the effective transmittance profile. The presence of notches in the effective transmittance profile creates distinct pass-bands. Wavelengths in each of the distinct pass-bands are transmitted with lower attenuation than wavelengths in the notches. In the illustrated transmission spectra in FIG. 32A, the effective transmittance profile of the optical filter implementations in an embodiment of the lens suitable for outfield players has a first pass-band configured to transmit between about 1% to about 40% of light in the violet-blue spectral ranges (e.g., between about 410 nm and about 460 nm); a second pass-band configured to transmit between about 1% and about 20% of the light in the green-yellow spectral ranges (e.g., between about 500 nm and about 560 nm); and a third pass-band configured to transmit between about 5% and about 40% of the light in the orange-red spectral ranges (e.g., between about 590 nm and about 640 nm).

In the illustrated transmittance profile in FIG. 33A, the effective transmittance profile of the optical filter implementations in an embodiment of the lens suitable for infield players (represented by dashed line) has a first pass-band configured to transmit between about 1% to about 30% of light in the violet-blue spectral ranges (e.g., between about 410 nm and about 460 nm); a second pass-band configured to transmit between about 1% and about 20% of the light in the green-yellow spectral ranges (e.g., between about 500 nm and about 560 nm); and a third pass-band configured to transmit between about 5% and about 30% of the light in the orange-red spectral ranges (e.g., between about 590 nm and about 640 nm).

Comparing the embodiments of the lenses for outfield players and infield players, it is noted that embodiments of lenses for outfield players are configured to transmit more light in the violet-blue spectral range and the orange-red spectral range as compared to embodiments of lenses for infield players. It is also noted that embodiments of lenses for outfield players are configured to transmit less light in the green-yellow spectral range as compared to embodiments of lenses for infield players.

It is further observed from FIGS. 32A and 33A, that the second pass-band for embodiments of lenses for outfield and infield players has a substantially flat-top such that substantially all the wavelengths in the second pass-band are transmitted with almost equal intensity. In contrast, the first and third pass-bands for embodiments of lenses for outfield and infield players have a bell-shaped profile. It is observed from FIG. 32A that the FWHM of the first pass-band for embodiments of lenses for outfield players is about 30 nm around a central wavelength of about 420 nm; the FWHM of the second pass-band for embodiments of lenses for outfield players is about 60-90 nm around a central wavelength of about 530 nm; and the FWHM of the third pass-band for embodiments of lenses for outfield players is about 40 nm around a central wavelength of about 620 nm. It is further observed from FIG. 33B that the FWHM of the first pass-band for embodiments of lenses for infield players is about 25-35 nm around a central wavelength of about 420 nm; the FWHM of the second pass-band for embodiments of lenses for infield players is about 60-90 nm around a central wavelength of about 540 nm; and the FW90M of the third pass-band for embodiments of lenses for infield players is about 20 nm around a central wavelength of about 620 nm.

It is also observed from FIGS. 32A and 33A that the effective transmittance profile for embodiments of lenses for outfield and infield players can transmit between about 80% and about 90% of light in the wavelength range between about 680 nm and about 790 nm.

FIG. 32C illustrates effective relative absorbance profile for an implementation of an optical filter that can be included in an embodiment of a lens that is suitable for players in the outfield. FIG. 33C illustrates effective relative absorbance profile for an implementation of an optical filter that can be included in an embodiment of a lens that is suitable for players in the infield. As discussed above, the relative absorbance profile is obtained by plotting the term $-\log_{10}(\% \, T_\lambda/\tau_v)$ with respect to the wavelength ($\lambda$). The factor % $T_\lambda$ represents the percentage of light transmitted through the one or more filters at a wavelength X and the factor $\tau_v$ represents luminous transmittance as determined according to a technique defined in section 5.6.1 the ANSI Z80.3-2009 specification for nonprescription sunglass and fashion eyewear requirements. It is observed from FIGS. 32C and 33C that each of the relative absorbance profile has a similar profile as the corresponding absorbance profile depicted in FIGS. 32B and 33B. As discussed above, in various embodiments the one or more filters can also be configured to provide tint or chromaticity (e.g., grey, brown, amber, yellow, etc.) to the lens embodiments that are suitable for infield and/or outfield players.

Curve 3602 of FIG. 36A shows a percentage difference in chroma between the output of the optical filter suitable for players in the outfield and having spectral characteristics as shown in FIGS. 32A-32C and the output of a neutral filter that uniformly attenuates the same average percentage of light within each stimulus band as the optical filter having spectral characteristics as shown in FIGS. 32A-32C, wherein the input is a 30 nm uniform intensity stimulus and the horizontal axis indicates the center wavelength of each stimulus band. Using the information provided in curve 3602 it was calculated that lens suitable for suitable for outdoor activities can provide an average chroma increase of about 24% in the spectral bandwidth between 440 nm and 480 nm as compared to a neutral filter that uniformly attenuates the same average percentage of light as the optical filter within the spectral range of 440 nm to 480 nm.

Curve 3603 of FIG. 36A shows a percentage difference in chroma between the output of the optical filter suitable for players in the infield and having spectral characteristics as shown in FIGS. 33A-33C and the output of a neutral filter that uniformly attenuates the same average percentage of light within each stimulus band as the optical filter having spectral characteristics as shown in FIGS. 33A-33C, wherein the input is a 30 nm uniform intensity stimulus and the horizontal axis indicates the center wavelength of each stimulus band. Using the information provided in curve 3602 it was calculated that lens suitable for suitable for outdoor activities can provide an average chroma increase of about 28% in the spectral bandwidth between 440 nm and 480 nm as compared to a neutral filter that uniformly attenuates the same average percentage of light as the optical filter within the spectral range of 440 nm to 480 nm.

Various embodiments of lenses including one or more filters that provide color enhancement for baseball players in the outfield/infield as described above can include polarization wafers, polarization films or layers such that they are polarized to reduce glare. Various embodiments of lenses including the one or more filters that provide color enhancement for baseball players in the outfield/infield as described above can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®. Various embodiments of lenses including the one or more filters that provide color enhancement for baseball players in the outfield/infield as described can also be configured to provide prescription optical power in the range of about ±25 Diopters and/or optical magnification as discussed above.

C. Filters to Provide Color Enhancement for Golf

Viewing a golf ball's trajectory and determining its location are important to golfers of various skill levels. Trajectories of a golf ball hit by an inexperienced golfer are unpredictable and frequently place the ball in locations in which the ball is hard to find. Such failures to promptly find a golf ball can increase the time used to play a round and can reduce the number of rounds that can be played on a course in a day. Because time spent looking for errant golf balls contributes to slow play, many courses and many tournaments have rules concerning how long a golfer is permitted to search for a lost golf ball before putting a replacement ball into play. For more experienced or expert golfers, loss of a golf ball results in imposition of a penalty that adds strokes to the golfer's score. Such penalty strokes are annoying, especially when the loss of a ball results from an inability to find the ball due to poor viewing conditions and a limited time in which to search. Moreover, the ability to visually discern various textures, tones and topography of the grass can be important to enhance a golfer's game. Accordingly, embodiments of lenses including chroma-enhancing optical filters that enhance a golfers ability to see the golf ball against the grass and see other obstacles and markers on the golf course are advantageous.

Various embodiments of lenses used for golf preferably reduce glare (e.g., glare resulting from sunlight on a bright sunny day). Reducing glare can advantageously increase the ability of seeing the fairway, the hole and the ball thus allowing a golfer to play to the best of his/her ability. Accordingly, various embodiments of lenses used for golf can include wafers, coatings, layers or films that reduce glare. The glare reducing wafers, coatings, layers or films can include polarizing wafers, polarizing films and/or coatings to filter out polarized light, holographic or diffractive elements that are configured to reduce glare and/or diffusing elements. Additionally, it would be advantageous for various embodiments of lenses used for golf to include lens components including optical filters with one or more chroma enhancing dyes (e.g., CE wafer) that make trees, sky and other objects (e.g., flags, water features, tree roots, etc.) stand-out from the green grass to aid the golfer to guide the golf ball to a desired location. Making trees, sky and other objects stand-out from the green grass can also enhance a players golfing experience.

Various embodiments of lenses suitable for golfing can include lens components including implementations of optical filters with one or more chroma enhancing dyes (e.g., CE wafer) that transmit different colors in the visible spectral range with different values to create different viewing conditions. For example, some embodiments of lenses for golfing can transmit all colors of the visible spectrum such that there is little distortion on bright sunny days. As another example, some embodiments of lenses for golfing can transmit colors in the yellow and red spectral ranges and attenuate and/or absorb colors in the blue and green spectral ranges. Various embodiments of lenses used for golfing can also be tinted (e.g., grey, green, amber, brown or yellow) to increase contrast between the grass and the sky, reduce eye strain and/or for aesthetic purpose.

Figure 34A:
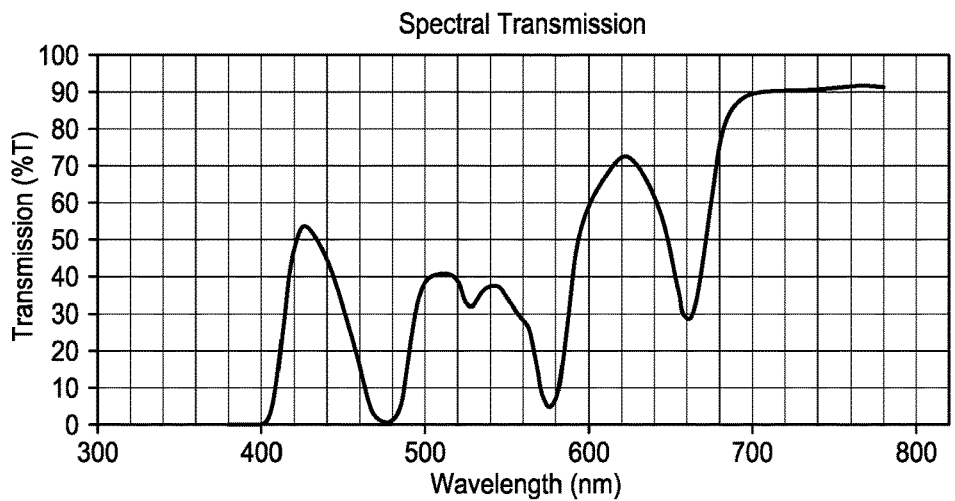
FIGS. 34A, 34B and 34C illustrate spectral characteristics of an implementation of optical filter that can be included in different embodiments of activity specific lenses.
Figure 34B:
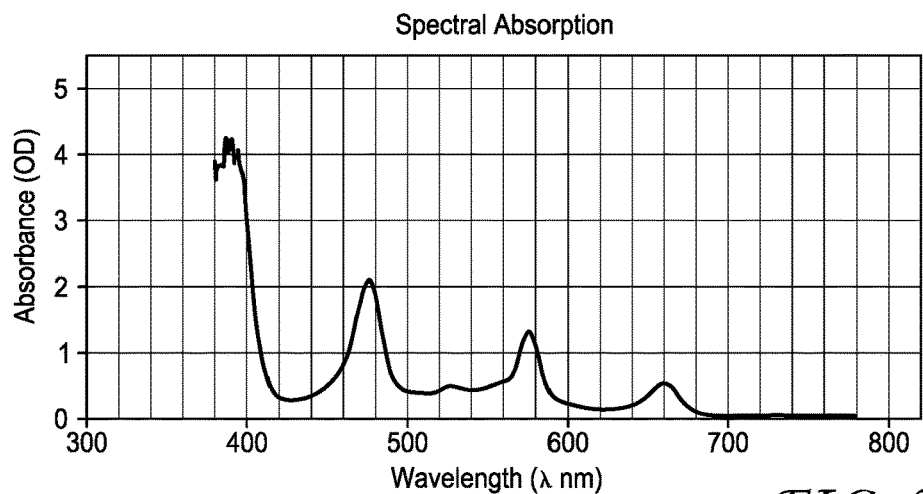
Figure 34C:
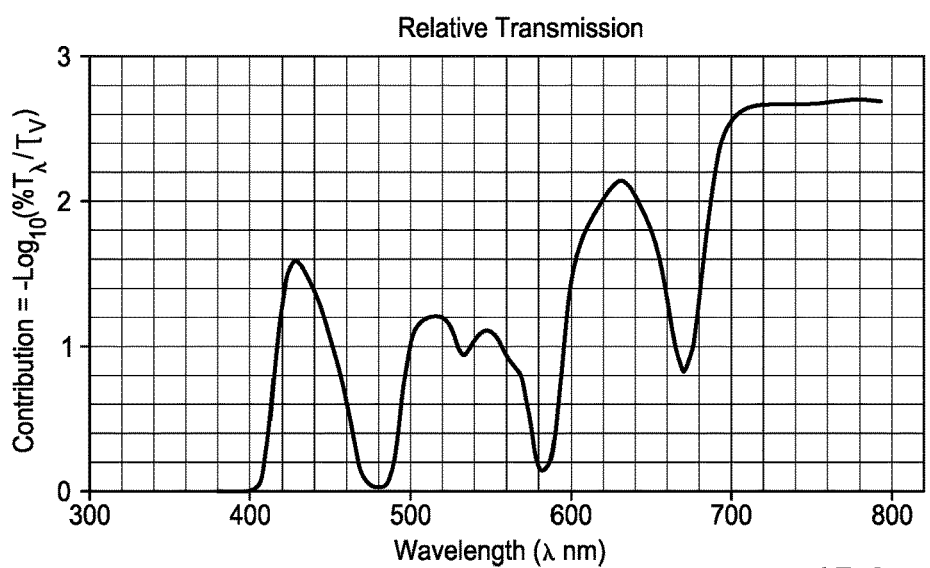

FIGS. 34A-34C illustrate the effective spectral response of an optical filter implementation that can be included in an embodiment of a lens that is suitable for golfing. FIG. 34B illustrates the effective absorbance profile of the optical filter implementation that can be included in an embodiment of a lens that is suitable for golfing. FIGS. 34A and 34C show the effective transmittance profile and the relative absorbance profile of the same optical filter implementation.

Referring to FIG. 34B, it is observed that the effective absorbance profile for the one or more lenses included in an embodiment of a lens that is suitable for golfing has a first peak between 460 nm and 490 nm, a second peak between 560 nm and 590 nm; and a third peak between 640 nm and 680 nm. The effective absorbance profile for the one or more lenses included in an embodiment of a lens that is suitable for golfing has a first "valley" in the wavelength range between about 410 nm and about 460 nm; a second "valley" in the wavelength range between about 500 nm and about 560 nm; and a third "valley" in the wavelength range between about 600 nm and about 640 nm. Wavelengths in the first, second and third valleys have reduced absorbance as compared to the wavelengths in the vicinity of the first and second peaks. The valleys in the absorbance profile correspond to the pass-bands in the transmittance profile. It is noted from FIG. 34B that the first peak has a FWHM of about 15-25 nm around a central wavelength of about 475 nm, the second peak has a FW80M of about 10-20 nm around a central wavelength of about 575 nm and the third peak has a FW80M of about 15-20 nm around a central wavelength of about 660 nm.

It is observed from FIG. 34B that (i) the value of the optical density for wavelengths in the vicinity of the first peak around 475 nm is about 300-400% higher as compared to the average value of the optical density for wavelengths in the first valley; and (ii) the value of the optical density for wavelengths in the vicinity of the first peak around 475 nm is about 300% higher as compared to the average value of the optical density for wavelengths in the second valley. Thus, wavelengths in the vicinity of the first peak around 475 nm are attenuated by about 300-400% more as compared to wavelengths in the vicinity of the first valley and by about 300% more as compared to wavelengths in the vicinity of the second valley.

It is further observed from FIG. 34B that (i) the value of the optical density for wavelengths in the vicinity of the second peak around 575 nm is about 100% higher as compared to the average value of the optical density for wavelengths in the second valley; and (ii) the value of the optical density for wavelengths in the vicinity of the second peak around 575 nm is about 500% higher as compared to the average value of the optical density for wavelengths in the third valley. Thus, wavelengths in the vicinity of the second peak around 575 nm are attenuated by about 100% more as compared to wavelengths in the vicinity of the second valley and by about 500% more as compared to wavelengths in the vicinity of the third valley.

It is further observed from FIG. 34B that (i) the value of the optical density for wavelengths in the vicinity of the third peak around 660 nm is about 100% higher as compared to the average value of the optical density for wavelengths in the third valley. Thus, wavelengths in the vicinity of the third peak around 660 nm are attenuated by about 100% more as compared to wavelengths in the vicinity of the third valley.

In various embodiments of lenses the implementation of an optical filter configured for use for golfing can be adapted to attenuate light having wavelengths less than 400 nm thereby providing safety and health benefits. Furthermore, the attenuation factor of the absorbance peaks in the blue spectral range (e.g., between about 450 nm and about 490 nm) and green spectral range (e.g., between about 550 nm and about 590 nm) can be greater than or equal to about 0.8 and less than 1 in various implementations of optical filters adapted for golfing. Additionally, the attenuation factor of the absorbance peaks in the red spectral range (e.g., between about 620 nm and about 660 nm) can be between about 0.5 and about 0.8 in various implementations of optical filters adapted for golfing. Without any loss of generality, the attenuation factor of an absorbance peak can be obtained by dividing an integrated absorptance peak area within the spectral bandwidth by the spectral bandwidth of the absorbance peak.

In the illustrated transmittance profile in FIG. 34A, the effective transmittance profile of the optical filter implementation has a first pass-band configured to transmit between about 1% to about 50% of light in the violet-blue spectral ranges (e.g., between about 405 nm and about 470 nm); a second pass-band configured to transmit between about 1% and about 30% of the light in the green-yellow spectral ranges (e.g., between about 490 nm and about 570 nm); and a third pass-band configured to transmit between about 10% and about 75% of the light in the orange-red spectral ranges (e.g., between about 580 nm and about 660 nm).

It is further observed from FIG. 34A that the second pass-band for an embodiment of a lens suitable for golfing has a plateau shaped region between about 490 nm and about 530 nm such that substantially all the wavelengths in the wavelength range between about 490 nm and about 530 nm are transmitted with almost equal intensity. In contrast, the first and third pass-bands for an embodiment of a lens for golfing have a bell-shaped profile. It is observed from FIG. 34A that the FWHM of the first pass-band for an embodiment of a lens for golfing is about 35 nm around a central wavelength of about 425 nm; and the FWHM of the third pass-band for embodiments of lenses for an embodiment of a lens for golfing is about 50-60 nm around a central wavelength of about 625 nm.

It is also observed from FIG. 34A that the effective transmittance profile for an embodiment of a lens suitable for golfing can transmit between about 80% and about 90% of light in the wavelength range between about 680 nm and about 790 nm.

FIG. 34C illustrates the effective relative absorbance profile of an embodiment of a lens including an optical filter implementation that can be suitable for golfing. The relative absorbance profile is obtained by plotting the term $-\log_{10}(\% T_\lambda/\tau_v)$ with respect to the wavelength ($\lambda$). The factor $\% T_\lambda$ represents the percentage of light transmitted through the one or more filters at a wavelength $\lambda$ and the factor $\tau_v$ represents luminous transmittance as determined according to a technique defined in section 5.6.1 the ANSI Z80.3-2009 specification for nonprescription sunglass and fashion eyewear requirements. It is observed that the relative absorption has a similar profile as the absorbance profile depicted in FIG. 34B. In various embodiments the optical filter implementations can also be configured to provide a tint or chromaticity (e.g., orange, red, pink, brown, amber, yellow, etc.) to the lens embodiments that are suitable for golfing.

Figure 36B:
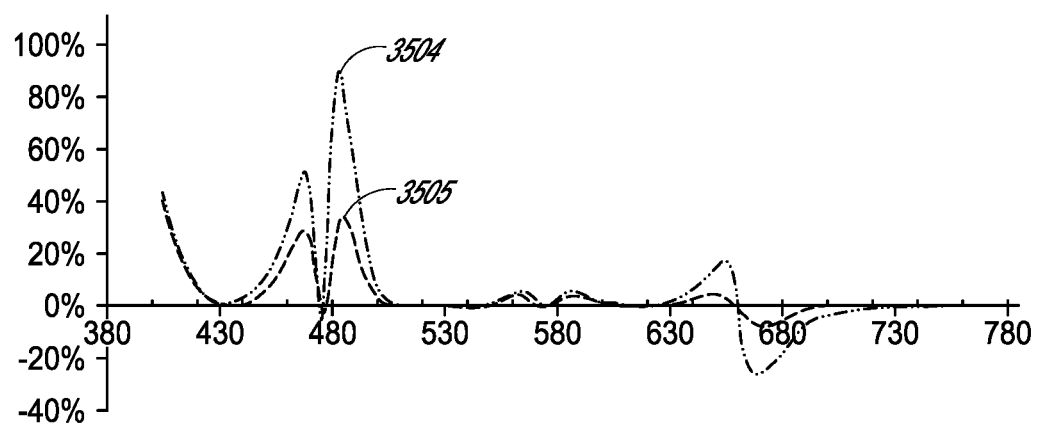

Curve 3604 of FIG. 36B shows a percentage difference in chroma between the output of the optical filter having spectral characteristics as shown in FIGS. 34A-34C and the output of a neutral filter that uniformly attenuates the same average percentage of light within each stimulus band as the optical filter having spectral characteristics as shown in FIGS. 34A-34C, wherein the input is a 30 nm uniform intensity stimulus and the horizontal axis indicates the center wavelength of each stimulus band. Using the information provided in curve 3604 it was calculated that lens suitable for suitable for golfing can provide an average chroma increase of about 22% in the spectral bandwidth between 440 nm and 480 nm as compared to a neutral filter that uniformly attenuates the same average percentage of light as the optical filter within the spectral range of 440 nm to 480 nm.

Various embodiments of lenses including one or more filters that provide color enhancement for golfing as described above can include polarization wafers, polarization films or layers such that they are polarized to reduce glare. Various embodiments of lenses including the one or more filters that provide color enhancement for golfing as described above can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®. Various embodiments of lenses including the one or more filters that provide color enhancement for golfing as described can also be configured to provide prescription optical power in the range of about ±25 Diopters and/or optical magnification as discussed above.

D. Filters to Provide Color Enhancement for Driving

Various embodiments of lenses used for driving preferably reduce glare (e.g., glare resulting from sunlight on a bright sunny day, glare resulting from light reflected from the road, glare resulting from headlights of cars in the oncoming traffic, etc.). Reducing glare can advantageously increase the ability of the driver to see the road and the surroundings clearly and increase driver and passenger safety. Accordingly, various embodiments of lenses used for driving can include wafers, coatings, layers or films that reduce glare. The glare reducing wafers, coatings, layers or films can include polarizing wafers, polarizing films and/or coatings to filter out polarized light, holographic or diffractive elements that are configured to reduce glare and/or diffusing elements. Various embodiments of lenses suitable for driving can include lens components including optical filters with one or more chroma enhancing dyes (e.g., CE wafer) that transmit different colors in the visible spectral range with different values to create different viewing conditions. For example, some embodiments of lenses suitable for driving can transmit all colors of the visible spectrum such that there is little distortion on bright sunny days. As another example, some embodiments of lenses suitable for driving can transmit colors in the yellow and red spectral ranges and attenuate and/or absorb colors in the blue and green spectral ranges. Various embodiments of lenses used for shooting can also be tinted (e.g., grey, green, amber, brown or yellow) to increase contrast between the road and the surrounding, reduce eye strain and/or for aesthetic purpose.

Figure 35A:
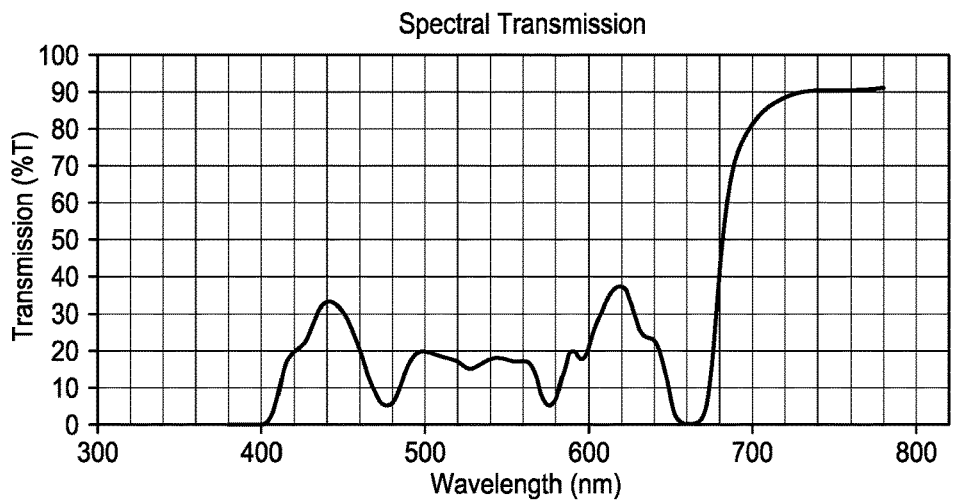
FIGS. 35A, 35B and 35C illustrate spectral characteristics of an implementation of optical filter that can be included in different embodiments of activity specific lenses.
Figure 35B:
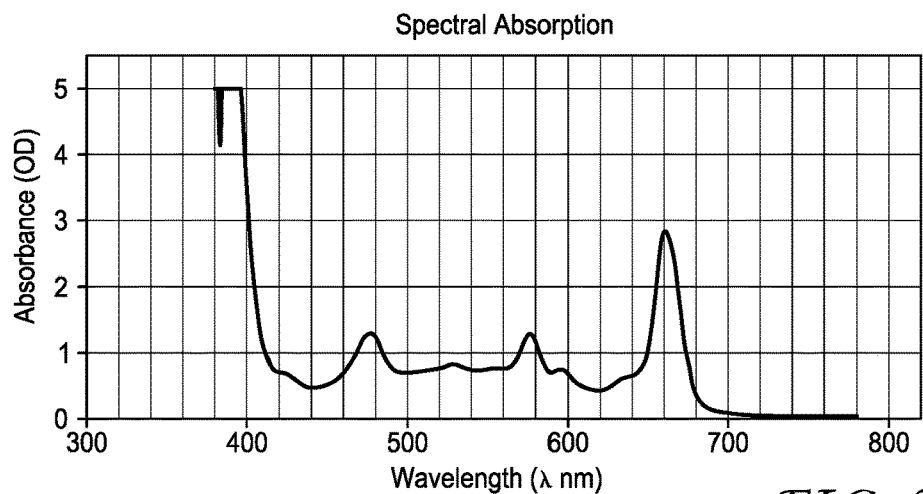
Figure 35C:
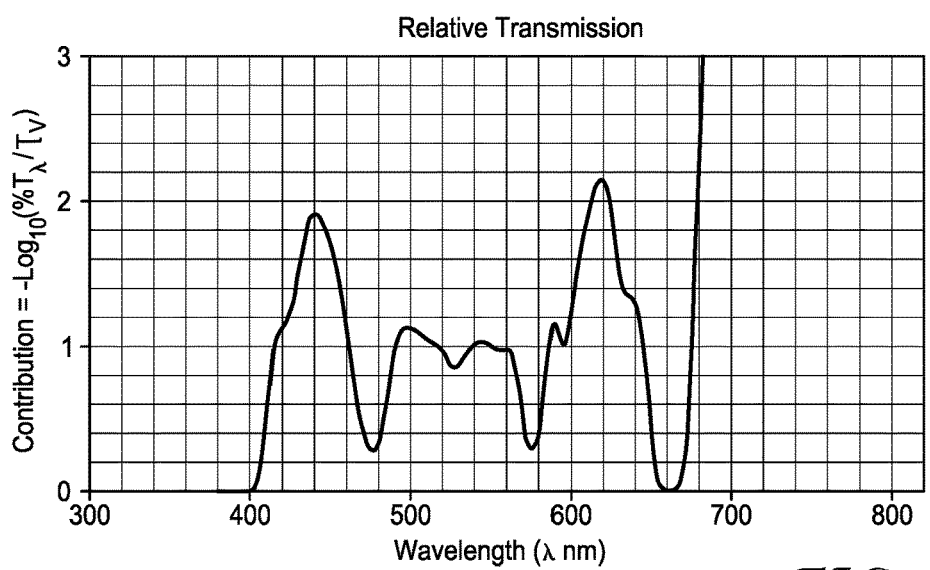

FIGS. 35A-35C illustrate the effective spectral response of implementations of optical filters that can be included in various embodiments of lenses suitable for driving. FIG. 35B illustrates the effective absorbance profile of the optical filter implementation that can be included in an embodiment of a lens that is suitable for driving. FIGS. 35A and 35C show the effective transmittance profile and the relative absorbance profile of the same optical filter implementation.

Referring to FIG. 35B, it is observed that the effective absorbance profile for the one or more lenses included in an embodiment of a lens that is suitable for driving has a first peak between 460 nm and 490 nm, a second peak between 560 nm and 590 nm; and a third peak between 640 nm and 680 nm. The effective absorbance profile for the one or more lenses included in an embodiment of a lens that is suitable for driving has a first "valley" in the wavelength range between about 410 nm and about 460 nm; a second "valley" in the wavelength range between about 500 nm and about 560 nm; and a third "valley" in the wavelength range between about 600 nm and about 640 nm. Wavelengths in the first, second and third valleys have reduced absorbance as compared to the wavelengths in the vicinity of the first and second peaks. The valleys in the absorbance profile correspond to the pass-bands in the transmittance profile. It is noted from FIG. 35B that the first peak has a FW80M of about 10-20 nm around a central wavelength of about 475 nm, the second peak has a FW80M of about 10-20 nm around a central wavelength of about 575 nm and the third peak has a FW80M of about 10-20 nm around a central wavelength of about 660 nm.

It is observed from FIG. 35B that (i) the value of the optical density for wavelengths in the vicinity of the first peak around 475 nm is about 140% higher as compared to the average value of the optical density for wavelengths in the first valley; and (ii) the value of the optical density for wavelengths in the vicinity of the first peak around 475 nm is about 60% higher as compared to the average value of the optical density for wavelengths in the second valley. Thus, wavelengths in the vicinity of the first peak around 475 nm are attenuated by about 140% more as compared to wavelengths in the vicinity of the first valley and by about 60% more as compared to wavelengths in the vicinity of the second valley.

It is further observed from FIG. 35B that (i) the value of the optical density for wavelengths in the vicinity of the second peak around 575 nm is about 100% higher as compared to the average value of the optical density for wavelengths in the second valley; and (ii) the value of the optical density for wavelengths in the vicinity of the second peak around 575 nm is about 200% higher as compared to the average value of the optical density for wavelengths in the third valley. Thus, wavelengths in the vicinity of the second peak around 575 nm are attenuated by about 100% more as compared to wavelengths in the vicinity of the second valley and by about 200% more as compared to wavelengths in the vicinity of the third valley.

It is further observed from FIG. 35B that (i) the value of the optical density for wavelengths in the vicinity of the third peak around 660 nm is about 250% higher as compared to the average value of the optical density for wavelengths in the third valley. Thus, wavelengths in the vicinity of the third peak around 660 nm are attenuated by about 250% more as compared to wavelengths in the vicinity of the third valley.

In various embodiments of lenses the implementation of an optical filter configured for use for driving can be adapted to attenuate light having wavelengths less than 400 nm thereby providing safety and health benefits. Furthermore, the attenuation factor of the absorbance peaks in the blue spectral range (e.g., between about 450 nm and about 490 nm) and green spectral range (e.g., between about 550 nm and about 590 nm) can be greater than or equal to about 0.8 and less than 1 in various implementations of optical filters adapted for driving. Additionally, the attenuation factor of the absorbance peaks in the red spectral range (e.g., between about 620 nm and about 660 nm) can also be between about 0.8 and about 1.0 in various implementations of optical filters adapted for driving. Without any loss of generality, the attenuation factor of an absorbance peak can be obtained by dividing an integrated absorptance peak area within the spectral bandwidth by the spectral bandwidth of the absorbance peak.

In the illustrated transmittance profile in FIG. 35A, the effective transmittance profile of the optical filter implementation has a first pass-band configured to transmit between about 1% to about 30% of light in the violet-blue spectral ranges (e.g., between about 405 nm and about 470 nm); a second pass-band configured to transmit between about 5% and about 20% of the light in the green-yellow spectral ranges (e.g., between about 490 nm and about 570 nm); and a third pass-band configured to transmit between about 10% and about 40% of the light in the orange-red spectral ranges (e.g., between about 580 nm and about 660 nm).

It is further observed from FIG. 35A that the second pass-band for an embodiment of a lens suitable for driving has a plateau shaped region between about 490 nm and about 530 nm such that substantially all the wavelengths in the wavelength range between about 490 nm and about 530 nm are transmitted with almost equal intensity. In contrast, the first and third pass-bands for an embodiment of a lens for driving have a bell-shaped profile. It is observed from FIG. 35A that the FWHM of the first pass-band for an embodiment of a lens for driving is about 35 nm around a central wavelength of about 425 nm; and the FWHM of the third pass-band for embodiments of lenses for an embodiment of a lens for driving is about 25-40 nm around a central wavelength of about 645 nm.

It is also observed from FIG. 35A that the effective transmittance profile for an embodiment of a lens suitable for driving can transmit between about 80% and about 90% of light in the wavelength range between about 680 nm and about 790 nm.

FIG. 35C illustrates the effective relative absorbance profile of an embodiment of a lens including an optical filter implementation that can be suitable for driving. The relative absorbance profile is obtained by plotting the term $-\log_{10}(\% T_\lambda/\tau_v)$ with respect to the wavelength ($\lambda$). The factor $\% T_\lambda$ represents the percentage of light transmitted through the one or more filters at a wavelength $\lambda$ and the factor $\tau_v$ represents luminous transmittance as determined according to a technique defined in section 5.6.1 the ANSI Z80.3-2009 specification for nonprescription sunglass and fashion eyewear requirements. It is observed that the relative absorption has a similar profile as the absorbance profile depicted in FIG. 35B.

Curve 3605 of FIG. 36B shows a percentage difference in chroma between the output of the optical filter having spectral characteristics as shown in FIGS. 35A-35C and the output of a neutral filter that uniformly attenuates the same average percentage of light within each stimulus band as the optical filter having spectral characteristics as shown in FIGS. 35A-35C, wherein the input is a 30 nm uniform intensity stimulus and the horizontal axis indicates the center wavelength of each stimulus band. Using the information provided in curve 3605 it was calculated that lens suitable for suitable for driving can provide an average chroma increase of about 11% in the spectral bandwidth between 440 nm and 480 nm as compared to a neutral filter that uniformly attenuates the same average percentage of light as the optical filter within the spectral range of 440 nm to 480 nm.

Various embodiments of lenses including one or more filters that provide color enhancement for driving as described above can include polarization wafers, polarization films or layers such that they are polarized to reduce glare. Various embodiments of lenses including the one or more filters that provide color enhancement for driving as described above can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification for cosmetic purposes and/or to darken various embodiments of the lenses. Some embodiments of interference coatings are sold by Oakley, Inc. of Foothill Ranch, Calif., U.S.A. under the brand name Iridium®. Various embodiments of lenses including the one or more filters that provide color enhancement for driving as described can also be configured to provide prescription optical power in the range of about ±25 Diopters and/or optical magnification as discussed above.

It is contemplated that the particular features, structures, or characteristics of any embodiments discussed herein can be combined in any suitable manner in one or more separate embodiments not expressly illustrated or described. In many cases, structures that are described or illustrated as unitary or contiguous can be separated while still performing the function(s) of the unitary structure. In many instances, structures that are described or illustrated as separate can be joined or combined while still performing the function(s) of the separated structures.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined by a fair reading of the claims that follow.

The following is claimed:

1. Eyewear comprising:
   a lens comprising:
      a base layer having a front surface and a rear surface; and
      an optical element disposed on the front surface of the base layer, the optical element comprising:
         a first layer comprising a first polymeric material;
         a second layer comprising a second polymeric material; and
         a functional layer between the first and the second layers,
         wherein the first or the second layer at least partially comprises an optical filter comprising one or more chroma enhancement dyes, the optical filter configured to increase an average chroma value of a uniform intensity light stimuli having a bandwidth of 30 nm within a visible spectral range transmitted through the optical element compared to a neutral filter that uniformly attenuates an equal average percentage of light as the optical filter within the visible spectral range.

2. The eyewear of claim 1, wherein the optical filter wafer has a blue light absorbance peak comprising:
- a spectral bandwidth;
- a maximum absorbance;
- a center wavelength located at a midpoint of the spectral bandwidth; and
- an integrated absorptance peak area within the spectral bandwidth;

wherein the spectral bandwidth is equal to a full width of the blue light absorbance peak at 80% of the maximum absorbance of the blue light absorbance peak;

wherein the center wavelength of the blue light absorbance peak is between 440 nm and 510 nm; and wherein an attenuation factor of the blue light absorbance peak is greater than or equal to about 0.8 and less than 1.0, the attenuation factor of the blue light absorbance peak obtained by dividing the integrated absorptance peak area within the spectral bandwidth by the spectral bandwidth of the blue light absorbance peak.

3. The eyewear of claim 1, wherein the functional layer comprises a polarizer.

4. The eyewear of claim 1, wherein the functional layer comprises polyvinyl alcohol (PVA).

5. The eyewear of claim 1, wherein the functional layer has a concave rear surface facing the first layer and a convex front surface facing the second layer.

6. The eyewear of claim 5, wherein the first layer at least partially comprises the optical filter.

7. The eyewear of claim 5, wherein the second layer at least partially comprises the optical filter.

8. The eyewear of claim 1, wherein the base layer has non-zero cylindrical optical power, negative optical power or positive optical power.

9. The eyewear of claim 1, wherein the front surface of the base layer is convex.

10. A method of manufacturing a lens, the method comprising:
- forming a functional wafer comprising a functional layer disposed between a first polymeric layer and a second polymeric layer, the first or the second polymeric layer comprising an optical filter;
- placing the functional wafer into a cavity of a mold; and
- forming a lens base by integrating a lens material onto a surface of the functional wafer while the functional wafer is within the cavity of the mold.

11. The method of claim 10, wherein the functional layer comprises a polarizer.

12. The method of claim 10, wherein the functional wafer comprises polyvinyl alcohol.

13. The method of claim 10, wherein the optical filter comprises one or more chroma enhancement dyes.

14. The method of claim 10, wherein the surface of the functional wafer on which the lens base is formed is concave.

15. The method of claim 14, wherein the lens base has a convex surface facing the concave surface of the functional wafer.

16. The method of claim 10, wherein the lens base has cylindrical optical power, negative optical power, or positive optical power.

17. The method of claim 10, wherein the functional layer has a concave surface facing the first polymeric layer and a convex surface facing the second polymeric layer.

18. The method of claim 10, wherein the first polymeric layer comprises the optical filter.

19. The method of claim 10, wherein the second polymeric layer comprises the optical filter.

20. The method of claim 10, wherein the functional layer is configured to be removable from the first or the second polymeric layer.

* * * * *